US011012689B2

(12) United States Patent
Kim

(10) Patent No.: US 11,012,689 B2
(45) Date of Patent: May 18, 2021

(54) INTRA PREDICTION ENCODING/DECODING METHOD AND APPARATUS FOR CHROMINANCE COMPONENTS

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

(21) Appl. No.: 16/880,788

(22) Filed: May 21, 2020

(65) Prior Publication Data

US 2020/0288122 A1 Sep. 10, 2020

Related U.S. Application Data

(63) Continuation of application No. PCT/KR2019/000436, filed on Jan. 11, 2019.

(30) Foreign Application Priority Data

Jan. 15, 2018 (KR) .................. 10-2018-0005294

(51) Int. Cl.
*H04N 19/105* (2014.01)
*H04N 19/186* (2014.01)
(Continued)

(52) U.S. Cl.
CPC ......... *H04N 19/105* (2014.11); *H04N 19/117* (2014.11); *H04N 19/176* (2014.11); *H04N 19/186* (2014.11)

(58) Field of Classification Search
None
See application file for complete search history.

(56) References Cited

U.S. PATENT DOCUMENTS 8,265,149 B2   9/2012 Jung et al.
9,485,513 B2  11/2016 Ichigaya et al.
(Continued)

FOREIGN PATENT DOCUMENTS

KR   20120140181 A   12/2012
KR   20130004133 A    1/2013
(Continued)

OTHER PUBLICATIONS

J. Chen et al., "Algorithm Description of Joint Exploration Test Model 4", Joint Video Exploration Team (JVET) of ITU-T SG 16 WP 3 and ISO/IEC JTC 1/SC 29/WG 11 4th Meeting: Chengdu, CN, Oct. 15-21, 2016 (Year: 2016).*
(Continued)

*Primary Examiner* — Stuart D Bennett
(74) *Attorney, Agent, or Firm* — Morgan, Lewis & Bockius LLP

(57) ABSTRACT

Disclosed is an image decoding method using the correlation between color components to perform into prediction of chrominance components. Here, the image decoding method using the correlation between color components to perform intra prediction of chrominance components comprises the steps of: checking image data and a prediction mode in a bitstream; generating a prediction block according to a reconstructed prediction mode; determining compensation settings according to the size of a current block and the reconstructed prediction mode; compensating the prediction block according to the determined compensation settings; and reconstructing the current block by adding reconstructed image data to the prediction block.

6 Claims, 15 Drawing Sheets

(51) Int. Cl.
*H04N 19/176* (2014.01)
*H04N 19/117* (2014.01)

(56) References Cited

U.S. PATENT DOCUMENTS

| | | | |
|---|---|---|---|
| 10,009,631 | B2 | 6/2018 | Jeon et al. |
| 10,021,384 | B2 | 7/2018 | Seregin et al. |
| 2009/0110069 | A1 | 4/2009 | Jung et al. |
| 2013/0272401 | A1 | 10/2013 | Seregin et al. |
| 2013/0336591 | A1 | 12/2013 | Jeon et al. |
| 2014/0334551 | A1 | 11/2014 | Kim et al. |
| 2014/0362906 | A1 | 12/2014 | Kim et al. |
| 2015/0245041 | A1 | 8/2015 | Ichigaya et al. |
| 2019/0327466 | A1* | 10/2019 | Ikai ............... H04N 19/186 |

FOREIGN PATENT DOCUMENTS

| KR | 101375664 | B1 | 3/2014 |
|---|---|---|---|
| KR | 101461501 | B1 | 12/2014 |
| KR | 101691314 | B1 | 12/2016 |
| KR | 1020170120188 | A | 3/2018 |
| KR | 1020170101840 | A | 7/2019 |

OTHER PUBLICATIONS

Joint Video Exploration Team (JVET), Algorithm Description of Joint Exploration Test Model 7 (JEM 7), Document: JVET-G1001-v1, Jul. 13-21, 2017, 48 pgs.
Korean Office Action, KR-10-2019-7021887, dated Jun. 18, 2020, 6 pgs.
Korean Office Action, Korean Application No. 9-5-2020-019650032, dated Mar. 16, 2020, 7 pgs.
KR Office Action dated Jan. 15, 2021 for Korean application No. 10-2019-7021887, Jan. 15, 2021, 6 pgs.
Joint Video Exploration Team (JVET), CE3-related: Simplification on CCLM process, Document: JVET-O0343, Jul. 3-12, 2019, 10 pgs.
Joint Video Exploration Team (JVET), CE3-related: Algorithm Description of Joint Exploration Test Model 4, Document: JVET-D1001_v1, Oct. 15-21, 2016, 38 pgs.

* cited by examiner

INTRA PREDICTION ENCODING/DECODING METHOD AND APPARATUS FOR CHROMINANCE COMPONENTS

RELATED APPLICATIONS

This application is a continuation application of the international application No. PCT/KR2019/000436, filed Jan. 11, 2019, which claims priority to the Korean patent application No. 10-2018-0005294, filed Jan. 15, 2018, both of which are incorporated by reference herein in their entireties.

TECHNICAL FIELD

The present invention relates to an image encoding/decoding method and apparatus for chrominance components. More specifically, it relates to a method and apparatus for generating prediction blocks based on correlation information between color components, and reducing deterioration between blocks by applying correction to the generated prediction blocks.

BACKGROUND

With the spread of the Internet and portable terminals and the development of information communication technology, the use of multimedia data is rapidly increasing. Accordingly, the need for improving the performance and efficiency of an image processing system has been significantly increased to perform various services or tasks through image prediction in various systems, but research and development results that can respond to this atmosphere are insufficient.

As described above, in the conventional image encoding and decoding method and apparatus, performance improvement in image processing, particularly image encoding or image decoding, is required.

SUMMARY

An object of the present invention for solving the above problems is to provide an image encoding/decoding method and apparatus for performing intra prediction by utilizing a correlation between color components.

A method of decoding an image according to an embodiment of the present invention for achieving the above object may comprise checking image data and a prediction mode in a bitstream, generating a prediction block according to a restored prediction mode, determining a correction setting according to a size of a current block and the restored prediction mode, compensating the prediction block according to the determined correction settings, and restoring the current block by adding the reconstructed image data and the prediction block.

Herein, the step of determining the correction setting may further comprise determining whether to perform the correction according to the size of the current block and a type of the prediction mode.

Herein, the step of determining the correction setting may further comprise determining a region to be corrected according to the size of the current block and the type of prediction mode.

When using a method for performing intra prediction by utilizing a correlation between color components according to the present invention as described above, prediction accuracy is high and encoding performance can be improved.

In addition, since correction is performed on a boundary region of a prediction block, there is an advantage that block degradation can be reduced.

BRIEF DESCRIPTION OF DRAWINGS

FIG. 9 is a conceptual diagram illustrating a block adjacent to a target block for intra prediction according to an embodiment of the present invention.

FIG. 12 is an exemplary diagram for detailed setting of a color copy mode according to an embodiment of the present invention.

DETAILED DESCRIPTION

Figure 1:
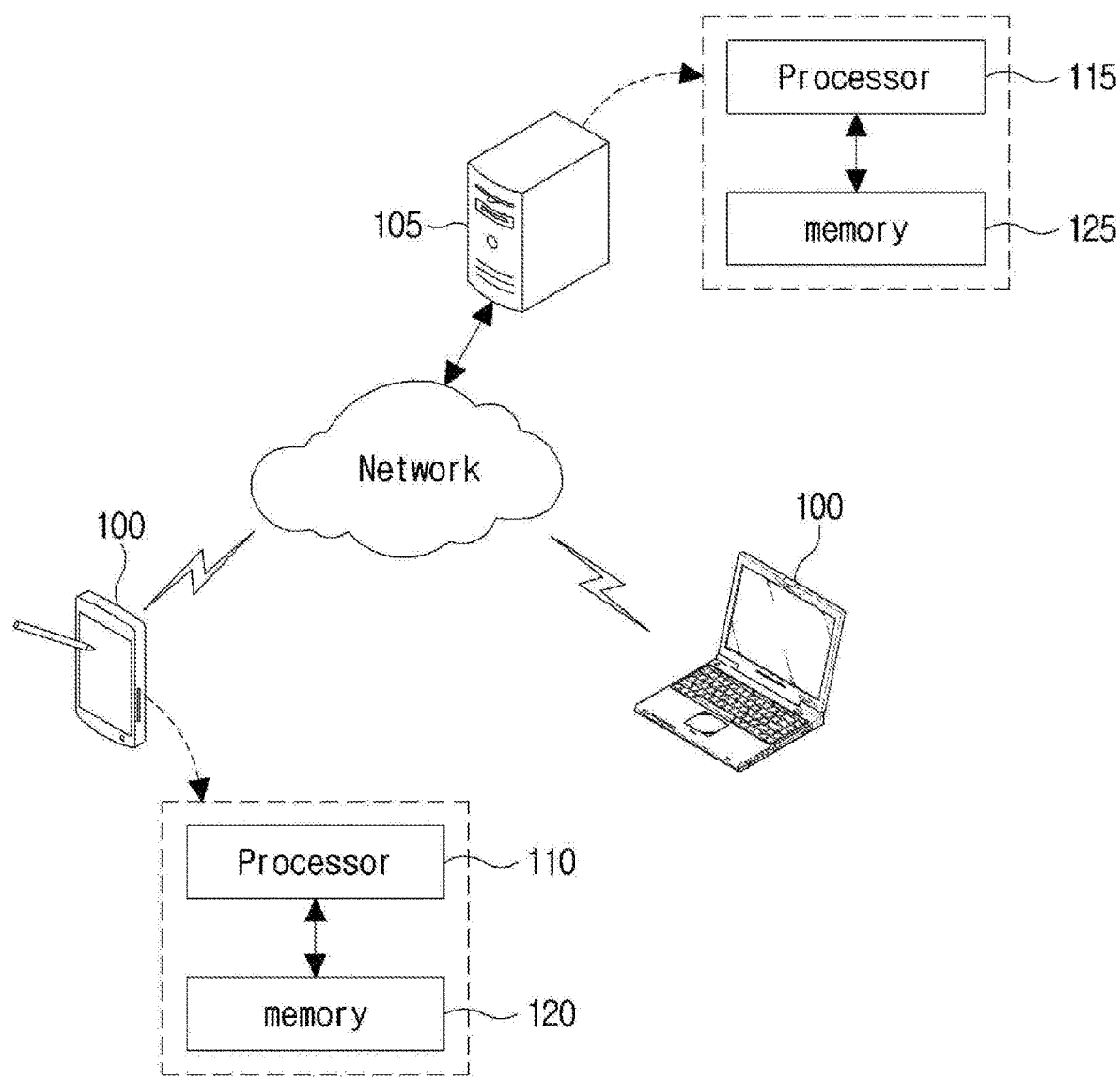
FIG. 1 is a conceptual diagram of an image encoding and decoding system according to an embodiment of the present invention.

A method of decoding an image according to an embodiment of the present invention for achieving the above object may comprise checking image data and a prediction mode in a bitstream, generating a prediction block according to a restored prediction mode, determining a correction setting according to a size of a current block and the restored prediction mode, compensating the prediction block according to the determined correction settings, and restoring the current block by adding the reconstructed image data and the prediction block.

Herein, the step of determining the correction setting may further comprise determining whether to perform the correction according to the size of the current block and a type of the prediction mode.

Herein, the step of determining the correction setting may further comprise determining a region to be corrected according to the size of the current block and the type of prediction mode.

The present invention can be applied to various changes and can have various embodiments, and specific embodiments will be illustrated in the drawings and described in detail. However, this is not intended to limit the present invention to specific embodiments, and should be understood to include all modifications, equivalents, and substitutes included in the idea and technology scope of the present invention.

Terms such as first, second, A, and B may be used to describe various components, but the components should not be limited by the terms. The terms are used only for the purpose of distinguishing one component from other components. For example, a first component may be referred to as a second component without departing from the scope of the present invention, and similarly, the second component may be referred to as the first component. The term and/or includes a combination of a plurality of related described items or any one of a plurality of related described items.

When an element is said to be "linked" or "connected" to another element, it may be directly linked or connected to other components, but it should be understood that other components may exist in the middle. On the other hand, when a component is said to be "directly linked" or "directly connected" to another component, it should be understood that no other component exists in the middle.

The terms used in the present invention are only used to describe specific embodiments, and are not intended to limit the present invention. Singular expressions include plural expressions unless the context clearly indicates otherwise. In the present invention, terms such as "include" or "have" are intended to indicate that there are features, numbers, steps, operations, components, parts, or combinations thereof described in the specification, and it should be understood that one or more other features or numbers, steps, actions, components, parts, or combinations thereof are not excluded in advance.

Unless otherwise defined, all terms used herein, including technical or scientific terms, mean the same as generally understood by a person skilled in the art to which the present invention pertains. Terms, such as those defined in a commonly used dictionary, should be interpreted as being consistent with meanings in the context of related technologies, and are not to be interpreted as ideal or excessively formal meanings unless explicitly defined in the present invention.

Typically, one or more color spaces may be configured according to a color format of an image. It may be composed of one or more pictures having a certain size or one or more pictures having a different size according to a color format. For example, color formats such as 4:4:4, 4:2:2, 4:2:0, and Monochrome (consisting only of Y) may be supported in the YCbCr color configuration. For example, in the case of YCbCr 4:2:0, it may be composed of one luminance component (Y in this example, Y) and two chrominance components (Cb/Cr in this example). Herein, the composition ratio of the chrominance component and the luminance component may have a horizontal and vertical ratio of 1:2. For example, in the case of 4:4:4, it may have the same aspect ratio horizontally and vertically. When configured as one or more color spaces as in the above example, the picture may be divided into each color space.

Images can be classified into I, P, B, etc. according to the image type (e.g., picture type, slice type, tile type, etc.). Herein, the I image type may mean an image that is self-decoded/decoded without using a reference picture, the P image type may mean an image that is encoded/decoded using a reference picture but only allows forward prediction, and the B image type may mean an image that allows forward/backward prediction by performing encoding/decoding using a reference picture. In addition, depending on encoding/decoding settings, some of the types may be combined (combining P and B) or image types of different configurations may be supported.

FIG. 1 is a conceptual diagram of an image encoding and decoding system according to an embodiment of the present invention.

Referring to FIG. 1, the image encoding apparatus 105 and the decoding apparatus 100 may be a Personal computer (PC), a Notebook Computer, a Personal Digital Assistant (PDA), a Portable Multimedia Player (PMP), a PlayStation Portable (PSP), a Wireless Communication Terminal, a user terminal such as a smart phone or a TV, or a server terminal such as an application server and a service server, and may include a variety of devices having communication devices such as communication modems for communication with various devices or wired and wireless communication, memory (120, 125) for storing various programs and data for inter or intra prediction for encoding or decoding an image, a processor (110, 115) for calculating and controlling through executing a program, or the like.

In addition, an image encoded as a bitstream by the image encoding apparatus 105 may be transmitted to the image decoding apparatus 100 in real-time or non-real-time through the Internet, short-range wireless communication network, wireless LAN network, WiBro network or mobile communication network, or through various communication interfaces such as cable or Universal Serial Bus (USB), and may be decoded, reconstructed as an image, and reproduced in the image decoding apparatus 100. In addition, an image encoded in a bitstream by the image encoding apparatus 105 may be transmitted from the image encoding apparatus 105 to the image decoding apparatus 100 through a computer-readable recording medium.

The above-described image encoding device and image decoding device may be separate devices, but may be made into one image encoding/decoding device depending on implementation. In that case, some components of the image encoding apparatus may be implemented to include at least the same structure or perform at least the same functions as substantially the same technical elements as some components of the image decoding apparatus.

Therefore, in the detailed description of the following technical elements and their operating principle, duplicate description of corresponding technical elements will be omitted. In addition, since the image decoding apparatus corresponds to a computing apparatus that applies an image encoding method performed by the image encoding apparatus to decoding, the following description will focus on the image encoding apparatus.

The computing device may include a memory that stores a program or software module that implements an image encoding method and/or an image decoding method, and a processor that is connected to the memory and performs a program. Herein, the image encoding apparatus may be referred to as an encoder, and the image decoding apparatus may be referred to as a decoder, respectively.

Figure 2:
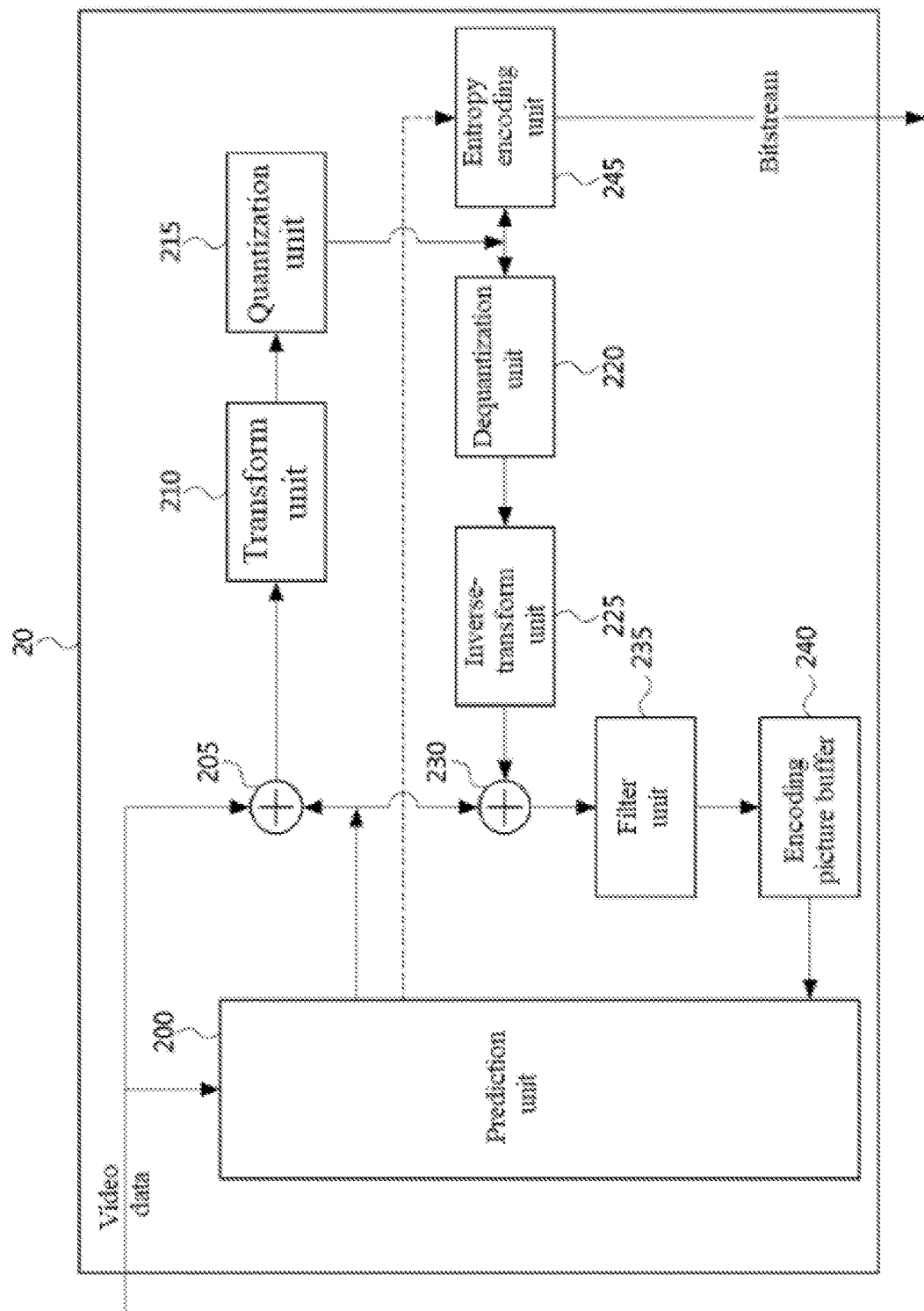
FIG. 2 is a block diagram of an image encoding apparatus according to an embodiment of the present invention.

FIG. 2 is a block diagram of an image encoding apparatus according to an embodiment of the present invention.

Referring to FIG. 2, the image encoding apparatus 20 may include a prediction unit 200, a subtraction unit 205, a transformation unit 210, a quantization unit 215, an inverse quantization unit 220, and an inverse transformation unit 225, an adder 230, a filter unit 235, an encoded picture buffer 240, and an entropy encoder 245.

The prediction unit 200 may be implemented using a prediction module, which is a software module, and may generate a prediction block by using an intra prediction method or an inter prediction method for blocks to be encoded. The prediction unit 200 may generate a prediction block by predicting a current block to be currently encoded in the image. In other words, the prediction unit 200 may generate a prediction block having a prediction pixel value (predicted pixel value) of each pixel generated by predicting a pixel value of each pixel of the current block to be encoded in an image according to intra or inter prediction. In addition, the prediction unit 200 may transmit information necessary for generating a prediction block, such as information about a prediction mode, such as an intra prediction mode or an inter prediction mode, to the encoding unit, to cause the encoding unit to encode information about the prediction mode. Herein, a processing unit for which prediction is performed, and a processing unit for which the prediction method and specific contents are determined may be determined according to encoding/decoding settings. For example, a prediction method, a prediction mode, and the like are determined in a prediction unit, and prediction may be performed in a transformation unit.

In the inter prediction unit, a translation motion model and a non-translation motion model may be divided according to a motion prediction method. In the case of the translation motion model, prediction can be performed considering only parallel movement, and in the case of a non-translation movement model, prediction can be performed considering movement such as rotation, perspective, and zoom in/out as well as parallel movement. Assuming unidirectional prediction, one motion vector may be required for the translation motion model, but one or more motion vectors may be required for the non-translation motion model. In the case of the non-translation motion model, each motion vector may be information applied to a preset position of the current block, such as an top left vertex and a top right vertex of the current block, and the position of a region to be predicted of the current block through the corresponding motion vector may be acquired in units of pixels or sub-blocks. In the inter prediction unit, some processes described below may be applied in common and some other processes may be individually applied according to the motion model.

The inter prediction unit may include a reference picture construction unit, a motion estimation unit, a motion compensation unit, a motion information determination unit, and a motion information encoding unit. The reference picture construction unit may include pictures encoded before or after the current picture in reference picture lists L0 and L1. A prediction block may be obtained from the reference picture included in the reference picture list, and a current picture may also be configured as a reference picture according to an encoding setting and included in at least one of the reference picture lists.

In the inter prediction unit, the reference picture construction unit may include a reference picture interpolation unit, and may perform an interpolation process for a decimal pixel unit according to interpolation precision. For example, an 8-tap DCT-based interpolation filter may be applied to a luminance component, and a 4-tap DCT-based interpolation filter may be applied to a chrominance component.

In the inter prediction unit, the motion estimation unit may be a process of searching for a block having a high correlation with a current block through a reference picture, and various methods such as full search-based block matching algorithm (FBMA) and three step search (TSS) may be used. In addition, the motion compensation unit means a process of obtaining a prediction block through a motion estimation process.

In the inter prediction unit, a motion information determination unit may perform a process for selecting optimal motion information of a current block, and the motion information may be encoded by a motion information encoding mode such as Skip Mode, Merge Mode, and Competition Mode. The mode may be configured by combining a supported mode according to a motion model, and a skip mode (translation), a skip mode (other than translation), a merge mode (translation), a merge mode (other than translation), a competition mode (translation), and a competition mode (other than translation) can be an example for it. Depending on an encoding setting, some of the modes may be included in a candidate group.

A motion information encoding mode may obtain a motion information prediction value (motion vector, reference picture, prediction direction, etc.) of a current block from at least one candidate block, and when two or more candidate blocks are supported, optimal candidate selection information can occur. In the skip mode (no residual signal) and the merge mode (there is a residual signal), a prediction value may be used as motion information of the current block, and in the competition mode, difference information between the motion information of the current block and the prediction value may occur.

A candidate group for a motion information prediction value of a current block may be constructed adaptively and variously according to a motion information encoding mode. Motion information of a block (for example, a left, top, top left, top right, bottom left block, etc.) spatially adjacent to the current block may be included in the candidate group, and motion information of a block temporally adjacent to the current block may be included in the candidate group, and mixed motion information of a spatial candidate and a temporal candidate may be included in the candidate group.

The temporally adjacent block may include a block in another image corresponding to the current block, and may mean a block located in a left, right, top, bottom, top left, top right, bottom left, bottom right block, or the like. of the block. The mixed motion information may mean information obtained as an average, a median, etc. through motion information of spatially adjacent blocks and motion information of temporally adjacent blocks.

There may be a priority order for constructing a candidate group of a motion information prediction value. The order included in a configuration of the candidate group of the prediction value may be determined according to the priority order, and the configuration of the candidate group may be completed when the number of candidate groups (determined according to the motion information encoding mode) is filled according to the priority order. Herein, the priority order may be determined in the order of motion information of spatially adjacent blocks, motion information of temporally adjacent blocks, and mixed motion information of spatial candidates and temporal candidates, but other modifications are also possible.

For example, among spatially adjacent blocks, it may be included in a candidate group in the order of left-top-top right-bottom left-top left block, etc., and among the temporally adjacent blocks, it may be included in a candidate group in the order of bottom right-middle-right-bottom block, etc.

The subtraction unit 205 may generate a residual block by subtracting a prediction block from a current block. In other words, the subtraction unit 205 may generate a residual block, which is a residual signal in the form of a block, by calculating a difference between a pixel value of each pixel of the current block to be encoded and a prediction pixel value of each pixel of the prediction block generated through the prediction unit. In addition, the subtraction unit 205 may generate the residual block according to a unit other than a block unit obtained through the block division unit described later.

The transformation unit 210 may convert a signal belonging to a spatial domain into a signal belonging to a frequency domain, and the signal obtained through a transform process is called a transformed coefficient. For example, a residual block having a residual signal received from the subtraction unit may be transformed to obtain a transform block having a transformed coefficient, and an input signal is determined according to encoding settings, which is not limited to the residual signal.

The transformation unit can transform the residual block using transform techniques such as Hadamard Transform, Discrete Sine Transform (DST Based-Transform), and Discrete Cosine Transform (DCT Based-Transform). However, the present invention may not be limited thereto, and various conversion techniques that improve and modify it may be used.

At least one of the transformation techniques may be supported, and at least one detailed transformation technique may be supported in each transformation technique. In this case, the detailed transformation technique may be a transformation technique in which some of base vectors are configured differently in each transformation technique.

For example, in the case of DCT, one or more detailed transformation techniques of DCT-I to DCT-VIII may be supported, and in the case of DST, one or more detailed transformation techniques of DST-I to DST-VIII may be supported. Some of the detailed transformation techniques may be configured to configure a candidate group for a transformation technique. For example, DCT-II, DCT-VIII, and DST-VII may be configured as the candidate group of the transformation technique to perform transformation.

The transformation can be performed in the horizontal/vertical direction. For example, a pixel value in a spatial domain can be converted into a frequency domain by performing a total two-dimensional transformation which is performing a one-dimensional transformation in the horizontal direction using the transformation technique of DCT-II and a one-dimensional transformation in the vertical direction using the transformation technique of DST-VIII.

Transformation can be performed using one fixed transformation technique, or transformation can be performed by adaptively selecting a transformation technique according to encoding/decoding settings. Herein, in the adaptive case, a transform technique may be selected using an explicit or implicit method. In the explicit case, each transformation technique selection information or transformation technique set selection information applied to the horizontal and vertical directions may occur in a unit such as a block. In the implicit case, an encoding setting may be defined according to an image type (I/P/B), color component, block size, shape, and intra prediction mode, and a predefined transformation technique may be selected accordingly.

In addition, it may be possible that some of the transformations are omitted depending on encoding settings. This means that one or more of the horizontal/vertical units can be omitted, either explicitly or implicitly.

In addition, the transformation unit may transmit information necessary for generating a transform block to the encoding unit to encode it, record the encoded information to a bitstream, and transmit it to a decoder, and a decoding unit of the decoder may parse the transmitted information and use it in the process of an inverse transformation.

The quantization unit 215 may quantize an input signal, and a signal obtained through a quantization process is called a quantized coefficient. For example, a quantization block having a quantized coefficient may be obtained by quantizing a residual block having a residual transformed coefficient received from the transformation unit, and the input signal is determined according to encoding settings, which are not limited to the residual transform coefficient.

The quantization unit may quantize a transformed residual block using a quantization technique such as Dead Zone Uniform Threshold Quantization, Quantization Weighted Matrix, etc., but it may not be limited thereto, and various quantization techniques that improve and modify it may be used.

Depending on encoding settings, a quantization process can be omitted. For example, the quantization process (including its inverse process) may be omitted according to encoding settings (e.g., a quantization parameter is 0. that is, a lossless compression environment). As another example, if compression performance through quantization is not achieved according to characteristics of an image, the quantization process may be omitted. In this case, a region in which the quantization process is omitted among quantization blocks (M×N) may be an entire region or a partial region (M/2×N/2, M×N/2, M/2×N, etc.), and quantization omission selection information may be determined implicitly or explicitly.

The quantization unit may transmit information necessary for generating a quantization block to an encoding unit to encode it, record the encoded information to a bitstream, and transmit it to a decoder, and a decoding unit of the decoder may parse the transmitted information and use it in the process of an inverse quantization.

Although the above example has been described under the assumption that a residual block is transformed and quantized through the transformation unit and the quantization unit, a residual block having transform coefficients may be generated by transforming a residual signal of the residual block and a quantization process may not be performed. In addition, it is possible not only to perform the quantization process without transforming the residual signal into the transform coefficient, but also not to perform both the transformation and the quantization process. This can be determined according to an encoder setting.

The inverse quantization unit 220 inversely quantizes a residual block quantized by the quantization unit 215. That is, the inverse quantization unit 220 inversely quantizes a quantization frequency coefficient sequence to generate a residual block having a frequency coefficient.

The inverse transformation unit 225 inversely transforms a residual block quantized by the inverse quantization unit 220. That is, the inverse transformation unit 225 inversely transforms the frequency coefficients of the inverse quantized residual block to generate a residual block having a pixel value, that is, a reconstructed residual block. Herein, the inverse transformation unit 225 may perform an inverse transform using the transformation method used by the transformation unit 210 in reverse.

The adder 230 restores a current block by adding the prediction block predicted by the prediction unit 200 and the residual block restored by the inverse transformation unit 225. The reconstructed current block is stored as a reference picture (or reference block) in the encoded picture buffer 240 and may be used as a reference picture when encoding the next block, another block, or another picture in the future.

The filter unit 235 may include one or more post-processing filter processes such as a deblocking filter, sample adaptive offset (SAO), and adaptive loop filter (ALF). The deblocking filter can remove block distortion caused by a boundary between blocks in a reconstructed picture. The ALF may perform filtering based on a value obtained by comparing a reconstructed image after a block is filtered through a deblocking filter with an original image. The SAO may restore an offset difference from an original image in a unit of a pixel for a residual block to which a deblocking filter is applied. These post-processing filters can be applied to the reconstructed picture or block.

The encoded picture buffer 240 may store blocks or pictures reconstructed through the filter unit 235. The reconstructed block or picture stored in the encoded picture buffer 240 may be provided to the prediction unit 200 that performs intra prediction or inter prediction.

The entropy encoding unit 245 scans the generated quantization frequency coefficient sequence according to various scanning methods to generate a quantization coefficient sequence, and outputs it by encoding using an entropy encoding technique, and the like. The scan pattern can be set to one of various patterns such as a zigzag, diagonal, and raster. In addition, it is possible to generate and output encoded data including encoding information transmitted from each component in a bitstream.

Figure 3:
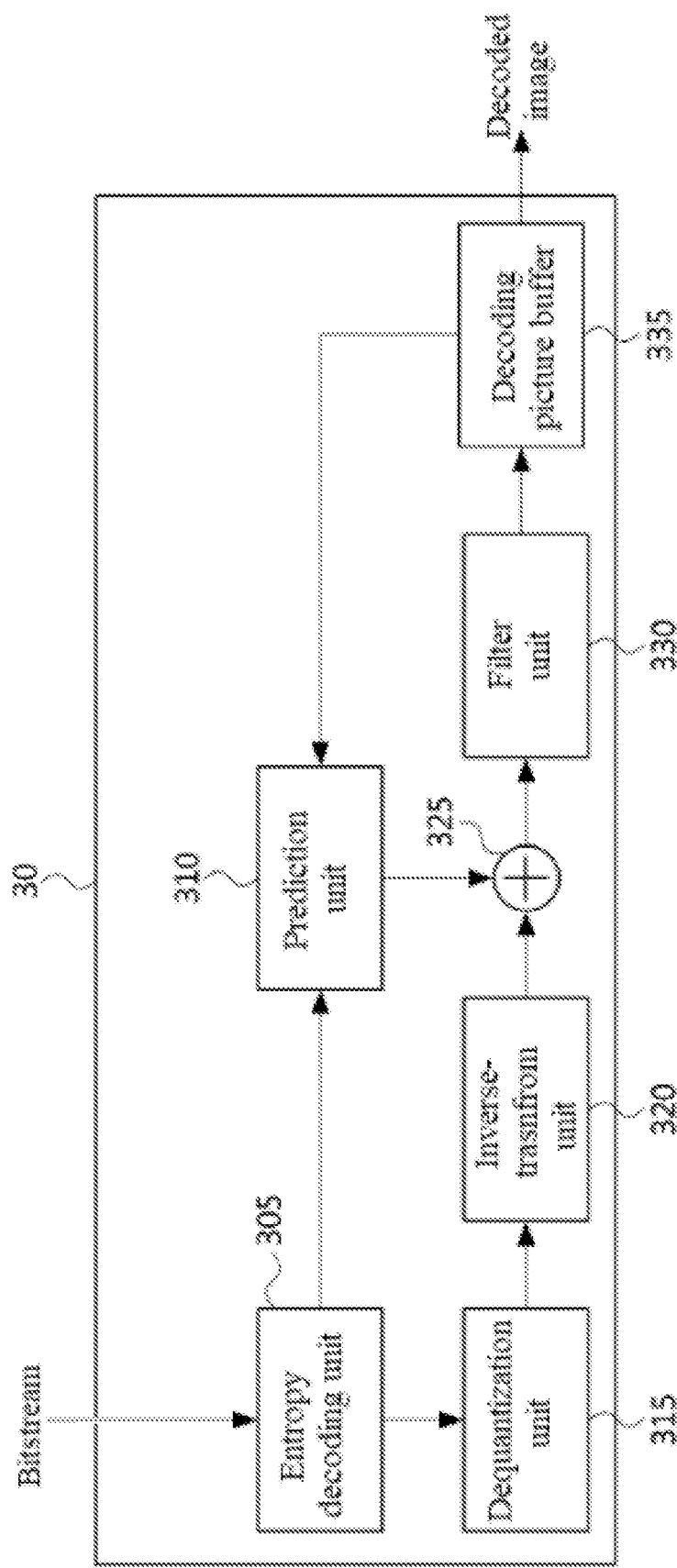
FIG. 3 is a block diagram of an image decoding apparatus according to an embodiment of the present invention.

FIG. 3 is a block diagram of an image decoding apparatus according to an embodiment of the present invention.

Referring to FIG. 3, the image decoding apparatus 30 may be configured to include an entropy decoding unit 305, a prediction unit 310, an inverse quantization unit 315, an inverse transformation unit 320, an adder/subtractor 325, a filter 330, and a decoded picture buffer 335.

In addition, the prediction unit 310 may include an intra prediction module and an inter prediction module again.

First, when an image bitstream transmitted from the image encoding apparatus 20 is received, it may be delivered to the entropy decoding unit 305.

The entropy decoding unit 305 may decode the bitstream and decode decoding data including quantization coefficients and decoding information transmitted to each component.

The prediction unit 310 may generate a prediction block based on data transmitted from the entropy decoding unit 305. Herein, based on a reference image stored in the decoded picture buffer 335, a reference picture list using a default configuration technique may be constructed.

The inter prediction unit may include a reference picture construction unit, a motion compensation unit, and a motion information decoding unit, and some may perform the same process as the encoder and some may perform the inverse process.

The inverse quantization unit 315 may inverse quantize quantized transform coefficients provided from a bitstream and encoded by the entropy decoding unit 305.

The inverse transformation unit 320 may generate a residual block by applying inverse DCT, inverse integer transformation, or similar inverse transformation techniques to transform coefficients.

In this case, the inverse quantization unit 315 and the inverse transformation unit 320 may perform inversely the processes performed by the transformation unit 210 and quantization unit 215 of the image encoding apparatus 20 described above, and may be implemented in various ways. For example, the same process and inverse transformation that are shared with the transformation unit 210 and the quantization unit 215 may be used, and information about the transformation and quantization process (for example, transformation size and transformation shape, quantization type, etc.) from the image encoding apparatus 20 may be used to perform the transformation and quantization processes inversely.

The residual block that has undergone the inverse quantization and inverse transformation processes may be added to the prediction block derived by the prediction unit 310 to generate a reconstructed image block. The addition may be performed by the adder/subtractor unit 325.

The filter 330 may apply a deblocking filter to remove a blocking phenomenon, if necessary, for a reconstructed image block, and additional loop filters may also be used before and after the decoding process to improve video quality The reconstructed and filtered image blocks may be stored in the decoded picture buffer 335.

Although not shown in the drawing, the picture encoding/decoding device may further include a picture division unit and a block division unit.

The picture division unit may divide (or partition) a picture into at least one processing unit such as a color space (e.g., YCbCr, RGB, XYZ, or the like), tile, slice, or basic coding unit (or maximum coding unit), or the like. The block division unit may divide the basic coding unit into at least one processing unit (e.g., coding, prediction, transformation, quantization, entropy, and in-loop filter units).

The basic coding unit may be obtained by dividing pictures in horizontal and vertical directions at regular intervals. Based on this, partitioning of tiles, slices, or the like may be performed, but it may not be limited thereto. The division unit such as the tile and slice may be composed of an integer multiple of the basic coding block, but an exception may occur in a division unit located at an image boundary. For this, adjustment of the basic coding block size may occur.

For example, a picture may be divided into the division units after being partitioned as a basic coding unit, or a picture may be divided into the basic coding units after being partitioned as the division unit. In the present invention, it is assumed on the assumption that the partitioning and division order of each unit is the former, but may not be limited thereto, and the latter may also be possible depending on encoding/decoding settings. In the latter case, the size of the basic coding unit may be transformed into an adaptive case according to a division unit (tile, etc.). That is, it means that a basic coding block having a different size for each division unit can be supported.

In the present invention, a case in which a picture is partitioned into a basic coding unit is set as a basic setting, and an example described later will be described. The default setting may mean that a picture is not divided into tiles or slices, or a picture is one tile or one slice. However, as described above, when each division unit (tile, slice, etc.) is first partitioned and divided into basic coding units based on the obtained units (i.e., each division unit is not an integer multiple of the basic coding unit, etc.), it should be understood that various embodiments described below may be applied by being the same or changed.

In the case of a slice among the division units, it may be composed of a bundle of at least one consecutive block according to a scan pattern, and in the case of a tile, it may be composed of a bundle of spatially adjacent blocks in a rectangular shape, and it may be configured by the definition of other additional units supported. The slice and the tile may be a division unit supported for the purpose of parallel processing, etc., and for this, the reference between the division units may be limited (that is, cannot be referred).

In this case, a slice and a tile may be divided into a plurality of units according to encoding/decoding settings.

For example, some units <A> may be units including setting information that affects the encoding/decoding process (that is, include tile headers or slice headers), and some units <B> may be units not including setting information. Alternatively, some units <A> may be units that cannot refer to other units in the encoding/decoding process, and some units <B> may be units that can refer to the other units. In addition, some units <A> may have a vertical relationship including other units <B>, or some units <A> may have an equivalent relationship with other units <B>.

Herein, A and B may be a slice and tile (or tiles and slices). Alternatively, A and B may be composed of one of slices and tiles. For example, A may be a slice/tile <type 1> and B may be a slice/tile <type 2>.

Herein, the type 1 and the type 2 may each be one slice or tile. Alternatively, the type 1 (including the type 2) may be a plurality of slices or tiles (a set of slices or a set of tiles), and the type 2 may be a single slice or tile.

As described above, the present invention is described on the assumption that a picture is composed of one slice or tile, but when two or more division units occur, the above description may be applied to and understood in the embodiments described below. In addition, A and B are examples of characteristics that the division unit may have, and examples in which A and B of each example are mixed are also possible.

Meanwhile, it may be divided into blocks of different sizes through the block division unit. Herein, the blocks may be composed of one or more blocks according to a color format (for example, one luminance block and two chrominance blocks, etc.), and the size of the block may be determined according to the color format. Hereinafter, for convenience of description, description will be made based on a block according to one color component (luminance component).

It should be understood that the contents described below are targeted to one color component, but can be applied to other color components in proportion to a ratio (for example, in the case of YCbCr 4:2:0, the ratio of the horizontal length to the vertical length of the luminance component and the chrominance component is 2:1) according to the color format. In addition, although it is possible to perform block division dependent on other color components (for example, depending on a block division result of Y in Cb/Cr), it should be understood that independent block division may be possible for each color component. In addition, although one common block division setting (considering proportion to a length ratio) can be used, it is necessary to consider and understand that individual block division settings are used according to color components.

The block may have a variable size such as M×N (M and N are integers such as 4, 8, 16, 32, 64, and 128), and may be a unit (coding block) for performing encoding. In detail, it may be a unit that is a basis for prediction, transformation, quantization, and entropy encoding, and is generally referred to as a block in the present invention. Herein, the block does not only mean a block of a square, but can be understood as a wide concept including various types of regions such as a triangle and a circle, and the present invention will be mainly described in the case of a square.

The block division unit may be set in relation to each component of an image encoding device and decoding device, and a size and shape of a block may be determined through this process. Herein, the block to be set may be defined differently according to a component, and a prediction block in a prediction unit, a transformation block in a transformation unit, and a quantization block in a quantization unit may correspond to this. However, the present invention may not be limited thereto, and a block unit according to other components may be additionally defined. In the present invention, it is assumed on the assumption that the input and output are blocks (i.e., rectangular) in each component, but in some components, input/output of other shapes (e.g., square, triangle, etc.) may be possible.

A size and shape of the initial (or starting) block of the block division unit may be determined from the higher unit. For example, in the case of a coding block, the basic coding block may be an initial block, and in the case of a prediction block, the coding block may be an initial block. In addition, in the case of a transform block, a coding block or a prediction block may be an initial block, and this may be determined according to encoding/decoding settings.

For example, if an encoding mode is intra, a prediction block may be the higher unit of the transform block, and if the encoding mode is inter, the prediction block may be a unit independent of the transform block. The initial block, which is the starting unit of division, may be divided into small-sized blocks, and if the optimal size and shape according to the division of the block are determined, the block may be determined as the initial block of the lower unit. The initial block, which is the starting unit of division, can be considered as the initial block of the higher unit. Herein, the higher unit may be a coding block, and the lower unit may be a prediction block or a transform block, but is not limited thereto. When the initial block of the lower unit is determined as in the above example, a dividing process for finding the optimal size and shape of the block as the higher unit may be performed.

In summary, the block division unit may divide a basic coding unit (or the maximum coding unit) into at least one coding unit (or lower coding unit). In addition, a coding unit may be divided into at least one prediction unit, and may be divided into at least one transformation unit. A coding unit may be divided into at least one coding block, the coding block may be divided into at least one prediction block, and divided into at least one transform block. A prediction unit may be divided into at least one prediction block, and a transformation unit may be divided into at least one transformation block.

In this case, some blocks may be combined with other blocks to perform one dividing process. For example, when a coding block and a transform block are combined as one unit, a dividing process is performed to obtain the optimal block size and shape, which may be not only the optimal size and shape of the coding block, but also the optimal size and shape of the transform block. Alternatively, a coding block and a transform block may be combined in one unit, a prediction block and a transform block may be combined in one unit, and a coding block, a prediction block, and a transform block may be combined in one unit. In addition, combinations of other blocks may be possible.

As described above, when the optimal size and shape of a block is found, mode information (for example, division information, etc.) may be generated. The mode information may be stored in a bitstream together with information (for example, prediction-related information, transformation-related information, etc.) generated by a component to which a block belongs and transmitted to a decoder, and may be parsed in a unit of the same level in the decoder and used in an image decoding process.

Hereinafter, a division method will be described, and for convenience of description, it is assumed that an initial block is in the form of a square. However, the initial block may be applied in the same or similar manner even in the form of a rectangle, but is not limited thereto.

Various methods for block division may be supported, but the present invention will focus on tree-based division, and at least one tree division may be supported. In this case, a quad tree (Quad Tree. QT), a binary tree (BT), a ternary tree (TT), and the like may be supported. When one tree method is supported, it can be referred to as a single tree division and when two or more tree methods are supported, it can be referred to as a multiple tree method.

The quad-tree division means that a block is divided into two in the horizontal and vertical direction respectively, the binary tree division means that a block is divided into two in either the horizontal or vertical direction, and the ternary-tree division means that a block is divided into three in either the horizontal or vertical direction.

In the present invention, if a block before division is M×N, it is assumed that the block is divided into four M/2×N/2 in the case of the quad-tree division, the block is divided into M/2×N or M×N/2 in the case of the binary-tree division, and the block is divided into M/4×N/M/2×N/M/4×N or M×N/4/M×N/2/M×N/4 in the case of the ternary-tree division. However, the division result is not limited to the above case, and examples of various modifications may be possible.

Depending on encoding/decoding settings, one or more of tree division methods may be supported. For example, quad tree division can be supported, quad tree division and binary tree division can be supported, quad tree division and ternary tree division can be supported, or quad tree division, binary tree division, and ternary tree division can be supported.

The above example is an example of a case where the basic division method is the quad tree, and binary tree division and ternary tree division are included in additional division modes depending on whether other trees are supported, but various modifications may be possible. Herein, information on whether other trees are supported (bt_enabled_flag, tt_enabled_flag, bt_tt_enabled_flag, etc. it may have a value of 0 or 1, if 0: not supported, and if 1: supported) may be determined implicitly according to encoding/decoding settings, or may be explicitly determined in a unit of a sequence, picture, slice, tile, or the like.

The division information may include information on whether to divide (tree_part_flag. or, qt_part_flag, bt_part_flag, tt_part_flag, bt_tt_part_flag. it may have a value of 0 or 1, and if 0: not divided and if 1: divided). In addition, information on a division direction (dir_part_flag. or, bt_dir_part_flag, tt_dir_part_flag, bt_tt_dir_part_flag. it may have a value of 0 or 1, if 0:<horizontal> and if 1:<vertical>) may be added according to a division method (binary tree, ternary tree), which may be information that can be generated when division is performed.

When multiple tree division is supported, various division information configurations may be possible. The following will be described assuming an example of how division information is configured at one depth level (i.e., recursive division may be possible because the supported division depth is set to one or more, but for convenience of explanation).

As an example (1), information on whether to divide is checked. Herein, if the division is not performed, the division is ended.

If the division is performed, division information for a division type (For example, tree_idx. if 0: QT, if 1: BT, if 2: TT) is checked. In this case, division direction information is additionally checked according to the selected division type, and the process proceeds to the next step (if additional division is possible for reasons such as when the division depth has not reached the maximum value, etc., the division is restarted, and if division is not possible, the division is ended.)

As an example (2), information on whether to divide for some tree methods (QT) is checked, and the process goes to the next step. Herein, if division is not performed, information on whether to divide for some tree methods (BT) is checked. Herein, if division is not performed, information on whether to divide for some tree methods (TT) is checked. Herein, if division is not performed, the division process is ended.

If division of some tree method (QT) is performed, the process goes to the next step. In addition, if division of some tree methods (BT) is performed, division direction information is checked and the process goes to the next step. In addition, if division of some tree methods (TT) is performed, division direction information is checked and the process goes to the next step.

As an example (3), information about whether to divide for some tree methods (QT) is checked. Herein, if division is not performed, information on whether to divide for some tree methods (BT and TT) is checked. Herein, if division is not performed, the division process is ended.

If division of some tree methods (QT) is performed, the process goes to the next step. In addition, if division of some tree methods (BT and TT) is performed, division direction information is checked and the process goes to the next step.

The above example may be a case where the priority of tree division exists (examples 2 and 3) or does not exist (example 1), but examples of various modifications may be possible. In addition, in the above example, the division of the current stage is an example for explaining the case that is not related to a division result of a previous stage, but it may also be possible to set the division of the current stage depending on the division result of the previous stage.

For example, in the case of Examples 1 to 3, if division of some tree methods (QT) is performed in a previous step and the process is passed to a current step, division of the same tree methods (QT) may be supported in the current step.

On the other hand, if division of some tree methods (QT) is not performed in a previous step and division of other tree methods (BT or TT) is performed and the process is passed to a current step, it may also be possible that division of some tree methods (BT and TT), except for division of some tree methods (QT), are supported in subsequent steps including the current step.

In the above case, it means that tree configurations supported for block division may be adaptive, and thus, the above-described division information configurations may also be configured differently. (assuming the example to be described later is the third example) That is, in the above example, if the division of some tree methods (QT) was not performed in the previous step, the division process may be performed without considering some tree methods (QT) in the current stage. In addition, it may be configured by removing division information regarding related tree methods (for example, information about whether to divide, information about a division direction, etc. in this example <QT>, information about whether to divide).

The above example is for adaptive division information configuration for a case where block division is allowed (for example, a block size is within the range between the maximum and minimum values, a division depth of each tree method does not reach the maximum depth <allowed depth>, etc.), and adaptive division information configuration may be possible even when block division is limited (for example, a block size is not in the range between the maximum and minimum values, a division depth of each tree method reaches the maximum depth, etc.).

As already mentioned, tree-based division in the present invention can be performed using a recursive method. For example, when a division flag of a coding block having a division depth k is 0, encoding of the coding block is performed in the coding block having the division depth k, and when the division flag of the coding block having the division depth k is 1, encoding of the coding block is performed in N sub-coding blocks having a division depth of k+1 according to a division method (wherein N is an integer of 2 or more such as 2, 3, 4).

The sub-coding block may be set again as a coding block (k+1) and divided into sub-coding blocks (k+2) through the above process, and such a hierarchical division method may be determined according to division settings such as a division range and a division allowable depth.

Herein, a bitstream structure for representing division information can be selected from one or more scan methods. For example, a bitstream of division information may be configured based on a division depth order, or the bitstream of the division information may be constructed based on whether division is performed.

For example, in the case of a division depth order criterion, it means a method of obtaining division information at a current level depth based on an initial block and obtaining division information at the next level depth. In addition, in the case of a criterion on whether division is performed, it means a method of preferentially acquiring additional division information in a block divided based on an initial block, and other additional scanning methods may be considered. In the present invention, it is assumed that a bitstream of division information is configured based on whether division is performed.

As described above, various cases of block division have been described, and a fixed or adaptive setting for block division may be supported.

Herein, a setting related to block division may explicitly include related information in a unit such as a sequence, a picture, a slice, and a tile. Alternatively, the block division setting may be determined implicitly according to encoding/decoding settings, wherein the encoding/decoding settings may be configured according to one or a combination of two or more of various encoding/decoding elements such as an image type (I/P/B), color component, division type, and division depth.

In an image encoding method according to an embodiment of the present invention, intra prediction may be configured as follows. The intra prediction of the prediction unit may comprise constructing a reference pixel, generating a prediction block, determining a prediction mode, and encoding a prediction mode. In addition, the image encoding apparatus may be configured to comprise a reference pixel configuration unit, a prediction block generation unit, and a prediction mode encoding unit that implement a reference pixel configuration step, a prediction block generation step, a prediction mode determination step, and a prediction mode encoding step. Some of the above-described processes may be omitted or other processes may be added. In addition, it may be changed in an order other than the order described above.

Figure 4:
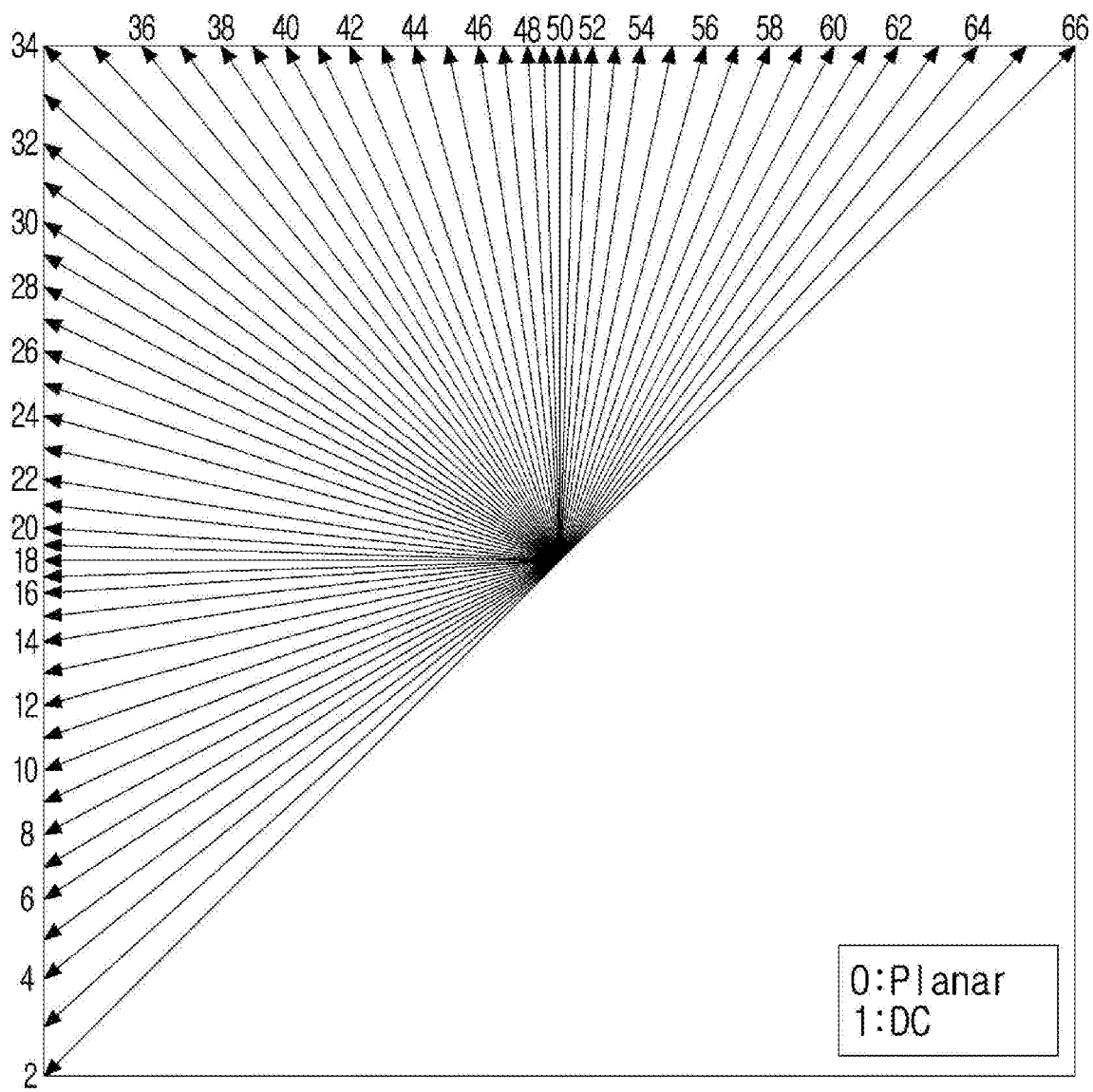
FIG. 4 is an exemplary diagram illustrating an intra prediction mode according to an embodiment of the present invention.

FIG. 4 is an exemplary diagram illustrating an intra prediction mode according to an embodiment of the present invention.

Referring to FIG. 4, it is explained assuming that 67 prediction modes are configured as a prediction mode candidate group for intra prediction and 65 of which are directional modes and 2 of which are non-directional modes (DC, Planar). However, it may not be limited to this, and various configurations may be possible. Herein, the directional mode may be divided into slope (e.g., dy/dx) or angle information (degree). In addition, all or part of the prediction modes may be included in a prediction mode candidate group of a luminance component or a chrominance component, and other additional modes may be included in the prediction mode candidate group.

In the present invention, a direction of a directional mode may mean a straight line, and a curved directional mode may also be configured as a prediction mode. In addition, in the case of a non-directional mode, it may include a DC mode for obtaining a prediction block with the average (or weighted average, etc.) of pixels of adjacent neighboring blocks (for example, left, top, top left, top right, and bottom left blocks) of the current block, and a Planar mode for obtaining a prediction block through linear interpolation of pixels of the neighboring blocks, etc.

Herein, in the DC mode, a reference pixel used for generating the prediction block may be obtained from blocks grouped in various combinations such as left, top, left+top, left+bottom left, top+top right, left+top+bottom left+top right, etc. In addition, a block position at which the reference pixel is obtained may be determined according to encoding/decoding settings defined by an image type, color component, block size/shape/position, and the like.

Herein, in the planar mode, a pixel used for generating a prediction block may be obtained in a region composed of a reference pixel (e.g., left, top, top left, top right, bottom left, or the like.) and a region not composed of a reference pixel (e.g., right, bottom, bottom right, etc.). In the case of a region not composed of a reference pixel(that is, it is not encoded), it can be obtained implicitly by using one or more pixels(for example, copy as it is, weighted average, etc.) in a region composed of a reference pixel, or information on at least one pixel in the region not composed of the reference pixel may be generated explicitly. Therefore, a prediction block may be generated using the region composed of the reference pixel and the region not composed of the reference pixel as described above.

Figure 5:
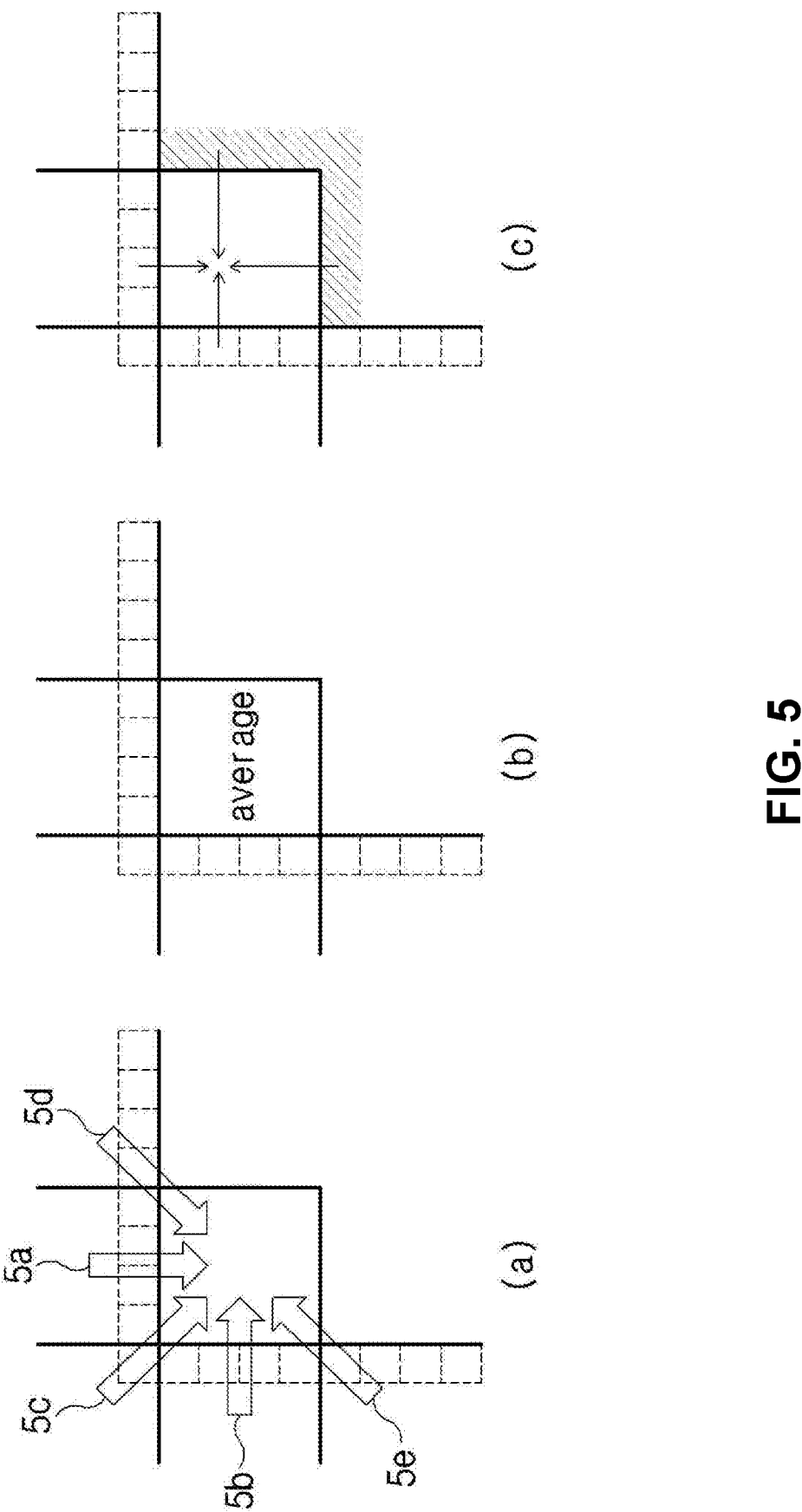
FIG. 5 is a conceptual diagram illustrating intra prediction for a directional mode and a non-directional mode according to an embodiment of the present invention.

FIG. 5 is a conceptual diagram illustrating intra prediction for a directional mode and a non-directional mode according to an embodiment of the present invention.

Referring to (a) of FIG. 5, intra prediction according to modes in the vertical (5a), horizontal (5b), and diagonal (5c to 5e) directions is illustrated. Referring to (b) of FIG. 5, intra prediction according to the DC mode is illustrated. Referring to (c) of FIG. 5, intra prediction according to the planar mode is illustrated.

In addition to the above description, an additional non-directional mode may be included. In the present invention, linear directional modes and non-directional modes of a DC mode and a planar mode are mainly described, but a change to other cases may also be applied.

FIG. 4 may be prediction modes that are fixedly supported regardless of a size of a block. In addition, prediction modes supported according to a block size may be different from FIG. 4.

For example, the number of prediction mode candidate groups may be adaptive (e.g., an angle between the prediction modes is equally spaced, but the angle is set differently. the number of the directional modes is 9, 17, 33, 65, 129, etc.), or the number of prediction mode candidate groups may be fixed, but may have different configurations (e.g., directional mode angle, non-directional type, etc.).

In addition, FIG. 4 may be prediction modes that are fixedly supported regardless of a block type. In addition, prediction modes supported according to a block type may be different from FIG. 4.

For example, the number of prediction mode candidate groups may be adaptive (e.g., set the number of prediction modes derived from the horizontal or vertical direction depending on the horizontal/vertical ratio of the block larger or shorter), or the number of prediction mode candidate groups may be fixed, but may have different configurations (e.g., set the prediction modes derived from the horizontal or vertical direction depending on the horizontal/vertical ratio of the block more specifically).

Alternatively, prediction modes of the longer block length may support a larger number, and prediction modes of the shorter block length may support a smaller number. In the case of a long block, a prediction mode interval may support a mode located on the right side of mode 66 (e.g., a mode having an angle of +45 degrees or more based on the 50th mode, that is, a mode having a number such as 67 to 80) or a mode located on the left side of mode 2 (e.g., a mode having an angle of −45 degrees or more based on the 18th mode. that is, a mode having a number such as −1 to −14) in FIG. 4. This may be determined according to the ratio of the horizontal length to the vertical length of the block, and vice versa.

In the present invention, a prediction mode is mainly described as a case where the prediction mode is a fixedly supported prediction mode (regardless of any encoding/decoding element) as shown in FIG. 4, but it may also be possible to set an adaptively supported prediction mode according to encoding settings.

In addition, when classifying prediction modes, horizontal and vertical modes (18 and 50 modes), and some diagonal modes (Diagonal up right <2>, Diagonal down right <34>, Diagonal down left <66>, etc.) can be a standard, and this may be a classification method performed based on some directionality (or angle. 45 degrees, 90 degrees, etc.).

In addition, some modes (2 and 66 modes) located at both ends of the directional mode may be a mode that is the basis for the prediction mode classification, which is an example that is possible when the intra prediction mode is configured as illustrated in FIG. 4. That is, when a prediction mode configuration is adaptive, an example in which the reference mode is changed may also be possible. For example, mode 2 can be replaced by a mode having a number less than or greater than 2 (−2, −1, 3, 4, etc.), or mode 66 can be replaced by a mode having a number less than or greater than 66 (64, 66, 67, 68, etc.).

In addition, an additional prediction mode for color components may be included in a prediction mode candidate group. The following describes a color copy mode and a color mode as examples of the prediction mode.

(Color Copy Mode)

A prediction mode related to a method of obtaining data for generating a prediction block from regions located in different color spaces may be supported.

For example, a prediction mode for a method of acquiring data for generating a prediction block in another color space using a correlation between color spaces may be an example of this.

Figure 6:
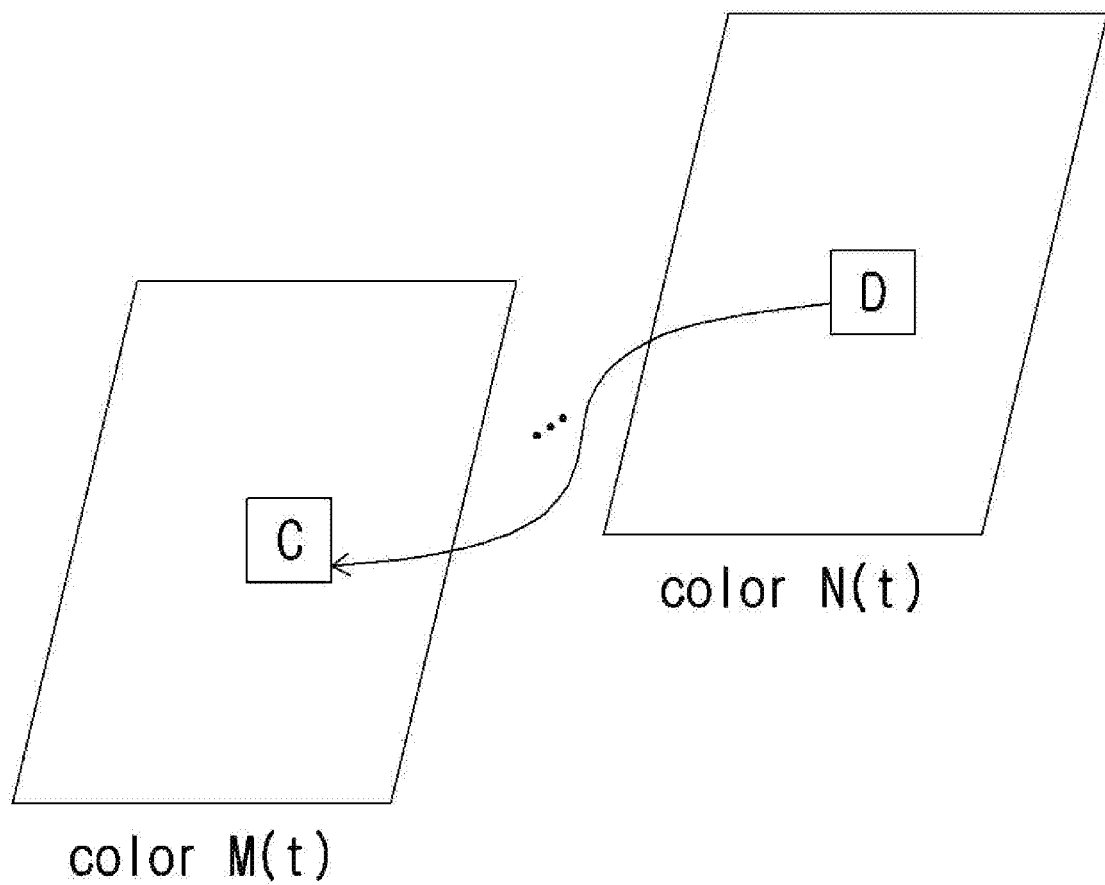
FIG. 6 is a conceptual diagram illustrating intra prediction regarding a color copy mode according to an embodiment of the present invention.

FIG. 6 is a conceptual diagram illustrating intra prediction regarding a color copy mode according to an embodiment of the present invention. Referring to FIG. 6, the current block C of the current space M may perform prediction using data of a corresponding region D of a different color space N at the same time t.

In this case, a correlation between color spaces may refer to a correlation between Y and Cb, Y and Cr, and Cb and Cr when YCbCr is taken as an example. That is, in the case of the chrominance component (Cb or Cr), a reconstructed block of the luminance component Y corresponding to the current block can be used as a prediction block of the current block (chrominance vs. luminance is a default setting of an example described later). Alternatively, a reconstructed block of some chrominance component (Cb or Cr) corresponding to the current block of some chrominance component (Cr or Cb) may be used as a prediction block of the current block.

Herein, in some color formats (e.g., YCbCr 4:4:4, etc.), a region corresponding to the current block may have the same absolute position in each image. Alternatively, in some color formats (e.g., YCbCr 4:2:0, etc.), relative positions in each image may be the same. The corresponding position may be determined according to the ratio of the horizontal length to the vertical length according to a color format, and corresponding pixels in a color space different from pixels of the current image may be obtained by multiplying or dividing each component of the coordinates of the current pixel by a ratio of the horizontal length to the vertical length according to a color format.

For convenience of description, the description will be mainly focused on the case of some color formats (4:4:4), but it should be understood that the location of the corresponding region of other color space can be determined according to the ratio of the horizontal length to the vertical length according to the color format.

In the color copy mode, a reconstructed block of a different color space may be used as a prediction block or a block obtained by considering a correlation between color spaces may be used as a prediction block. The block obtained by considering the correlation between color spaces means a block that can be obtained by performing correction on an existing block. Specifically, in the formula of $\{P=a*R+b\}$, a and b mean values used for correction, and R and P mean values obtained in different color spaces and prediction values of the current color space, respectively. Herein, P means a block obtained by considering the correlation between color spaces.

In this example, it is assumed that data obtained by using a correlation between color spaces is used as a prediction value of the current block, but it may also be possible when the data is used as a correction value applied to the prediction value of the existing block. That is, the prediction value of the current block can be corrected using a residual value of a different color space.

In the present invention, it is assumed on the assumption of the former case, but the present invention may not be limited thereto, and the same or changed application to a case that the data is used as a correction value may be applicable.

In the color copy mode, whether to support it explicitly or implicitly may be determined according to encoding/decoding settings. Herein, the encoding/decoding settings may be defined according to one or a combination of two or more of an image type, color component, block position/size/shape, and block width/length ratio. In addition, in an explicit case, related information may be included in a unit of a sequence, picture, slice, or tile. In addition, depending on encoding/decoding settings, whether the color copy mode is supported may be determined implicitly in some cases, and related information may be explicitly generated in some cases.

In the color copy mode, correlation information (a, b, etc.) between color spaces may be explicitly generated or implicitly obtained according to encoding/decoding settings.

In this case, a region to be compared (or referenced) to obtain correlation information may be the current block (C in FIG. 6) and a corresponding region (D in FIG. 6) of a different color space. Alternatively, it may be an adjacent region (left, top, top left, top right, bottom left blocks, etc., of C in FIG. 6) of the current block and an adjacent region (left, top, top left, top right, bottom left blocks, etc., of D in FIG. 6) of a corresponding region of a different color space.

In the above description, in the former case, since correlation information must be obtained directly using data of a block corresponding to the current block, it may correspond to an example of explicitly processing related information. That is, it may be a case in which correlation information should be generated because the data of the current block has not yet been coded. In the latter case, since the correlation information can be obtained indirectly using data of an adjacent region of a block corresponding to an adjacent region of the current block, this may correspond to an example of implicitly processing related information.

In summary, in the former case, correlation information is obtained by comparing the current block and the corresponding block, and in the latter case, correlation information is obtained by comparing regions adjacent to the current block and the corresponding block, respectively. In addition, data obtained by applying correlation information to the corresponding block may be used as a prediction pixel of the current block.

Herein, in the former case, the correlation information can be encoded as it is, or the correlation information obtained by comparing adjacent regions can be used as a predictive value to encode information about the difference. The correlation information may be information that can occur when a color copy mode is selected as a prediction mode.

Herein, the latter case can be understood as an example of an implied case that there is no additionally generated information except that a color copying mode is selected as an optimal mode in the prediction mode candidate group. That is, this may be an example possible under a configuration in which one correlation information is supported.

In a setting in which two or more correlation information is supported, selection information for the correlation information may be required in addition to the color copy mode being selected as the optimal mode. As in the above example, a configuration in which an explicit case and an implicit case are mixed may also be possible according to encoding/decoding settings.

In the present invention, a description will be given focusing on the case where correlation information is obtained indirectly, and the obtained correlation information may be N or more (N is an integer of 1 or more such as 1, 2, 3). Setting information on the number of correlation information may be included in a unit such as a sequence, picture, slice, tile, and the like. It should be understood that in some of the examples described below, when two or more correlation information is supported, it may have the same meaning as when two or more color copy modes are supported.

Figure 7:
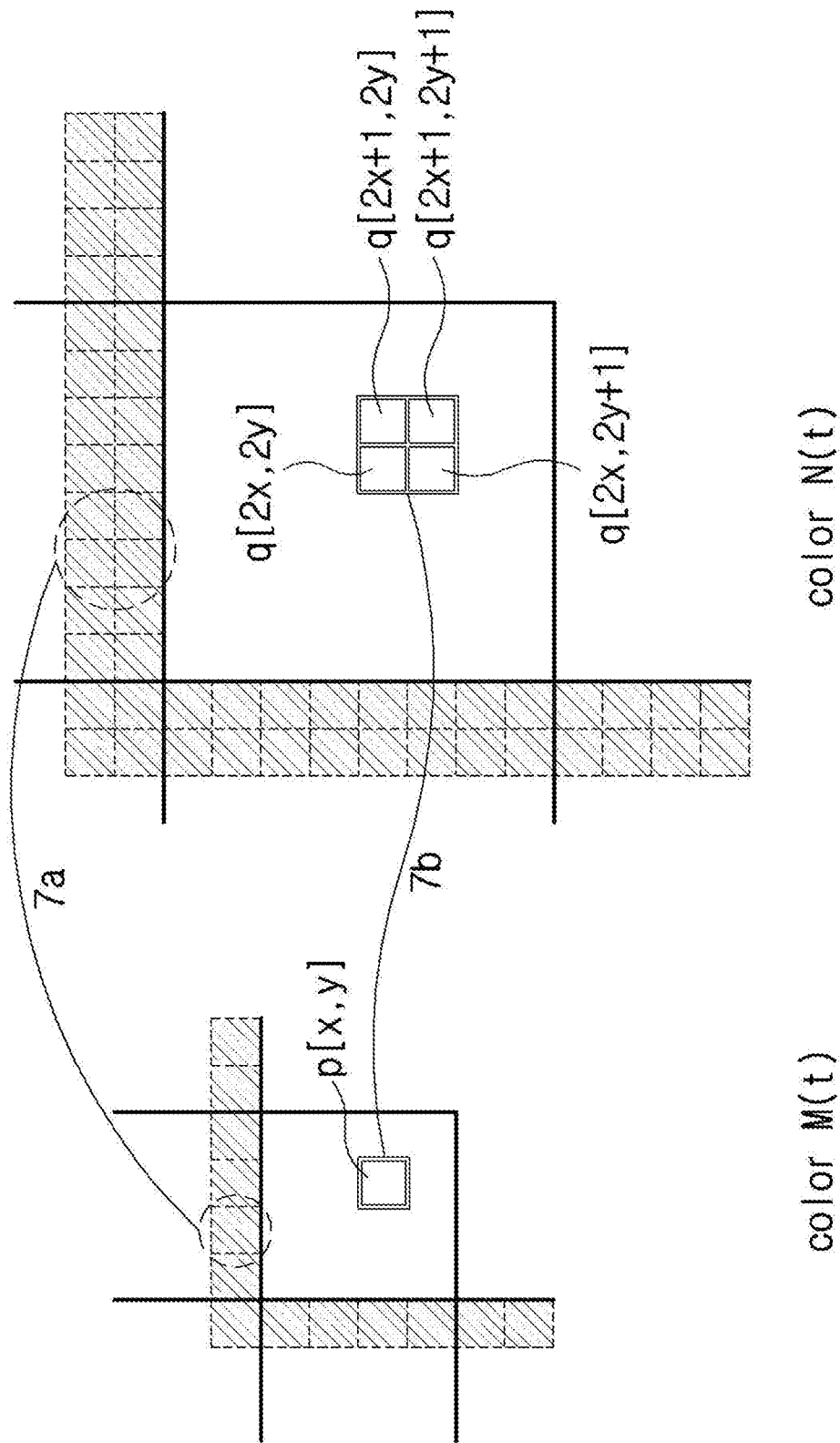
FIG. 7 is an exemplary diagram illustrating a corresponding block of each color space and a region adjacent thereto in relation to a color copy mode according to an embodiment of the present invention.

FIG. 7 is an exemplary diagram illustrating a corresponding block of each color space and a region adjacent thereto in relation to a color copy mode according to an embodiment of the present invention. Referring to FIG. 7, examples of pixel-to-pixel correspondence (p and q) in the current color space (M) and the different color space (N) are shown, and it may be understood as a case where it may occur in some color formats (4:2:0). In addition, the corresponding relationship (7a) for obtaining correlation information and the corresponding relationship (7b) for applying a prediction value can be confirmed.

The following continues the description related to obtaining correlation information in a color copy mode. In order to obtain correlation information, pixel values of pixels in a predetermined region (all or part of regions adjacent to the current block and a block corresponding to the current block) of each color space may be compared (or used), (i.e., 1:1 pixel value comparison process is performed). In this case, the pixel value to be compared can be obtained based on a corresponding pixel position in each color space. The pixel value may be a value derived from at least one pixel in each color space.

For example, in some color formats (4:4:4), a pixel value of one pixel in a chrominance space and a pixel value of one pixel in a luminance space may be used as pixel values corresponding to a correlation information acquisition process. Alternatively, in some color formats (4:2:0), a pixel value of one pixel in the chrominance space and a pixel value derived from one or more pixels in the luminance space may be used as pixel values corresponding to the correlation information acquisition process.

Specifically, in the former case, p [x, y] of a chrominance space can be compared with q [x, y] of a luminance space. In this case, as a pixel value, a brightness value of one pixel may be used as it is. In the latter case, p [x, y] in the chrominance space may be compared with q [2x, 2y], q [2x, 2y+1], q [2x+1, 2y], q [2x+1, 2y+1], etc. in the luminance space.

Herein, since the 1:1 pixel value comparison has to be performed, in the case of the luminance space, one of a plurality of pixels may be used as a value for comparing a pixel value of a chrominance pixel. That is, a brightness value of one pixel among the plurality of pixels is used as it is. Alternatively, one pixel value may be derived from two or more pixels (two to four) among the plurality of pixels and used as a value to be compared. That is, a weighted average (weights may be equally allocated or non-uniformly allocated to each pixel) may be applied to two or more pixels.

When a plurality of corresponding pixels exist as in the above example, a pixel value of a predetermined pixel or a pixel value derived from two or more pixels may be used as a value to be compared. In this case, one of the two methods for deriving a pixel value to be compared in each color space according to encoding/decoding settings may be used alone or in combination.

The following may be a description on the assumption that a pixel value of one pixel is used for comparison in a current color space, and one or more pixels in other color spaces can be used to derive a pixel value. For example, assume that the color format is YCbCr 4:2:0, the current color space is a chrominance space, and the other color space is a luminance space. The method for deriving the pixel value will be described focusing on different color spaces.

For example, it may be determined according to a shape of a block (ratio of the horizontal length to the vertical length). As a detailed example, p [x, y] of a chrominance space adjacent to the longer side of the current block (or a block to be predicted) may be compared with q [2x, 2y] of a luminance space, and p [x, y] of the chrominance space adjacent to the shorter side can be compared with the average of q [2x, 2y] and q [2x+1, 2y] in the luminance space.

In this case, adaptive settings such as the above may be applied to some block types (rectangular) regardless of a ratio of the horizontal length to the vertical length or may be applied only when the ratio of the horizontal length to the vertical length is greater than or equal to/greater than a certain ratio (k:1 or 1:k. k is 2 or more, e.g. 2:1, 4:1, etc.).

For example, it may be determined according to a size of a block. As a detailed example, when a size of the current block is greater than or equal to/greater than a certain size (M×N. For example, $2^m \times 2^n$ where m and n are integers greater than or equal to 1, such as 2 to 6), p [x, y] of a chrominance space can be compared with q [2x+1, 2y] of a luminance space, and when it is less than or equal to/less than a certain size, p [x, y] of the chrominance space can be compared with the average of q [2x, 2y], q [2x, 2y+1] of the luminance space.

Herein, one or more of the boundary values for size comparison may be present, or adaptive settings such as two or more ($M_1 \times N_1$, $M_2 \times N_2$, etc.) may be possible.

The above examples are some cases that can be considered in terms of computational quantity, and examples of various modifications are possible, including cases opposite to the above examples.

For example, it may be determined according to a position of a block. As a detailed example, when the current block is located inside a preset region (assuming the largest coding block in this example), p [x, y] of a chrominance space can be compared with the average of q [2x, 2y], q [2x+1, 2y], q [2x, 2y+1], q [2x+1, 2y+1] of a luminance space, and when located at the boundary of the preset region (assuming the top left boundary in this example), p [x, y] of the chrominance space may be compared with q [2x+1, 2y+1] of the luminance space. The preset region may mean a region set based on a slice, tile, block, or the like. Specifically, it can be obtained based on an integer multiple of a slice, tile, and the maximum coding/prediction/transformation block.

As another example, when a current block is located at some boundary of a region (assuming an top boundary in this example), P [x, y] of the chrominance space adjacent to some boundary (top) can be compared with q [2x+1, 2y+1] of the luminance space, and P [x, y] of the chrominance space adjacent to the interior (left) of the region may be compared with the average of q [2x, 2y], q [2x+1, 2y], q [2x, 2y+1], q [2x+1, 2y+1].

The above examples are some cases that can be considered in terms of memory, and examples of various modifications are possible including cases opposite to the above examples.

Through the above-described examples, various cases of pixel value derivation compared in each color space have been described. As in the above example, a pixel value derivation setting for obtaining the correlation information may be determined in consideration of various encoding/decoding elements as well as a size/shape/position of a block.

Through the above example, a case where one or two reference pixel lines of the block corresponding to the current block is used respectively as a region to be compared for obtaining correlation information has been described. That is, in the case of YCbCr 4:4:4, one reference pixel line is used respectively, and in other formats, in some color spaces, it means a case in which two reference pixel lines are used as in some color spaces <color N> in FIG. 7. In addition, it may not be limited to this, and examples of various modifications may be possible.

The following will be described with focus on a reference pixel line in the current color space, and it should be understood that in other color spaces, a reference pixel line may be determined according to a color format. That is, the same number of reference pixel lines may be used, or twice the number of reference pixel lines may be used.

In a color copying mode of the present invention, k reference pixel lines (where k is an integer of 1 or more such as 1 and 2) may be used (or compared) for obtaining correlation information. In addition, k reference pixel lines may be used fixedly or adaptively. In the following, various examples of setting the number of reference pixel lines will be described.

For example, it may be determined according to a shape of a block (ratio of the horizontal length to the vertical length). As a detailed example, two reference pixel lines adjacent to the longer side of the current block may be used, and one reference pixel line adjacent to the shorter side of the current block may be used.

In this case, the above may be applied to some block types (rectangular) regardless of the ratio of the horizontal length to the vertical length, or may be applied only when the horizontal/vertical length ratio is greater than or equal to a certain ratio (k:1 or 1:k. k is 2 or more, e.g. 2:1, 4:1, etc.). In addition, there are two or more boundary values for the ratio of the horizontal length to the vertical length, in the case of 2:1 or 1:2, two reference pixel lines adjacent to the longer side (or the shorter side) are used, and in the case of 4:1 or 1:4, extension may be possible, such as using three reference pixel lines adjacent to the longer side (or the shorter side).

In the above example, according to the ratio of the horizontal length to the vertical length, the longer side (or shorter side) uses s reference pixel lines, and the shorter side (or longer side) uses t reference pixel lines. In this case, it may be an example for a case where s is greater than or equal to t (i.e., s and t are integers greater than or equal to 1).

For example, it may be determined according to a size of a block. As a detailed example, two reference pixel lines may be used when a size of a current block is greater than or equal to/greater than a certain size (M×N. For example, $2^m \times 2^n$ where m and n are integers greater than or equal to 1 such as 2 to 6), and one reference pixel line may be used when the size is less than or equal to/less than a predetermined size.

Herein, one boundary value for size comparison may exist as in the above example, or adaptive settings such as two or more ($M_1 \times N_1$, $M_2 \times N_2$, etc.) may be possible.

For example, it may be determined according to a position of a block. As a detailed example, two reference pixel lines may be used when a current block is located inside a preset region (derivable from the previous description related to obtaining the correlation information. assuming the largest coding block in this example.), and one reference pixel line may be used when located at the boundary of the preset region (assuming the top left boundary in this example).

As another example, when a current block is located at some boundary of the region (assuming the top boundary in this example), one reference pixel line adjacent to some boundary (top) may be used, and two reference pixel lines adjacent to the inside (left) of the region may be used.

The above examples are some cases that can be considered in terms of accuracy and memory of correlation information, and examples of various modifications are possible, including cases opposite to the above examples.

Through the above-described examples, various cases of setting reference pixel lines used to obtain correlation information in each color space have been described. As in the above example, a reference pixel line setting for obtaining correlation information may be determined in consideration of various encoding/decoding elements as well as a size/shape/position of a block.

The following describes another case for a region to be compared (or referenced) to obtain correlation information. Pixels adjacent to positions of the left, top, top left, top right, bottom left, or the like adjacent to the current block in a current color space may be targeted for the region to be compared.

In this case, the region to be compared can be set including all of the blocks in the left, top, top left, top right, and bottom left positions. Alternatively, a reference pixel region may be configured by a combination of blocks at some locations. For example, the region to be compared can be configured by a combination of adjacent blocks such as left/top/left+top/left+top+top left/left+bottom left/top+top right/left+top left+bottom left/top+top left+top right/left+top+top right/left+top+bottom left block.

In summary, the region to be compared for obtaining correlation information may be configured as a predetermined region. Alternatively, it may be configured in various combinations of some regions. That is, the region to be compared may be fixed or adaptively configured according to encoding/decoding settings.

In the following, we will look at various examples of what direction adjacent regions are configured as reference regions of a current block in a current color space. Herein, it is assumed that in a corresponding block of a different color space, what direction adjacent regions are configured as reference regions is determined according to a configuration of a reference region of a current color block. In addition, it is assumed that the basic reference region is composed of the left and top blocks.

For example, it may be determined according to a shape of the block (horizontal/vertical length ratio). As a detailed example, if the current block is long horizontally, the left, top, and top right blocks may be set as reference regions, and if the current block is long vertically, the left, top, and bottom left blocks may be set as reference regions.

In this case, the above may be applied to some block shapes (rectangular) regardless of a horizontal/vertical length ratio, or may be applied only when the horizontal/vertical length ratio is greater than or equal to/greater than a certain ratio (k:1 or 1:k. k is 2 or more, e.g. 2:1, 4:1, etc.). In addition, there are two or more boundary values for the horizontal/vertical length ratio, in the case of 2:1 (or 1:2), the left, top, and top right (or the left, top, and bottom left) blocks are set as reference regions, and in the case of 4:1 (or 1:4), an extension such as the top and top right (or the left and bottom left) blocks may be set as reference regions.

For example, it may be determined according to a size of a block. As a detailed example, when a size of a current block is greater than or equal to/greater than a certain size (M×N. For example, $2^m \times 2^n$ where m and n are integers greater than or equal to 1 such as 2 to 6), the left and top blocks may be set as reference regions, and when the size of the current block is less than or equal to/less than the certain size, the left, top, and top left blocks may be set as reference regions.

In this case, one boundary values for size comparison may be present, or adaptive settings such as two or more ($M_1 \times N_1$, $M_2 \times N_2$, etc.) may be possible.

For example, it may be determined according to a position of a block. As a detailed example, when a current block is located inside a preset region (derivable from the previous description related to obtaining correlation information. assuming the largest coding block in this example.), the left, top, top left, top right, and bottom left blocks are set as reference regions, and when the current block is located at the boundary (assuming the top left boundary in this example) of the preset region, the left and top blocks are set as reference regions.

As another example, when a current block is located at some boundary (assuming the top boundary in this example) of the region, except for blocks adjacent to some boundary (top boundary), the left and bottom left blocks adjacent to the region may be set as reference regions. That is, the left and bottom left blocks may be set as reference regions.

The above examples are some cases that can be considered in terms of computational quantity, memory, and the like, and examples of various modifications are possible, including cases opposite to the above examples.

Through the above-described examples, various cases of setting reference regions used to obtain correlation information in each color space have been described. As in the above example, the reference region setting for obtaining correlation information may be determined in consideration of various encoding/decoding elements as well as a size/shape/location of a block.

In addition, the region to be compared may be a pixel adjacent to the current block in the current color space. Herein, all of the reference pixels may be used to obtain correlation information, or some of them may be used.

For example, when a current block (based on color M in FIG. 7) is a block having a pixel range of (a, b) to (a+7, b+7) (i.e., 8×8), it is assumed that the region to be compared (because the corresponding block can be explained according to a color format, it is omitted) is one reference pixel line of the left and top blocks of the current block.

In this case, all pixels within the range of (a, b−1) to (a+7, b−1) and (a−1, b) to (a−1, b+7) may be included in the region to be compared. Alternatively, (a, b−1), (a+2, b−1), (a+4, b−1), (a+6, b−1), and (a−1, b), (a−1, b+2), (a−1, b+4), (a−1, b+6), which are some pixels in the above range, may be included. Alternatively, (a, b−1), (a+4, b−1), and (a−1, b), (a−1, b+4), which are some pixels in the above range, may be included.

The above example may be applicable for the purpose of reducing the amount of computational quantity required to obtain correlation. Various encoding/decoding elements such as a size/shape/position of a block may be considered in a setting of reference pixel sampling of the compared region for obtaining correlation information together with the many examples already described above. In addition, examples of related applications from the previous example can be derived, and thus detailed description is omitted.

Through the various examples described above, various elements (derivation of a corresponding pixel value, number of reference pixel lines, reference region direction setting, reference pixel sampling, etc.) influencing acquisition of correlation information were examined. A number of different cases may be possible where the above examples alone or in combination affect the acquisition of correlation information.

The above description can be understood as a preset process for obtaining one correlation information. In addition, as already mentioned, one or more correlation information may be supported according to encoding/decoding settings. In this case, two or more correlation information may be supported by placing two or more of preset settings (that is, a combination of elements affecting the acquisition of the correlation information).

In summary, parameter information based on correlation information can be derived from an adjacent region of a current block and an adjacent region of a corresponding block. That is, at least one parameter (e.g., <a1, b1>, <a2, b2>, <a3, b3>, etc.) may be generated based on the correlation information, and it can be used as a value that is multiplied or added to a pixel of a reconstructed block in a different color space.

The following continues a description of a linear model applied in a color copy mode. Prediction based on the following linear model can be performed by applying the parameters obtained through the above process.

$$\text{pred\_sample\_}C(i,j) = a \times \text{rec\_sample\_}D(i,j) + b \quad \text{[Equation 1]}$$

In the above equation, pred_sample_C means a prediction pixel value of a current block in a current color space, and rec_sample_D means a reconstructed pixel value of a corresponding block in another color space. a and b can be obtained by minimizing regression error between an adjacent region of the current block and an adjacent region of the corresponding block, and can be calculated by the following equation.

$$a = \frac{N \times \Sigma(D(n) \times C(n)) - \Sigma D(n) \times \Sigma C(n)}{N \times \Sigma(D(n) \times C(n)) - \Sigma D(n) \times \Sigma C(n)} \quad \text{[Equation 2]}$$

$$b = \frac{\Sigma C(n) - a \times \Sigma D(n)}{N}$$

In the above equation, D(n) means an adjacent region of the corresponding block, C(n) means an adjacent region of the current block, and N means a value (in this example, it is assumed that it is twice the minimum value of the horizontal or vertical length.) set based on the horizontal or vertical length of the current block.

In addition, various methods such as a Simplified Straight-Line Equation for obtaining correlation information based on the minimum and maximum values of adjacent regions of each color space can be used. In this case, as a model for obtaining correlation information, one preset model may be used, or one of a plurality of models may be selected. Herein, the meaning of selecting one of the plurality of the models means that model information may be considered as encoding/decoding elements for parameter information based on correlation information. That is, when a plurality of parameters are supported, it may mean that the remaining correlation information related settings may be classified into different parameter information according to different models for obtaining correlation even though they are the same.

In some color formats (if not 4:4:4), one pixel of a current block may correspond to one or more (2, 4, etc.) pixels of a corresponding block. For example, in the case of 4:2:0, p [x, y] in a chrominance space may correspond to q [2x, 2y], q [2x, 2y+1], q [2x+1, 2y], q [2x+1, 2y+1, etc. in a luminance space.

For one prediction pixel value, one pixel value may be derived from a pixel value (or prediction value) of a predetermined pixel or two or more pixels among the corresponding plurality of pixels. Depending on encoding/decoding settings, various cases may be possible, and a detailed description thereof will be omitted because a related description can be derived from a section on deriving a corresponding pixel value to obtain correlation information.

(color mode)

A prediction mode related to a method of obtaining a prediction mode for generating a prediction block from regions located in different color spaces may be supported.

For example, a prediction mode for a method of obtaining a prediction mode for generating a prediction block in another color space using correlation between color spaces may be an example. That is, a color mode may be a mode that is adaptively determined according to a prediction mode of a block corresponding to a different color space by using existing prediction directions and methods, rather than having any specific prediction direction or prediction method.

In this case, it may be possible that various color modes are obtained according to a block division setting.

For example, in a setting (i.e., when a block division of a luminance component is explicitly determined) in which block division for some color components (chrominance) is implicitly determined according to a result of block division for some color components (luminance), one block of some color components (chrominance) may correspond to one block of some color spaces (luminance). Therefore, (assuming 4:4:4. for other formats, explanation of this example can be derived depending on the ratio of the horizontal length to the vertical length) if a current block (chrominance) has a pixel range of (a, b) to (a +m, b+n), even if it points to any pixel position within the pixel range of (a, b) to (a +m, b+n) of the corresponding block (luminance), since it points to one block, one prediction mode may be obtained in a block including the corresponding pixel.

Alternatively, in the case where individual block division is supported according to each color component (i.e., block division of each color space is explicitly determined), one block of some color components (chrominance) may correspond to one or more blocks of some color spaces (luminance). Therefore, even if the current block (chrominance) has the same pixel range as the above example, the corresponding block (luminance) may be composed of one or more blocks according to the result of block division. Therefore, different prediction modes (i.e., one or more modes) may be obtained from corresponding blocks indicated by the corresponding pixels according to the position of pixels within a pixel range of the current block.

If one color mode is supported by intra prediction mode candidate groups for chrominance components, it can be set where to get the prediction mode from the corresponding block.

For example, a prediction mode may be obtained at the location of the center-top left-top right-bottom left-bottom right, etc. of a corresponding block. That is, if a prediction mode is obtained in the above order, but the corresponding block is not available (e.g., the encoding mode is inter, etc.), a prediction mode of a position corresponding to the next order can be obtained. Alternatively, a prediction mode having a high frequency (two or more times) in the blocks at the location may be obtained.

Alternatively, when supporting multiple color modes, it is possible to set where to obtain a prediction mode according to the priority. Alternatively, a combination may be possible in which some prediction modes are obtained according to the priority and some prediction modes having high frequencies in blocks at the location are obtained. Herein, the priority is an example, and examples of various modifications may be possible.

A color mode and a color copy mode may be prediction modes that can be supported for chrominance components. For example, a prediction mode candidate group for chrominance components may be configured including horizontal, vertical, DC, planar, diagonal mode, etc. Alternatively, an intra prediction mode candidate group may be configured including the color mode and the color copy mode.

That is, a configuration may be directional+non-directional+color mode or directional +non-directional+color copy mode, or directional+non-directional+color mode+ color copy mod. In addition, a mode for additional chrominance components may be included and configured.

Whether to support a color mode and a color copy mode may be determined according to encoding/decoding settings, implicit or explicit processing may be possible in this case. Alternatively, a mixed configuration of explicit+implicit processing may be possible. This includes detailed settings related to the color mode and color copy mode (for example, the number of supported modes, etc.), so that implicit or explicit processing may be possible.

For example, the related information may be explicitly included in a unit of a sequence, picture, slice, tile, block, or the like, or may be determined implicitly according to various encoding/decoding elements (for example, image type, block location, block size, block shape, block width/length ratio, etc.). Alternatively, depending on the encoding/decoding elements, some conditions may be implicitly determined, or related information may be explicitly generated in some conditions.

Figure 8:
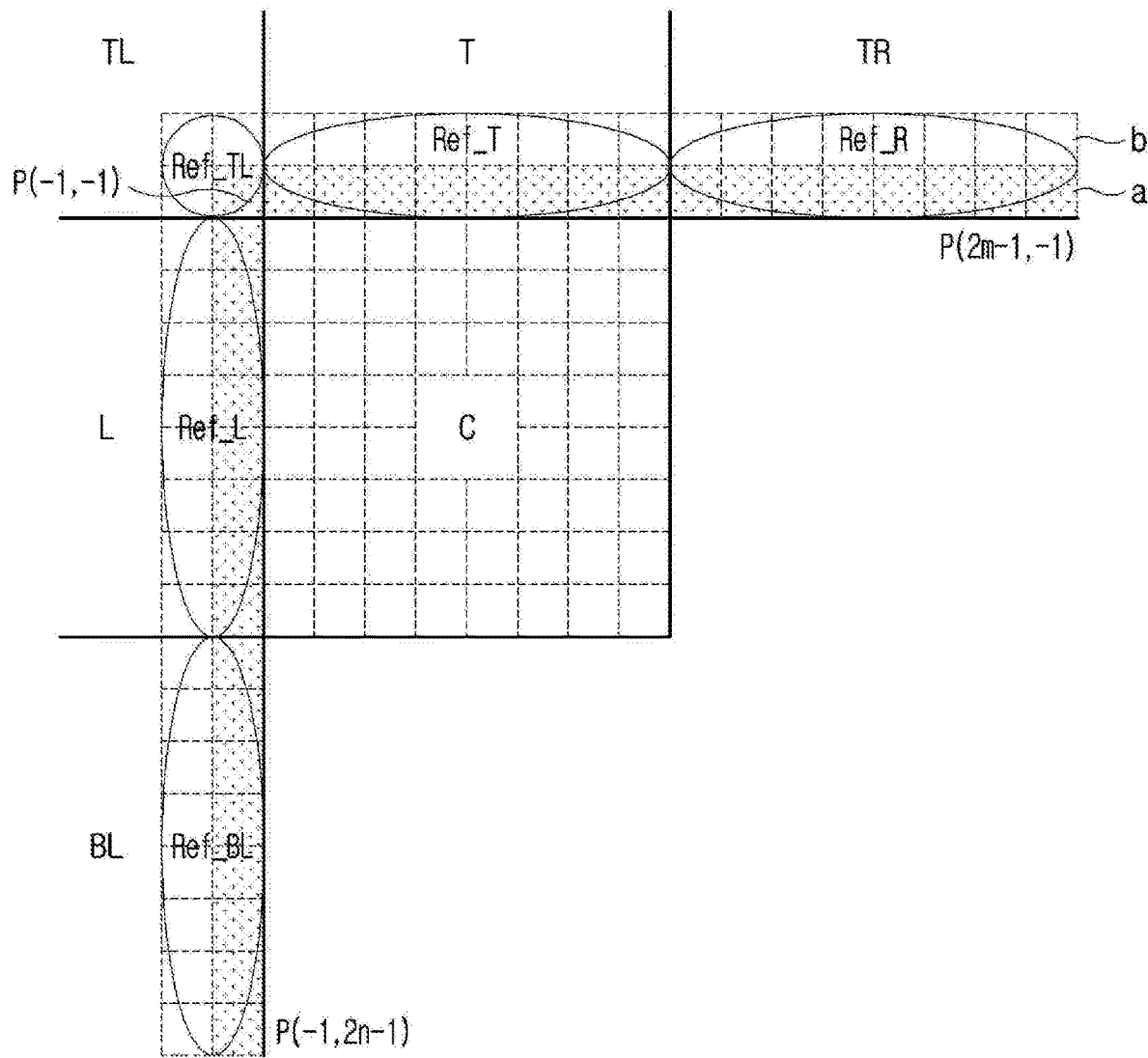
FIG. 8 is an exemplary diagram for explaining a reference pixel configuration used for intra prediction according to an embodiment of the present invention.

FIG. 8 is an exemplary diagram for explaining a reference pixel configuration used for intra prediction according to an embodiment of the present invention. A size and shape (M×N) of a prediction block may be obtained through a block division unit.

Block range information defined as the minimum block and maximum block size for intra prediction may include related information in a unit such as a sequence, picture, slice, tile, etc. In general, the horizontal and vertical lengths are specified (for example, 32×32, 64×64, etc.), so that the size information may be set, but the size information may also be set in the form of the product of the horizontal and vertical lengths. For example, when the product of horizontal and vertical is 64, the minimum block size may correspond to 4×16, 8×8, 16×4, or the like.

In addition, by specifying the horizontal and vertical lengths, setting size information or setting size information in the form of a product may be mixed and used. For example, for the maximum block size, if the product of the horizontal and vertical lengths is 4096 and the maximum value of one of the two lengths is 64, 64×64 may correspond to the maximum block size.

As in the above example, in addition to the minimum block and maximum block size information, block division information is mixed to finally determine a size and shape of a prediction block. In the present invention, the prediction block must have the product of the horizontal and vertical lengths greater than or equal to s (for example, s is a multiple of 2, such as 16, 32) and one of the horizontal/vertical lengths greater than or equal to k (for example, k is 4, 8, etc.). In addition, although the horizontal and vertical lengths of the block may be defined under a setting equal to or less than v and w (e.g., v and w are multiples of 2, such as 16, 32, 64, etc.), respectively. In addition, it may not be limited thereto, and various block range settings may be possible.

Intra prediction may be generally performed in a unit of a prediction block, but may be performed in a unit of a coding block, transform block, or the like according to a setting of the block division unit. After checking block information, the reference pixel configuration unit may configure a reference pixel used for prediction of a current block. In this case, a reference pixel may be managed through temporary memory (for example, an array. 1st, 2nd array, etc.), generated and removed for each intra prediction process of a block, and the size of the temporary memory may be determined according to the configuration of the reference pixel.

In this example, it described assuming that the left, top, top left, top right, and bottom left blocks are used for prediction of a current block, but it may not be limited thereto, and a block candidate group having a different configuration may be used for prediction of the current block. For example, a candidate group of neighboring blocks for the reference pixel may be an example of following a raster or Z scan, and some of the candidate group may be removed according to a scan order or may be configured including other block candidates (For example, right, bottom, bottom right blocks, etc.).

In addition, if some prediction mode (color copy mode) is supported, some regions of different color spaces can be used for prediction of a current block, and it can also be considered as a reference pixel. The existing reference pixels (spatial adjacent regions of the current block) and the additional reference pixels may be managed as one or separately (for example, the reference pixel A and the reference pixel B. That is, the reference pixel memory may be separately named as if the temporary memory is used separately).

For example, the temporary memory of the basic reference pixel may have a size of <2×blk_width+2×blk_height+ 1> (based on one reference pixel line), and the temporary memory of the additional reference pixel may have a size of <blk_width ×blk_height> (when 4:4:4) (blk_width/2× blk_height/2 is required when 4:2:0). The temporary memory size is one example and is not limited thereto.

In addition, it may be managed as a reference pixel including adjacent regions of the current block to be compared (or referenced) to obtain correlation information and a corresponding block. That is, additional reference pixels may be managed according to a color copy mode.

In summary, an adjacent region of a current block may be included as a reference pixel for intra prediction of the current block, and a corresponding block of a different color space and its adjacent region may be included as a reference pixel according to the prediction mode. For convenience of description, a description will be given mainly of the case of a basic reference pixel configuration.

As illustrated in FIG. 8, reference pixels used for prediction of the current block may be configured as adjacent pixels (ref_L, Ref_T, Ref_TL, Ref_TR, Ref_BL in FIG. 8) of the left, top, top left, top right, and bottom left blocks. In this case, the reference pixel is generally composed of pixels of the neighboring block closest to the current block (a in FIG. 8 as a reference pixel line), but other pixels (pixels in FIG. 8 and other outer lines) may also be configured in the reference pixel.

Pixels adjacent to a current block may be classified into at least one reference pixel line, and the pixel closest to the current block may be classified into ref 0 {e.g., pixels having a distance of 1 between a boundary pixel of the current block and the pixel. p(−1, −1) to p(2m−1, −1), p(−1,0) to p(−1, 2n−1)}, the next adjacent pixel to ref 1 {e.g., the distance between the boundary pixel of the current block and the pixel is 2. p(−2, −2) to p(2m, −2), p(−2, −1) to p (−2, 2n)}, and the next adjacent pixel to ref 2 {e.g., the distance between the boundary pixel of the current block and the pixel is 3. p(−3, −3) to p(2m+1, −3), p(−3, −2) to p(−3, 2n+1)}. That is, it can be classified as a reference pixel line according to a pixel distance adjacent to the boundary pixel of the current block.

Herein, the number of reference pixel lines supported may be N or more, and N may be an integer of 1 or more, such as 1 to 5. In this case, it is generally included in the reference pixel line candidate group sequentially from the reference pixel line closest to the current block, but is not limited thereto. For example, the candidate groups may be sequentially configured as <ref_0, ref_1, ref_2> when N is 3, or it may also be possible that the candidate group is configured with a configuration that excludes closest reference pixel lines or a non-sequential configuration such as <ref_0, ref_1, ref_3>, <ref_0, ref_2, ref_3>, <ref_1, ref_2, ref_3>.

Prediction may be performed using all reference pixel lines in the candidate group, or prediction may be performed using some reference pixel lines (one or more).

For example, one of a plurality of reference pixel lines may be selected according to encoding/decoding settings, and intra prediction may be performed using the reference pixel line. Alternatively, two or more of the plurality of reference pixel lines may be selected to use the corresponding reference pixel line (for example, a weighted average is applied to the data of each reference pixel line) to perform intra prediction.

Herein, the reference pixel line selection may be determined implicitly or explicitly. For example, in the implicit case, it means that it is determined according to encoding/decoding settings defined according to one or a combination of two or more elements such as an image type, color component, and a size/shape/position of a block. In addition, the explicit case means that reference pixel line selection information may be generated in a unit such as a block.

Although the present invention mainly describes a case in which intra prediction is performed using the closest reference pixel line, it should be understood that various embodiments described below may be applied to the same or similar application when multiple reference pixel lines are used.

The reference pixel configuration unit of the intra prediction of the present invention may include a reference pixel generation unit, a reference pixel interpolation unit, and a reference pixel filter unit, and may include all or part of the above configuration.

The available reference pixel and the unavailable reference pixel may be classified by checking the availability of the reference pixel in the reference pixel configuration unit. Herein, it is determined that the availability of the reference pixel is unavailable when at least one of the following conditions is satisfied.

For example, if any of the below cases are satisfied, it may be determined as unavailable: if it is located outside the picture boundary, if it does not belong to the same division unit (e.g., units that cannot be referenced to each other, such as slices and tiles, except for division units with a referenceable characteristic.) as the current block, and if encoding/decoding is not completed. That is, when none of the above conditions are satisfied, it can be determined as available.

In addition, it is possible to limit the use of the reference pixel based on encoding/decoding settings. For example, the use of the reference pixel may be limited according to whether limited intra prediction (e.g., constrained_intra_pred_flag) is performed, even if it is determined to be usable according to the above conditions. The limited intra prediction may be performed when error-resistant encoding/decoding is performed on an external factor such as a communication environment, or when a block referenced and reconstructed from another image is prohibited to be used as a reference pixel.

When the limited intra prediction is disabled (e.g., I picture type. or constrained_intra_pred_flag=0 in P or B picture type), all of the reference pixel candidate blocks may be available.

Alternatively, when the limited intra prediction is activated (for example, constrained_intra_pred_flag=1 in P or B image type), the reference pixel candidate block will be assumed as a condition for determining whether to use the reference pixel according to an encoding mode (intra or inter). In addition, the above condition may be determined according to various other encoding/decoding elements.

Since the reference pixel is composed of one or more blocks, when an availability of the reference pixel is confirmed and classified, it can be classified into three cases: <all usable>, <some usable>, and <not all usable>. In all cases other than the case of <all usable>, a reference pixel at an unavailable candidate block position may be filled or generated.

When a reference pixel candidate block is available, a pixel at a corresponding position may be included in a reference pixel memory of a current block. In this case, the pixel data may be copied as it is or may be included in the reference pixel memory through processes such as reference pixel filtering and reference pixel interpolation. In addition, when the reference pixel candidate block is unavailable, the pixel obtained through the reference pixel generation process may be included in the reference pixel memory of the current block.

The following is an example of generating a reference pixel at an unusable block location using various methods.

For example, a reference pixel may be generated using an arbitrary pixel value. Herein, the arbitrary pixel value may be one pixel value (e.g., the minimum value, maximum value, median value, etc. of the pixel value range.) belonging to the pixel value range (for example, a pixel value range based on a bit depth or a pixel value range according to a pixel distribution in a corresponding image). Specifically, it may be an example applied when all of the reference pixel candidate blocks are unavailable.

Alternatively, a reference pixel may be generated from a region in which image encoding/decoding is completed. Specifically, a reference pixel may be generated from at least one usable block adjacent to an unusable block. In this case, at least one of methods such as extrapolation, interpolation, and copying can be used.

After reference pixel configuration is completed in the reference pixel interpolation unit, a reference pixel in a decimal unit may be generated through linear interpolation of the reference pixel. Alternatively, the reference pixel interpolation process may be performed after the reference pixel filter process described below.

In this case, the interpolation process may not be performed in the case of horizontal, vertical, some diagonal modes (e.g., modes of 45 degrees difference in vertical/horizontal such as Diagonal top right, Diagonal bottom right, Diagonal bottom left mode. corresponding to mode 2, 34, and 66 in FIG. 4), non-directional mode, color copy mode, etc., and the interpolation process may be performed in other modes (other diagonal modes).

A pixel position (i.e., which decimal unit is interpolated. it is determined from ½ to 1/64, etc.) where interpolation is performed may be determined according to a prediction mode (e.g., directionality of the prediction mode, dy/dx, etc.) and positions of a reference pixel and a prediction pixel. In this case, one filter (e.g., assume a filter with the same equation used to determine filter coefficients or a length of filter taps. however, it is assumed that only the coefficients are adjusted according to the precision <for example, 1/32, 7/32, 19/32> of a decimal unit) may be applied regardless of the precision of a decimal unit, or one of a plurality of filters (e.g., assume a filter with a separate equation used to determine filter coefficients or a length of filter tabs.) may be selected and applied according to the decimal unit.

The former case may be an example of using an integer unit pixel as an input for interpolation of a decimal unit pixel, and the latter case may be an example of different input pixels step by step (for example, in the case of a ½ unit, integer pixels are used. in the case of a ¼ unit, integer and ½ unit pixels are used, etc.), but it is not limited thereto, and in the present invention, the former case will be mainly described.

For reference pixel interpolation, fixed filtering or adaptive filtering may be performed, and this may be determined according to encoding/decoding settings (for example, one or a combination of two or more of an image type, a color component, a block position/a size/a shape, a block width/height ratio, a prediction mode, etc.).

The fixed filtering may perform reference pixel interpolation using one filter, and the adaptive filtering may perform reference pixel interpolation using one of a plurality of filters.

Herein, in the case of the adaptive filtering, one of a plurality of filters may be determined implicitly or explicitly according to encoding/decoding settings. Herein, a type of a filter can be composed of a 4-tap DCT-IF filter, a 4-tap cubic filter, a 4-tap Gaussian filter, a 6-tap Wiener filter, and an 8-tap Kalman filter. In addition, it may also be possible to define different filter candidate groups supported according to color components (for example, some types of filters are the same or different, and a length of filter tabs is short or long, etc.).

The reference pixel filter unit may perform filtering on a reference pixel for the purpose of improving prediction accuracy by reducing remaining deterioration through an encoding/decoding process. The filter used in this case may be a low-pass filter, but is not limited thereto. Whether filtering is applied may be determined according to encoding/decoding settings (which can be derived from the above description). In addition, when filtering is applied, fixed filtering or adaptive filtering may be applied.

The fixed filtering means that reference pixel filtering is not performed or reference pixel filtering is applied using one filter. The adaptive filtering means that whether filtering is applied is determined according to encoding/decoding settings, and if there are two or more supported filter types, one of them can be selected.

In this case, a plurality of filters classified by various filter coefficients such as 3-tap filter like [1, 2, 1]/4, 5-tap filter like [2, 3, 6, 3, 2]/16, etc., filter tap lengths, and the like as the filter type may be supported.

The reference pixel interpolation unit and the reference pixel filter unit introduced in the reference pixel configuration step may be necessary components for improving prediction accuracy. The two processes may be independently performed, but a configuration in which the two processes are mixed may also be possible.

The prediction block generation unit may generate a prediction block according to at least one prediction mode, and use a reference pixel based on the prediction mode. In this case, depending on the prediction mode, the reference pixel may be used in a method (directional mode) such as extrapolation, and may be used in a method (non-directional mode) such as interpolation, average (DC), or copy.

Figure 9:
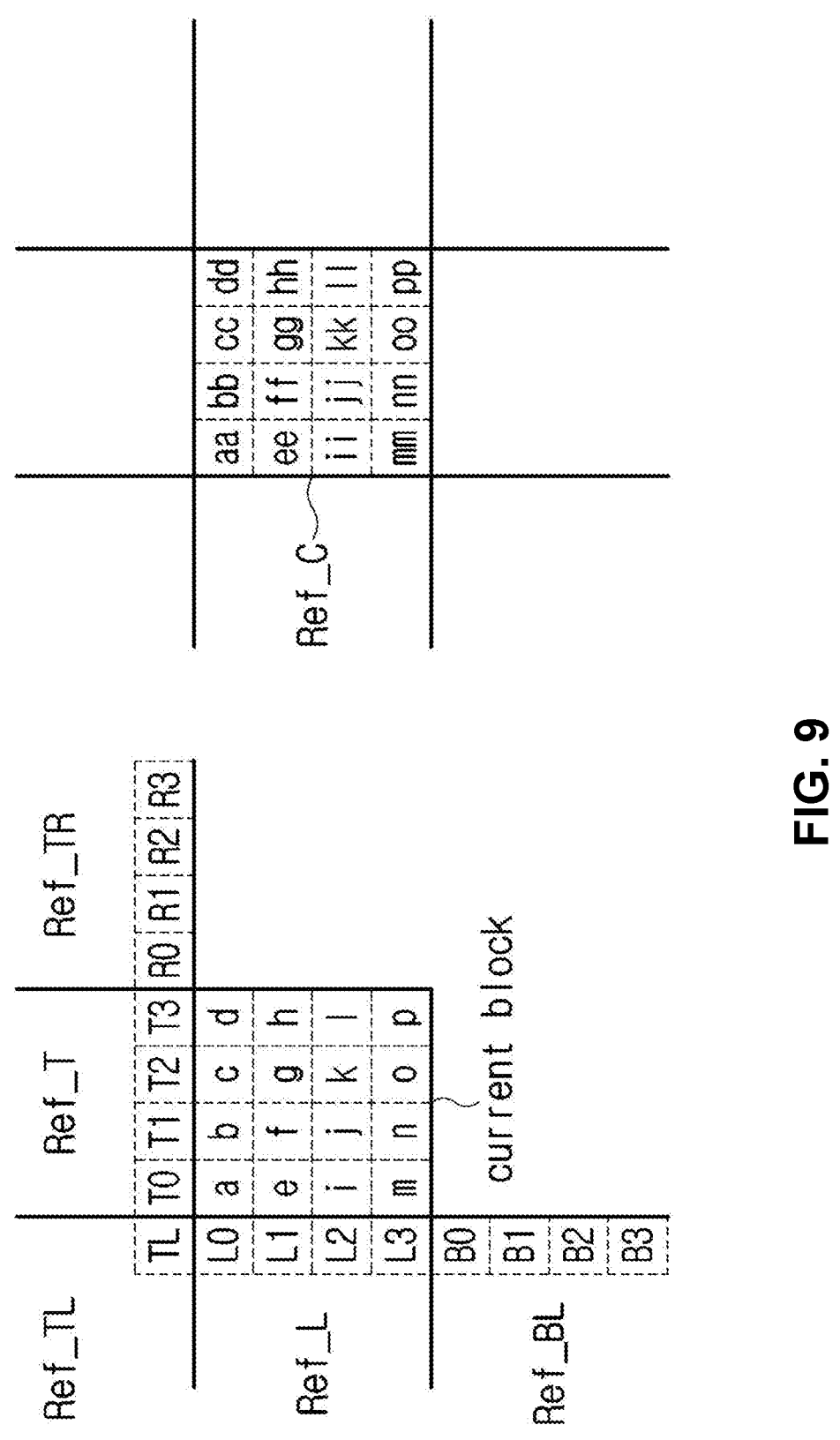

FIG. 9 is a conceptual diagram illustrating a block adjacent to a target block for intra prediction according to an embodiment of the present invention. Specifically, the left side of FIG. 9 represents a block adjacent to the current block in the current color space, and the right side represents a corresponding block in another color space.

The following describes reference pixels used according to the prediction mode.

In the case of the directional mode, reference pixels of the bottom left and left blocks (Ref_BL, Ref_L in FIG. 9) may be used for modes between horizontal and some diagonal modes (diagonal up right) (modes 2 to 17 in FIG. 4), reference pixels of the left block may be used for the horizontal mode, reference pixels of the left, top left, and top blocks (Ref_L, Ref_TL, Ref_T in FIG. 9) may be used for modes between horizontal and vertical modes (modes 19 to 49 in FIG. 4), reference pixels of the top block (Ref_L in FIG. 9) may be used for the vertical mode, and reference pixels of the top and top right blocks (Ref_T, Ref_TR in FIG. 9) may be used for modes between the vertical and some diagonal modes (Diagonal down left) (modes 51 to 66 in FIG. 4).

In addition, in the case of the non-directional mode, reference pixels located in one or more of the blocks of the bottom left, left, top left, top, and top right blocks (Ref_BL, Ref_L, Ref_TL, Ref_T, Ref_TR in FIG. 9) may be used. For example, it can be used for intra prediction in the form of various reference pixel combinations such as left, top, left+top, left+top+top left, left+top+top left+top right and bottom left, etc., and this may be determined according to the non-directional mode (DC, Planar, etc.). In the example to be described later, it is assumed that left+top blocks are used in the DC mode, and left+top+bottom left+top right blocks are used for prediction as a reference pixel in the planar mode.

In addition, in the case of a color copy mode, a reconstructed block (Ref C in FIG. 9) of another color space can be used as a reference pixel. In the example described later, it is assumed that a block corresponding to the current block is used for prediction as reference pixels.

In this case, reference pixels used for intra prediction may be classified into a plurality of concepts (or units). For example, reference pixels used for intra prediction may be classified into one or more categories, such as a first reference pixel and a second reference pixel. In this example, it is assumed that a reference pixel is classified into two categories.

In this case, the first reference pixel may be a pixel used directly for generating prediction values of a current block, and the second reference pixel may be a pixel used indirectly for generating prediction values of the current block.

Alternatively, the first reference pixel may be a pixel used to generate prediction values of all pixels of the current block, and the second reference pixel may be a pixel used to generate prediction values of some pixels of the current block.

Alternatively, the first reference pixel may be a pixel used to generate the first prediction value of the current block, and the second reference pixel may be a pixel used to generate the second prediction value of the current block.

Alternatively, the first reference pixel may be a pixel obtained by applying pre-processing (e.g., reference pixel filtering, etc.), and the second reference pixel may be a pixel obtained by not applying pre-processing.

Alternatively, the first reference pixel may be a pixel located in a region positioned at a starting point of a prediction direction of a current block (e.g., in a vertical mode, a top block corresponds to a starting point of a prediction direction), and the second reference pixel may be a pixel located in a region (e.g., may or may not be located at a starting point of a prediction direction) located regardless of a prediction direction of the current block.

The first reference pixel, the second reference pixel, and the like may be data necessary for intra prediction. In detail, the first reference pixel may be essential data that is basically required for intra prediction, and the other reference pixels may be optional data that helps to improve prediction accuracy.

In the present invention, the prediction block generation process may be based on using the first reference pixel, but it may also be possible to perform prediction using additional reference pixels. In this case, performing prediction using additional reference pixels may be referred to as prediction block (or pixel) correction.

In the present invention, the prediction block generation unit may be configured to further include a prediction block correction unit. Herein, the prediction block correction unit may be regarded as a step of performing correction on the prediction block according to a correction setting. In this case, the correction setting may be determined by a prediction mode, block information, and the like. In detail, it may be a configuration that the prediction block correction unit follows after the prediction block generation unit, but for convenience of description, assume that the prediction block generation unit includes the prediction block correction unit.

The reference pixel described through the above-described example may be the first reference pixel, and additionally, the second reference pixel may be involved in generating a prediction block. The following is a description of a reference pixel used according to a prediction mode.

In the directional mode, the second reference pixel may be used in addition to the first reference pixel. Specifically, the top left, top and top right blocks may be additionally used in modes between the horizontal and some diagonal modes (Diagonal up right), and the bottom left, top left, top and top right blocks may be additionally used in the horizontal mode. The bottom left and top right blocks may be additionally used in modes between the horizontal and vertical modes, and the bottom left, left, top left and top right blocks may be additionally used in the vertical mode. The bottom left, left, and top left blocks may be additionally used in modes between vertical and some diagonal modes (Diagonal down left).

In addition, in the non-directional mode, the second reference pixel may be used in addition to the first reference pixel. Specifically, in the DC mode, the bottom left, top left, and top right blocks may be additionally used, and in the planar mode, the top left block may be additionally used.

In addition, in the case of a color copy mode, the second reference pixel may be used in addition to the first reference pixel. In detail, the left, top, top left, top right, and bottom left blocks of the current block may be additionally used. Alternatively, the left, right, top, bottom, top left, top right, bottom left, and bottom right blocks of a corresponding block of a different color space may be additionally used.

In the above description, the adjacent region of the current block and the adjacent region of the corresponding block may be regions referenced to obtain correlation information of the color copy mode, and may be regions that are not directly involved in prediction of the current block. However, correction is performed for the purpose of improving the accuracy of prediction, which means that the region can be further used for prediction of the current block.

For example, since deterioration of block boundaries remains in the data of other color spaces, before the post-processing filter is applied, correction may be performed for the purpose of improving accuracy of a prediction block. Alternatively, even if it is obtained as the prediction data of the current block, since the discontinuous characteristics may be strong with an adjacent region of the current block, correction may be performed for the purpose of improving accuracy of a prediction block.

In the intra prediction of the present invention, the second reference pixel may be considered to include not only an encoded/decoded pixel but also a pixel in the current block (a prediction pixel in this example). That is, the first prediction value may be a pixel used to generate the second prediction value. In the present invention, a description will be given focusing on an example in which the encoded/decoded pixels are considered as the second reference pixel, but it may not be limited thereto, and an example of modification using pixels in which encoding/decoding is not completed may also be possible.

Generating or correcting a prediction block using a plurality of reference pixels may be a case performed for the purpose of compensating for the disadvantages of the existing prediction mode.

For example, the directional mode is a mode used for the purpose of performing prediction by reflecting a directionality of a corresponding block using some reference pixels (the first reference pixel), but it may not accurately reflect the directionality in the block and it may cause the prediction accuracy to decrease. In this case, when using to generate or correct a prediction block using an additional reference pixel (the second reference pixel), prediction accuracy may be increased.

To this end, in the example described below, a case in which a prediction block is generated using various reference pixels will be described, and even when terms such as the first and second reference pixels are not used, it may be derived and understood from the above definition.

Whether to support the generation of a prediction block using additional reference pixels (or prediction pixel or prediction block correction) is determined implicitly according to encoding/decoding settings, or information on whether it is supported may be explicitly included in a unit such as a sequence, picture, slice, and tile. When prediction pixel correction is supported, detailed settings (for example, information about applying correction. <when correction is applied> reference pixel information used for correction, a weight setting applied to a reference pixel, etc.) related to using additional reference pixels may be implicitly determined according to encoding/decoding settings, or may be explicitly determined in a unit of a picture, slice, tile, block, or the like. Alternatively, the explicit and implicit cases may be mixed according to encoding/decoding settings, and the above setting may be determined.

In this case, encoding/decoding settings may be defined according to one or a combination of two or more of an image type, color component, block size/shape/position, horizontal/vertical length ratio of block, prediction mode, and (prediction) pixel position.

In the examples described below, the case of implicit processing will be described, but the present invention may not be limited thereto, and examples of other modifications (explicit case or case of mixed use) may be possible.

Depending on a prediction mode, prediction blocks can be generated in various ways. Various cases of correction according to the prediction mode will be described through examples described below. In the example to be described later, the case of that a region including the main reference pixel (or the first reference pixel) is used in a prediction process and other reference pixels (or the second reference pixel) are used in the correction process will be mainly described. However, it should be understood that the case of that the main reference pixel used in the prediction process (first prediction) is also used in the correction process (second prediction) may not be separately mentioned, but may be implemented by being substituted or combined in the example described below.

In the following, the prediction according to the horizontal mode will be described.

In the horizontal mode in which the left block is used as a reference pixel (Ref_L in FIG. 9), a prediction block may be generated in a horizontal direction using adjacent pixels (L0 to L3) of the corresponding block.

In addition, a prediction block may be generated (or corrected) using a reference pixel (Ref_TL, Ref_T, Ref_TR in FIG. 9) adjacent to the current block corresponding to (or parallel to) the prediction direction. In detail, prediction values may be corrected using adjacent pixels (TL, T0 to T3, and R0 to R3) of the corresponding block.

For example, correction may be performed using one or more second reference pixels (TL, T1) corresponding to the current pixel (f) and the first reference pixel (L1). In detail, it may be a case where correction is performed by indirectly obtaining a change (f-L1) in a pixel value according to a distance difference (x component difference between f and L1) between a current pixel and a first reference pixel from second reference pixels (T1 and TL) (for example, T1-TL, etc.).

In this case, the distance difference between the second reference pixels may be some examples (T1 and TL), and various cases {For example, (T1−TL)/(R0−TL), (T1×2+T0+T2)−TL, etc.} in which pixel value changes (or slope information) of two or more pixels are applied may be possible.

In summary, reference pixels involved in generating prediction values of the current pixel (f) may include one or more preset pixels (L1, T1, TL) according to the position of the current pixel (x and y components. for example, x, y component values measured based on specific coordinates <coordinates of the top left block of the current block, such as a in FIG. 9 or TL in FIG. 9, etc.) and the prediction mode. In this case, various encoding/decoding elements as well as the position of the current pixel and the prediction mode may be considered for a weight applied to each reference pixel, and a portion thereof will be described later.

In the case of the vertical mode, a detailed description is omitted because a prediction method can be derived by applying only different directions to the prediction method of the horizontal mode.

In the following, we will look at prediction according to some diagonal modes (Diagonal up right). The diagonal mode of this example means a directional mode that is directed to the top right by using the bottom left as the starting point of prediction, as shown in the modes 2 to 17 modes of FIG. 4, and for convenience of description, it is assumed that the mode is the mode 2. In the diagonal mode of this example as well as in the other diagonal modes (Diagonal down left, Diagonal down right), a description will be given focusing on the case where prediction and correction are performed with only pixels of an integer unit.

The diagonal mode is a case in which left and bottom left blocks are used as reference pixels (Ref_L, Ref_BL in FIG. 9), and prediction blocks may be generated in a diagonal direction using adjacent pixels (L0 to L3, B0 to B3) of the corresponding block.

In addition, a prediction block may be generated using reference pixels (Ref_T, Ref_TR in FIG. 9) adjacent to a current block corresponding (or inverted) to a prediction direction. Specifically, a prediction value may be corrected using adjacent pixels (T0 to T3, R0 to R3) of the corresponding block.

For example, correction may be performed using one or more second reference pixels (T3) corresponding to the current pixel (f) and the first reference pixel (L3). Specifically, it may be a case of performing correction by estimating a current pixel with a pixel value {for example, L3×w+ T3 ×(1−w) etc. where w is a weight depending on an interpolation position} obtained due to linear interpolation between the first reference pixel (L3) and the second reference pixel (T3).

In this case, the above example is a case where the second reference pixel used for correction is one, and various cases in which two or more second reference pixels are used may be possible. For example, the second reference pixel may be corrected {for example, T2*. T2* is (T3 ×2+T2+R0), etc.} by using additional the second reference pixels (T2, R0) in addition to the second reference pixel (T3) corresponding to the first reference pixel, and then used to correct the current pixel.

The use of a plurality of second reference pixels may be understood as performing filtering (e.g., low pass filter, etc.) with adjacent pixels before correction for the purpose of removing quantization errors and the like included in the second reference pixels used directly for correction. In this case, for the first reference pixel, it is assumed that a similar operation is performed in a previous intra process (or step) such as reference pixel filtering, but otherwise, it should be understood that one or more pixels may also be used.

In summary, a reference pixel involved in generating a prediction value of the current pixel (f) may include one or more preset pixels (L3, T3) according to the position of the current pixel and a prediction mode. In this case, weights applied to each reference pixel will be described later.

In the above-described example, the reference pixel (both the first and second reference pixels) used for intra prediction is a case related to a prediction mode of an integer unit pixel. However, according to the directionality of the prediction mode (for example, the 3rd mode of FIG. 4), not only an integer unit pixel but a decimal unit pixel may be used for prediction.

In this example, it is assumed that the first reference pixel is configured in a reference pixel memory through the reference pixel interpolation unit, up to a decimal pixel. If the second reference pixel is also obtainable from the reference pixel memory configured through the reference pixel interpolation unit, the second reference pixel may acquire one or more integer unit pixels or one or more decimal unit pixels at positions corresponding to the first reference pixel.

If, in the reference pixel interpolation unit, a decimal reference pixel corresponding to a prediction direction is not configured in the memory, an interpolation process of the second reference pixel may be required.

For example, in the case of the prediction mode 3 in FIG. 4, the first reference pixel used in the current pixel (f) may be a decimal unit and may have an interpolated pixel value {for example, L2 ×w+L3 ×(1−w). where w is a weight depending on an interpolation position} between two or more reference pixels (L2 and L3. or L1, L2, L3 and B0, etc.). The corresponding second reference pixel may also be a decimal unit, and may have an interpolated pixel value between two integer unit reference pixels (T3 and R0).

Since the interpolation of the second reference pixel as in the above example may lead to an increase in the amount of computational quantity, the second reference pixel may be alternately obtained through the following method.

For example, the second reference pixel (between T3 and R0) corresponding to the first reference pixel (between L2 and L3) may be replaced with one of the adjacent integer unit pixels (T3, R0). Specifically, it may be replaced by an integer unit pixel close to the second reference pixel. Alternatively, weights may be assigned to two or more adjacent integer unit pixels (T3 and R0. or T2, T3, and R0. or T3, R0, and R1. or the like.). In detail, a higher weight may be assigned to an integer unit pixel close to the second reference pixel. Since this example is a description applicable to other diagonal modes, a detailed description is omitted in the example described below.

In some diagonal modes (Diagonal down left), detailed descriptions are omitted because it can be derived by applying only different directions to the prediction method of the diagonal mode (Diagonal up right) in the above example.

In the following, we look at the prediction according to some diagonal modes (Diagonal down right). The diagonal mode of the present example refers to a directional mode that directed to the bottom right with the top left as the starting point of the prediction as in the modes 19 to 49 of FIG. 4, and for convenience of explanation, it is assumed that the mode is the mode 34.

The diagonal mode is a case where the left, top left, and top blocks are used as reference pixels (Ref_L, Ref_TL, Ref_T in FIG. 9), and a prediction block can be generated in a diagonal direction by using adjacent pixels (TL, L0 to L3, T0 to T3) of the corresponding block.

In addition, a prediction block may be generated using reference pixels (Ref_BL, Ref_TR in FIG. 9) adjacent to a current block corresponding to (or orthogonal to) a prediction direction. In detail, prediction values may be corrected by using adjacent pixels (B0 to B3, R0 to R3) of the corresponding block.

For example, correction may be performed using one or more second reference pixels (B1, R1) corresponding to the current pixel (k) and the first reference pixel (TL). In detail, it may be a case of performing correction by estimating a current pixel with a pixel value {for example, B1×w+R1 ×(1−w) etc. where w is a weight depending on an interpolation position} obtained due to linear interpolation between the second reference pixels (B1 and R1).

In this case, the example is a case where the number of interpolation values between the second reference pixels used for correction is one, and various cases in which correction is performed using two or more interpolation values may be possible. For example, linear interpolation between the reference pixels (e.g., B0 and R1, or B3 and T3) that are not orthogonal to the prediction direction of the current pixel (k) but correspond (or symmetric) to each other of the current pixel can be performed additionally. That is, the reference pixels that influence prediction on the current pixel correspond to the first reference pixel (TL) and the second reference pixel (B1 and R1, B0 and R1, B3 and T3, etc.), and some of the second reference pixels (B1 and R1, B0 and R1, B3 and T3) may be located in a symmetrical position of the current pixel.

In summary, the reference pixel involved in generating prediction values of the current pixel (k) may include one or more preset pixels (B1, R1) according to the current pixel position and the prediction mode. In this case, the weight applied to the reference pixel will be described later.

In the following, prediction according to a non-directional mode will be described.

The DC mode is a case that the left and top blocks are used as reference pixels (Ref_L, Ref_T in FIG. 9), a prediction block can be generated after acquiring a preset value (e.g., average, etc.) using adjacent pixels of the corresponding block, but is not limited thereto.

In addition, a prediction block may be generated using additional reference pixels (Ref_TL, Ref_BL, Ref_TR in FIG. 9) adjacent to the current block. In detail, prediction values may be corrected using adjacent pixels (TL, B0 to B3, R0 to R3) of the corresponding block.

For example, correction may be performed using one or more reference pixels (the first and second reference pixels) corresponding to (or adjacent to) the current pixel. Specifically, the correction may be performed by using one first reference pixel (T2) closest to some current pixels (g), the correction may be performed by using two or more first reference pixels (L1, T1) closest to some current pixels (f), the correction may be performed by using two or more first reference pixels (T0, T1, T2) adjacent to some current pixels (b), or the correction may be performed by using one or more first reference pixels (L0, T0) adjacent to some current pixels (a) and one second reference pixel (TL).

Meanwhile, the Planar mode is a mode in which prediction values are generated by linear interpolation through left, right, top, and bottom blocks, and among them, the left and top blocks (Ref_L, Ref_T in FIG. 9) may use adjacent pixels (L0 to L3, T0 to T3) of the corresponding block as reference pixels. On the other hand, the right and bottom blocks, which are unavailable locations, may be obtained in the existing reference pixel region (Ref_TL, Ref_T, Ref_TR, Ref_L, Ref_BL in FIG. 9) to configure the reference pixel at the corresponding position.

For example, the right and bottom blocks may be filled or derived (for example, use of methods such as filling the right block by copying one pixel of R0, R1 as it is, or filling the right block with values obtained by applying filtering to R0, R1, etc.) with data of some adjacent regions (Ref_TR, Ref_BL) respectively, and may be derived and filled (for example, interpolation is applied using the data of Ref_TR and Ref_BL) from data of two or more regions. Alternatively, it may be filled with data of some existing regions (Ref_TL, Ref_T, Ref_L) as it is, or it may be derived (for example, the weighted average of one or two or more pixels located in Ref_TL, Ref_T, Ref_L is filled in the bottom right block position of the current block, and data and interpolation of Ref_TR and Ref_BL are applied) from the data and filled.

Through the above process, the left, right, top and bottom blocks may be used as reference pixels (Ref_T, Ref_L, Ref_TR, Ref_BL in FIG. 9) to generate a prediction block through an interpolation process. In this case, in the interpolation process, the first interpolation may be performed in the vertical and horizontal directions, and the final prediction value may be obtained by applying a weighted average to the first interpolation value, but is not limited thereto.

In addition, a prediction block may be generated using an additional reference pixel (Ref_TL in FIG. 9) adjacent to the current block. Specifically, prediction values may be corrected by using adjacent pixels (TL) of the corresponding block.

For example, correction may be performed using one or more reference pixels (the first and second reference pixels) corresponding to the current pixel (f).

In detail, after interpolation in the horizontal direction (using TL and R0) with assuming that the reference pixel (T1) corresponding to the current pixel is a virtual pixel, the obtained interpolation value can be compared with the corresponding reference pixel (T1) to correct the first interpolation value according to the horizontal direction of the current pixel.

In addition, after interpolation in the vertical direction (using TL and B0) with assuming that the reference pixel (L1) corresponding to the current pixel is a virtual pixel, the obtained interpolation value can be compared with the corresponding reference pixel (L1) to correct the first interpolation value according to the vertical direction of the current pixel.

The final prediction value may be obtained using the corrected first interpolation value. That is, through the value obtained after assuming that the reference pixel is a virtual pixel, an effect of correcting the final predicted value obtained by interpolation in the horizontal and vertical directions of the current block may be obtained.

In summary, the reference pixel involved in generating the prediction value of the current pixel (f) may include one or more preset pixels (TL, T1, L1, R0, B0) according to the current pixel, the prediction mode, etc. In this case, weights applied to each reference pixel will be described later.

In the following, prediction according to a color copy mode will be described.

A color copy mode is a case in which a corresponding block in another color space is used as a reference pixel (Ref C in FIG. 9), and a prediction block may be generated using pixels in the corresponding block.

In addition, a prediction block may be generated using adjacent reference pixels (Ref_TL, Ref_T, Ref_TR, Ref_L, Ref_BL) in the current color space. Specifically, the prediction value may be corrected by using adjacent pixels (T1, T0 to T3, R0 to R3, L0 to L3, B0 to B3) of the corresponding block.

In the case of a color copy mode, there is only a difference between the above-described prediction mode and the prediction method, and a prediction block may be generated (or corrected) using a reference pixel in the same or similar way. It should be understood that various examples related to the correction of the other prediction modes described above can be applied or derived in the same or similar manner to the color copy mode even though the contents are not mentioned in the examples described below.

For example, correction may be performed using one or more second reference pixels corresponding to the current pixel. Specifically, the second reference pixel adjacent to the current pixel may be used, but a reference pixel having the same or similar x component or y component of the current pixel may be used for correction. When the current pixel is located at k, reference pixels such as <T2>, <L2>, <T2, L2>, <T1, T2, T3>, <L1, L2, L3>, <T1, T2, T3, L1, L2, L3> can be used for correction.

Alternatively, a reference pixel (the number is z. z is an integer such as 1, 2, 3, the number of pixel referred in each direction may be z, or the number of pixels referred in all directions may be z) positioned in one or more directions of a horizontal, vertical, or diagonal direction (Diagonal down right, Diagonal down left, Diagonal up right, etc.) of the current pixel may be used for correction. Specifically, when the current pixel is located at c, reference pixels adjacent to the vertical direction such as <T2>, <T1, T2, T3> may be used for correction. When the current pixel is located at m, reference pixels adjacent to the horizontal direction such as <L3>, <L3, B0> may be used for correction. When the current pixel is located at j, reference pixels adjacent in the horizontal and vertical directions such as <T1, L2>, <T0, T1, T2, L1, L2, L3> may be used for correction. In addition, when the current pixel is located at k, one or more diagonally adjacent reference pixels such as <R0>, <B0>, <TL>, <R0, B0>, <TL, R0, B0> may be used for correction.

In summary, a reference pixel involved in generating the prediction value of the current pixel (f) may include one or more preset pixels (ff, T1, L1, TL) according to the current pixel, a prediction mode, etc. In this case, weights applied to each reference pixel will be described later.

Through the above example, a case where prediction is performed using various reference pixels according to a prediction mode has been described. Although the above example has been described on the assumption that correction is applied, whether to correct the current block may be determined according to encoding/decoding settings.

In addition, the above example has been described on the assumption that there is no restriction on the pixel to be corrected (when correction is applied), but correction may be performed on all or some pixels in the current block according to encoding/decoding settings.

In this case, when it is limited to some pixels, the corresponding pixels may exist in a single unit, may exist in a line unit such as a vertical/horizontal/diagonal line, or may exist in a sub-block unit. For example, in FIG. 9, correction targets may be limited to pixels such as a, b, and c. It may be limited to pixels (4×1, 1×3) in a row and column such as a to d or a, e, i. It may be limited to pixels (3×2) in a rectangular unit such as a to c and e to g. For convenience of description, a description will be given focusing on a case in which the pixel to which correction is applied is determined in a unit of a line when the pixel to be corrected is limited to a part.

In addition, the above example has described a case where the number, position, etc. of reference pixels, which are elements affecting prediction values, are fixed, but the reference pixel setting may be determined according to encoding/decoding settings. In addition, although the above example briefly described a weight setting applied to each reference pixel that affects prediction values, the weight setting for the reference pixel may be determined according to encoding/decoding settings.

The above-described encoding/decoding settings may be defined according to one or a combination of two or more of an image type, color component, prediction mode, block size/shape/position, block width/length ratio, pixel position in the block, and the like.

The above description has been mentioned as a case where the detailed settings regarding intra prediction (or correction) are determined implicitly, but the detailed settings may be explicitly determined, and the detailed settings may include relevant information in a unit such as a sequence, picture, slice, tile, block, etc.

Figure 10:
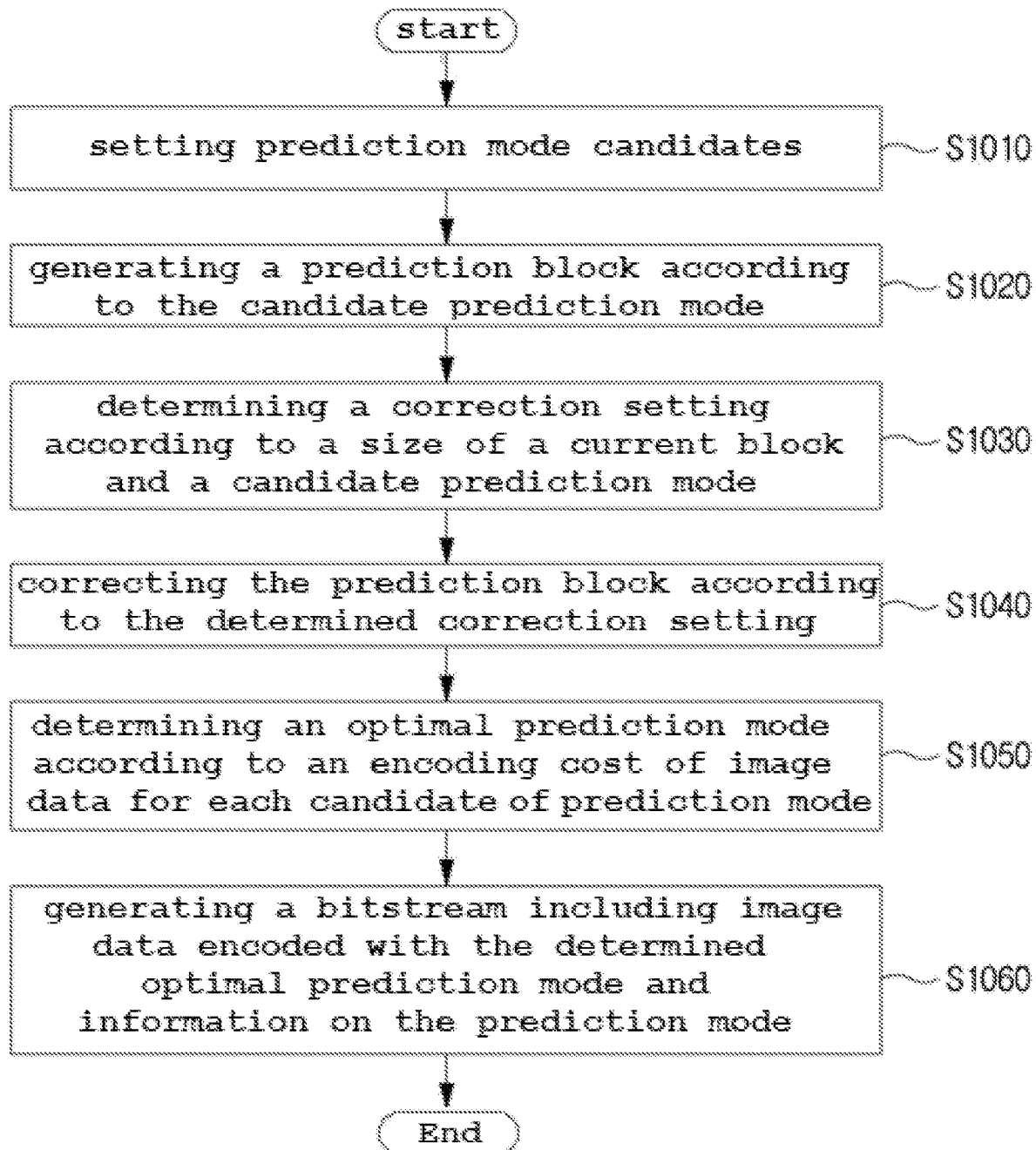
FIG. 10 is a flowchart for explaining an implementation example of an image encoding method according to an embodiment of the present invention.

FIG. 10 is a flowchart for explaining an implementation example of an image encoding method according to an embodiment of the present invention. In detail, it means a flow chart assuming that the intra prediction (using the first reference pixel) and the correction process (using the first reference pixel and the second reference pixel) are separated. In this example, it is assumed that a block having an M×N size is obtained as the size of the prediction block through the above-described block division unit.

For the purpose of selecting the optimal prediction mode, one of the prediction mode candidate group is set as a candidate prediction mode (S1010). In general, a configuration of a prediction mode candidate group may be different according to a color component, and a fixed one prediction mode candidate group may be set in each color component, but it may not be limited thereto, and various candidate group configurations may be possible.

A prediction block is generated by performing intra prediction according to the candidate prediction mode selected through the above process (S1020). An example of prediction block generation has been described above, so a description thereof is omitted.

A correction setting for intra prediction is determined according to the size of the current block and the candidate prediction mode (S1030). In this example, it is assumed that the encoding element considered for the correction setting is the current block size and the prediction mode, but it has already been mentioned that the correction setting can be determined by considering various encoding/decoding elements.

A correction process for the prediction block is performed according to the determined correction setting (S1040). In this case, the correction setting may include not only whether correction is performed, but also the location and number of reference pixels, weights of each reference pixel, and pixels to be corrected when correction is performed.

The optimal prediction mode is selected in consideration of the encoding cost of image data for each candidate of the prediction mode (S1050). In addition, a bitstream including image data encoded with the determined optimal prediction mode and information on the prediction mode is generated (S1060).

In this case, the image data may include data on the residual component of the current block, and information on the size and shape of the current block (e.g., block division information, etc.) may be included in addition to the prediction mode information. The data related to the residual component includes scan information of the residual component, whether a non-zero residual coefficient is present in a preset block (current block or subblock of the current block), whether the residual coefficient is 0, absolute value of the residual coefficient, sign information, and the like.

Figure 11:
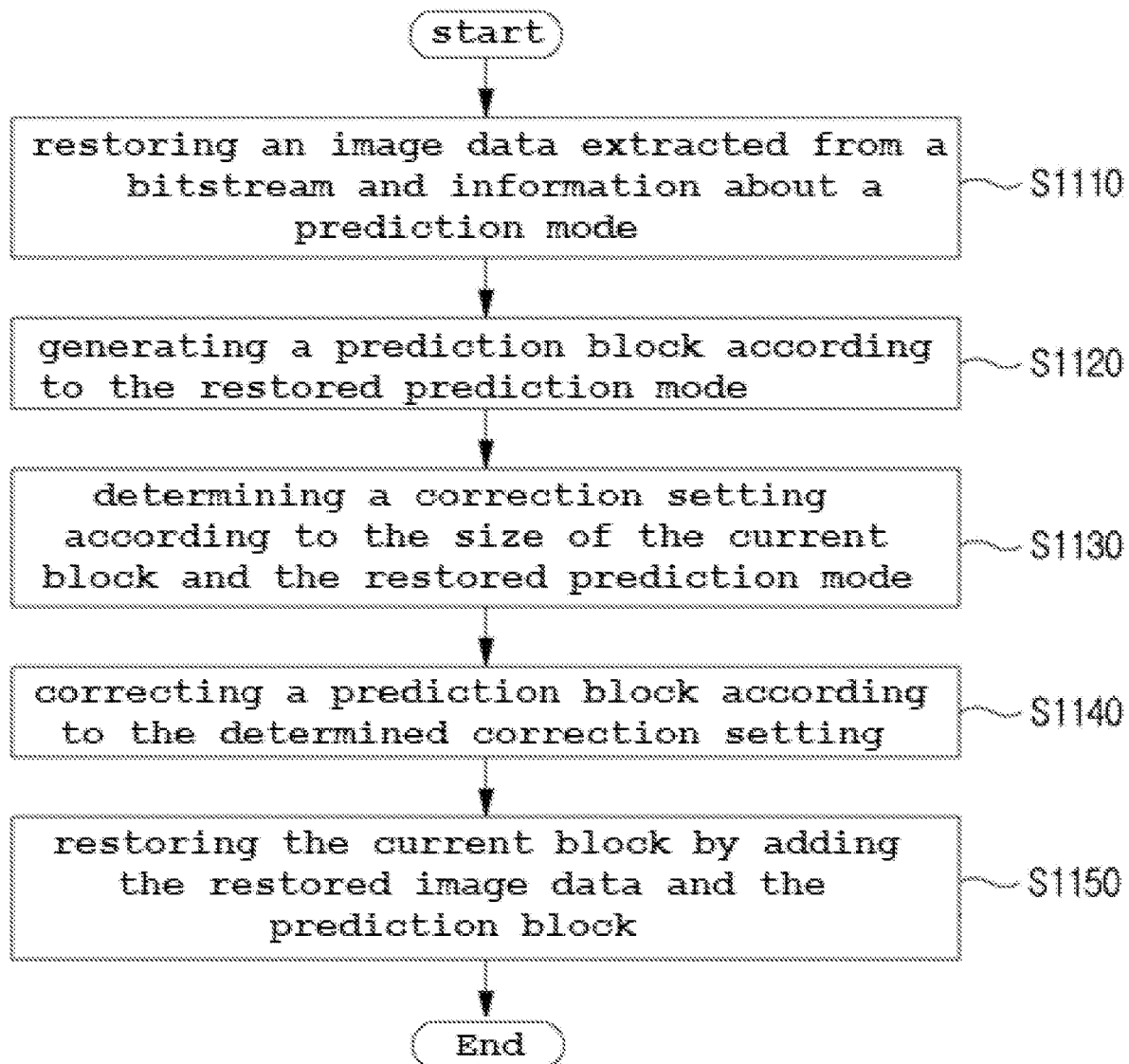
FIG. 11 is a flowchart for explaining an example of an implementation of an image decoding method according to an embodiment of the present invention.

FIG. 11 is a flowchart for explaining an example of an implementation of an image decoding method according to an embodiment of the present invention.

The image data extracted from the bitstream and information about the prediction mode are restored (S1110). Then, a prediction block is generated by performing intra prediction according to the restored prediction mode (S1120). A correction setting for intra prediction is determined according to the size of the current block and the restored prediction mode (S1130). The prediction block is corrected according to the correction setting determined through the above process (S1140). The current block is reconstructed by adding the reconstructed image data and the prediction block (S1150). Since the decoding method can derive a detailed description from the encoding method except for some configurations (for example, selecting an optimal prediction mode, etc.), the example described below will focus on the encoding method.

Following is a description of detailed settings for intra prediction. Various encoding/decoding elements may be considered as to whether to perform correction of the prediction block. The following is a detailed example of elements affecting whether or not to perform calibration.

As an example (1), whether to perform correction may be determined according to the size of the block. The small size of the block may be a case in which block division is performed because a region adjacent to the corresponding block is difficult to predict as one block. Therefore, since the image characteristics between the current block and the adjacent region are likely to be different, additional correction in addition to prediction using a reference pixel composed of adjacent pixels may adversely affect prediction accuracy. Of course, the above situation may not always occur, and vice versa. In addition, the above case may not be considered in a situation where it is explicitly determined whether to perform the correction. However, in the example described later including this example, the description will be made in consideration of the fact that the correction setting is implicitly described.

Correction may be performed when the size of the block is equal to or greater than/greater than a certain size (M×N. for example, $2^m \times 2^n$, where m and n are 1 or more integers such as 2 to 6). In this case, one or more boundary values for the size of the block may exist.

For example, correction may not be performed in a block smaller than 16×16, and correction may be performed in a block larger than 16×16. Configurations in which explicit cases are mixed here may also be possible.

For example, correction may not be performed implicitly in a block of 8×8 or less, correction may be performed implicitly in a block of 64×64 or more, and it is possible to explicitly determine whether to perform correction in a block greater than 8×8 to less than 64×64.

As an example (2), whether to perform the correction may be determined according to the shape of the block. In the present invention, a block of a rectangular shape (e.g., 64×8, etc.) may be obtained through a block division of a binary or ternary tree. In this case, the adjacent block also has a high probability that the horizontal/vertical length ratio is similar to the corresponding block, and performing correction in addition to the prediction using pixels within the adjacent block may also negatively affect the accuracy of prediction.

Correction can be performed when the block shape is rectangular and if the horizontal/vertical length ratio is equal to or greater than/greater than a certain ratio (k:1 or 1:k. k is an integer of 1 or more such as 2, 3, 4, etc.), on the other hand, if the ratio is equal to or less than/less than the certain ratio, correction cannot be performed. Herein, there may be one or more boundary values for the horizontal/vertical length ratio of the block.

For example, correction is not performed in a block having a horizontal/vertical length ratio of less than 4:1 or 1:4, such as 16×16 or 32×64. In a block such as 8×32 or 64×16, the horizontal/vertical length ratio is greater than 4:1 or 1:4, correction can be performed. Configurations in which explicit cases are mixed here may also be possible.

For example, in a block having a square shape (i.e., 1:1) such as 16×16, the implicit correction is performed. In a block having a horizontal/vertical length ratio of 4:1 or 1:4, such as 64×8, no correction is performed implicitly. In a block having a rectangular shape and the ratio of less than 4:1 or 1:4, whether to perform the correction can be decided explicitly.

As an example (3), whether to perform the correction may be determined according to the prediction mode. Applying correction may be aimed at improving the accuracy of the prediction. Therefore, it is intended to utilize a directional characteristic of a prediction block that has not been supplemented in the existing prediction process, and some prediction modes may have a prediction mode (or method) that is difficult to utilize. This may also be a different story in the explicit case, but this example will also focus on the implied case. The prediction mode in which correction is performed (or allowed) may be configured in various combinations.

For example, correction may be performed on all or part of the directional mode, and vertical, horizontal, and diagonal modes (modes 2, 34, and 66 in FIG. 4), etc. may be included in correctable modes. Specifically, configurations such as <Vertical+Horizontal>, <Vertical+Horizontal+34>, <Vertical+Horizontal+2+66>, <Vertical+Horizontal+2+34+ 66>, etc. can be possible.

In addition, it is possible to perform correction on a prediction mode within a certain predetermined range (for example, in the mode a, m is included on the left and n is included on the right. in this case, m and n are integers of 1 or more such as 1, 2, 3, etc.) based on some prediction modes (vertical, horizontal, diagonal mode, etc.). As a detailed example, in the vertical mode (50), correction may be performed in the 48, 49, 51, and 52 modes (m and n are 2).

Alternatively, correction may be performed on all or part of the non-directional mode, and correction may be performed on all or part of the color copy mode.

In summary, prediction modes to be corrected can be classified in various combinations (some directional modes+ non-directional mode, some directional modes+color copy mode, some directional modes+non-directional mode+some color copy modes, etc.) in the prediction mode candidate group, and correction can be performed when the prediction mode is one of the classified modes. In addition, a configuration in which explicit cases are mixed may also be possible.

For example, correction cannot be performed in a block having some prediction modes (modes with similar directionality, including Diagonal down right in this example). The correction can be performed in a block having some prediction modes (modes with similar directionality, including a non-directional mode, color copy mode, horizontal and vertical mode in this example). In some prediction modes (modes with similar directionality including Diagonal down left and Diagonal up right in this example), it is possible to explicitly determine whether to perform correction.

In the case of the color copy mode, it has been described that one or more correlation information can be obtained, which means that a plurality of color copy modes are supported. That is, it means that a plurality of color copy modes can be supported due to differences in detailed settings for obtaining correlation information. In this case, whether to perform the correction may be determined according to the setting of the color copy mode (that is, how to obtain correlation information, etc.).

Figure 12:
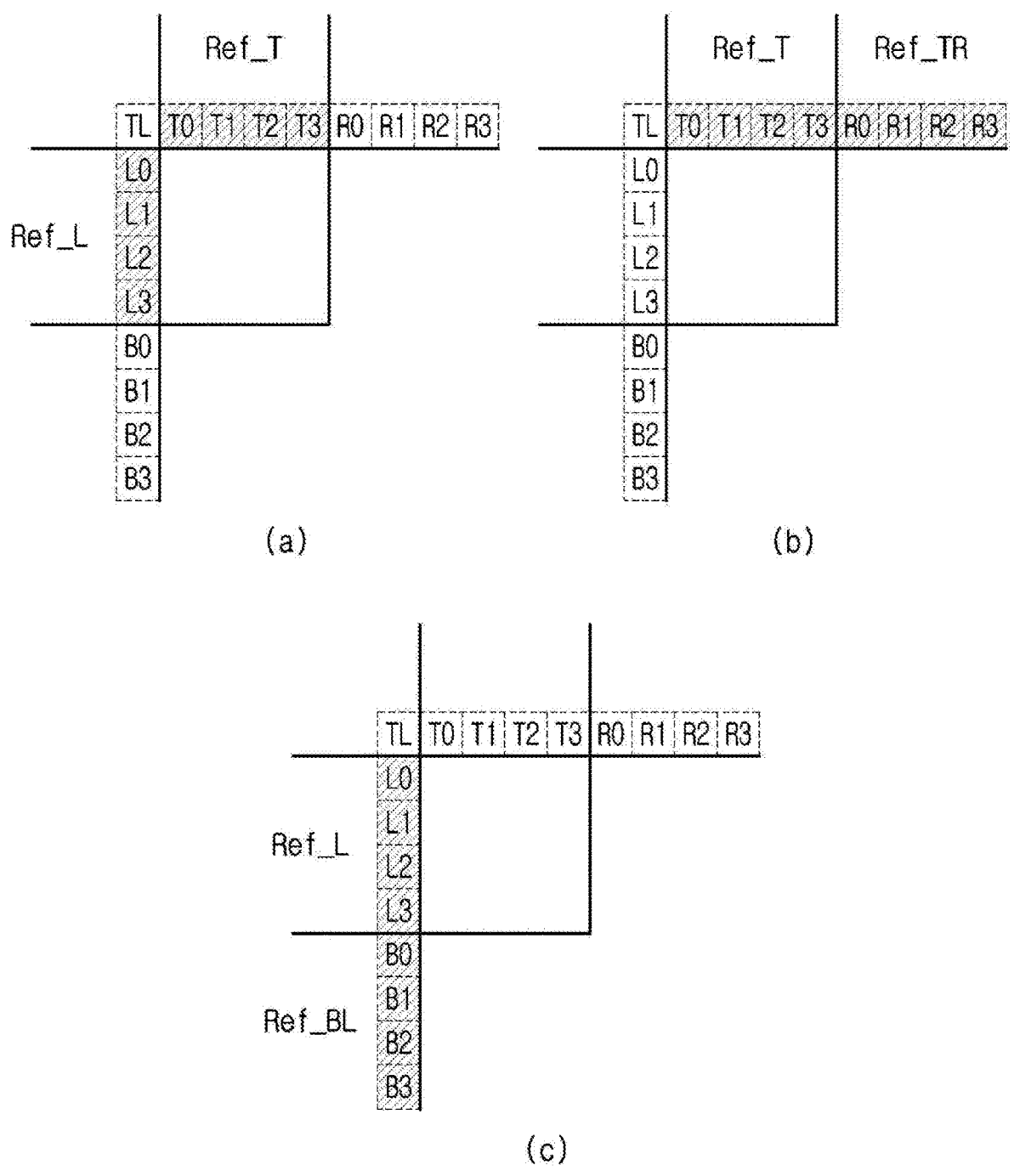

FIG. 12 is an exemplary diagram for detailed setting of a color copy mode according to an embodiment of the present invention. In detail, a to c of FIG. 12 may be classified according to a region (hatched portion in the drawing) referenced (or compared) to obtain correlation information. In this example, it is assumed on the assumption that the settings related to obtaining the other correlation information are the same and the settings of the regions to be compared are different for obtaining the correlation information, but the color copy mode may be divided into other detailed settings, and it should also be understood whether to perform the correction can be determined accordingly.

The a to c in FIG. 12 are set as regions where left and top blocks, top and top right blocks, left and left bottom blocks of a block corresponding to the current block are compared with each other. In other words, it means that the correlation information is obtained from the adjacent block, and the data obtained by applying the correlation information to the block corresponding to the current block will be used for the prediction block of the current block.

Referring to a of FIG. 12, it may mean that a current block and a region that binds the left and top blocks adjacent to it and a corresponding block of a different color space and a region that binds the left and top blocks adjacent to it have a high correlation with each other. In this example, it is assumed that the reference pixel used for the correction of the current block is limited to the left and top blocks of the current block.

Therefore, the a in FIG. 12, it can be expected that when acquiring a prediction block in another color space and performing correction, using adjacent blocks, left and top blocks, may help improve prediction accuracy. In particular, an effect of reducing deterioration occurring at the boundary between blocks may also occur.

Referring to b and c of FIG. 12, it may mean that a current block and a region that binds the top and top right blocks adjacent to it and a corresponding block of a different color space and a region that binds the top and top right blocks adjacent to it have a high correlation with each other. In this case, performing correction using the left and top blocks can be rather negative for the accuracy of the prediction. Particularly, when b to c are selected in the case where all of a, b, and c in FIG. 12 are supported (three modes), the adverse effect may be much greater.

In this case, it may be more efficient to perform correction using the top and top right blocks, but in this example, the reference pixel used for correction may be limited to the left and top blocks, so it can be efficient to have a setting that implicitly determines not to perform the correction.

In summary, correction may be performed on all or part of the color copy mode, which may be determined based on setting information regarding the color copy mode. In this case, since the setting information can derive a related description in the above-described color copying mode, detailed description is omitted.

The above examples (No. 1 to 3) indicate a case in which correction is performed by a single encoding/decoding element, and examples of various modifications including the opposite case of the above examples may be possible. In addition, it may be possible to determine whether correction is performed by combining two or more elements, and other encoding/decoding elements not mentioned in examples 1 to 3 may also be considered as included in the encoding/ decoding setting for determining whether to perform the correction.

Following is a description of detailed settings for intra prediction. When correction of the prediction block is performed, all or some pixels in the block may be considered as correction targets. For convenience of description, it is assumed that only some pixels are considered as correction targets, and a detailed example of elements affecting the determination of the correction target pixels will be described below.

Figure 13:
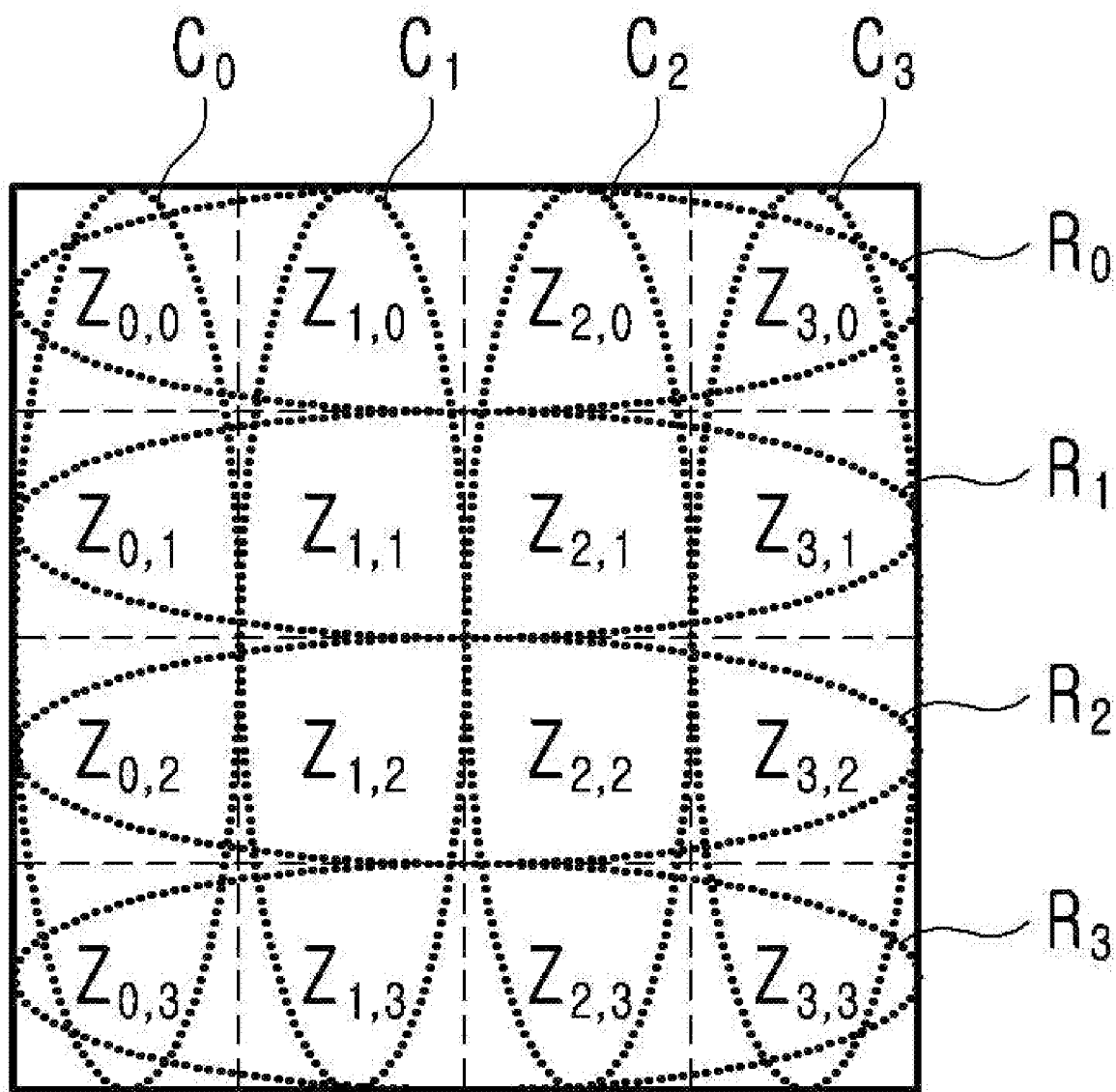
FIG. 13 is a conceptual diagram illustrating various configuration examples of pixels to be corrected in a current block according to an embodiment of the present invention.

FIG. 13 is a conceptual diagram illustrating various configuration examples of pixels to be corrected in a current block according to an embodiment of the present invention. Referring to FIG. 13, pixels in a block may be represented by $Z_{x,y}$, and a row and column in a block may be represented by $R_k$ and $C_k$, respectively. It is assumed that when a pixel to be corrected is expressed individually, it is expressed as Z, and when expressed as a line unit, it is expressed as R and C.

As an example (1), the pixel to be corrected may be determined according to the size of the block. In the case of a block such as 64×64, the maximum distance between the reference pixel and the pixel in the block may be 63 (based on horizontal/vertical), whereas in the case of a block such as 8×8, it may be 7. It can be seen from the above example that it is necessary to determine the pixel to be corrected in consideration of the size of the block. Of course, again, it is necessary to set aside and understand the explicit case.

The pixel and position to be corrected may be determined based on the size of the block ($2^M \times 2^N$), and a setting proportional to the size of the block may be set.

For example, a certain region (For example, $2^M \times 2^S$, $2^T \times 2^N$. In this case, the T and S are M and N minus v, w. The v and w are integers such as 0, 1, 2, etc.) obtained in proportion to the size of the block (for example, the range of pixels to be corrected may be proportional to the size of the current block, or may be proportional to an exponent of 2 when expressed as an exponent of 2) may be determined as a pixel to be corrected. Specifically, when the current block is 4×4 as shown in FIG. 13, the pixel to be corrected may be seven pixels represented by R0 and $C_0$ (4×1, 1 ×4. when set based on the top left of the block). In this case, there may be one or more boundary values related to the size of the block, which may affect the determination of the pixel to be corrected.

For example, when the size of the block is equal to or less than/less than a certain size (A×B. for example, $2^a \times 2^b$, where a and b are integers greater than or equal to 1 such as 2 to 6), a certain region may be determined as a pixel to be corrected in proportion to the size of the block, and when the size is equal to or greater than/greater than the certain size, a preset region may be determined as a pixel to be corrected.

As a further example, when the size of the block is 4×4 or less, the pixel to be corrected (for example, 12 pixels represented by $R_0$, $R_1$, and $C_0$, $C_1$ when the size is 4×4) may be determined according to the size of the block, and when the size is 4×4 or more, a pixel to be corrected may be determined as a preset region (12 pixels represented by $R_0$, $R_1$, and $C_0$, $C_1$ in the same manner as the pixel to be corrected when the boundary value is applied). In this case, a configuration in which an explicit case is mixed may also be possible. A description of this may lead to a related description in various examples described above.

As an example (2), a pixel to be corrected may be determined according to a block shape. For a block such as 128×16, consider the reference pixel and the pixel in the block based on the bottom right pixel. In this case, the maximum distance between the reference pixel and the bottom right pixel may be 15 in the vertical direction and 127 in the horizontal direction. The above example may also be a case indicating that it is necessary to determine the pixel to be corrected according to the shape of the block.

Pixels and positions to be corrected may be determined based on the shape of the block (or the horizontal/vertical length ratio of the block. $2^M : 2^N$ or M:N when the current block is $2^M \times 2^N$), and a setting proportional to the shape of the block may be set.

For example, a certain region (M×N or $2^S \times 2^T$. In this case, the S and T are M and N <where M and N are exponential values of block lengths> minus v, w. The v and w are integers of 0, −1, 1, etc. This example is described as M×N) obtained according to the horizontal/vertical length ratio of a block (compared to M:N in this example) may be determined as a pixel to be corrected. Specifically, when the current block is 8×4, the pixel to be corrected may be 26 pixels represented by R0 to R2 (3 rows) and C0 to C1 (2 columns), although not illustrated in FIG. 13. In this case, there may be one or more boundary values related to the horizontal/vertical length ratio of the block, which may affect the determination of the pixel to be corrected.

For example, when the horizontal/vertical length ratio of a block is equal to or less than/less than a certain ratio (k:1 or 1:k. k is an integer greater than or equal to 2, 3, 4, etc.), a certain region may be determined as a pixel to be corrected in proportion to the horizontal/vertical length ratio of the block, and when the ratio is equal to or greater than/greater than the certain ratio, a preset region may be determined as a pixel to be corrected.

As an additional example, when the horizontal/vertical length ratio of the block is 2:1 (or 1:2) or less, the pixel to be corrected (set the same as in the above example, i.e., 2 rows and 1 column or 1 row and 2 columns) may be determined according to the horizontal/vertical length ratio of the block, and when the ratio is greater than 2:1 (or 1:2), a pixel to be corrected may be determined as a preset region (when it corresponds to the boundary value, it applies the same as the pixel setting to be corrected). In this case, a configuration in which an explicit case is mixed may be possible, and a related description may be derived from the above-described example.

As an example (3), a pixel to be corrected may be determined according to a prediction mode. Depending on the prediction mode (or method), the distance between the reference pixel and the pixel in the block may be considered. When considering the top right pixel reference of the block, the top pixel is the reference pixel, but in the case of a directional mode such as diagonal up right, there may be many distance differences from the pixel actually referred to in prediction. As described above, it may be necessary to consider the pixel to be corrected according to the prediction mode.

A pixel to be corrected may be determined based on detailed settings of the prediction mode (prediction method, directionality, reference pixel position, etc.). The following describes the case of each prediction mode by classifying the directional mode, the non-directional mode, and the color copy mode. In the example to be described later, a drawing for indicating a pixel in a block and a reference pixel refers to FIG. 9, and a drawing for indicating a pixel to be corrected refers to FIG. 13. Even if the drawing numbers are not mentioned, the size of the example blocks of the two drawings is the same and the drawing symbols are not overlapped, so detailed examples can be derived through corresponding drawing symbols in each drawing.

In the directional mode (used for prediction or correction), a pixel to be corrected may be determined based on the position of the reference pixel, the distance between the pixel to be corrected and the reference pixel, and the direction (or angle) of the prediction mode.

In some prediction modes (diagonal down left), the first reference pixel for prediction of the pixel m may be R0. Since the distance from the first reference pixel used for prediction is far, correction may be performed through the second reference pixel (B0 in this example) corresponding to the prediction direction. Meanwhile, in the case of the pixel d, since the distance from the second reference pixel (B0 in this example) corresponding to the prediction direction is far, correction may not be performed. That is, a region adjacent to the first reference pixel may be excluded from the correction target, and a region not adjacent to the first reference pixel may be included in the correction target.

For example, in the case of a directional mode such as diagonal down left, reference pixels corresponding to $C_0$ and $C_1$ (or $R_2$ and $R_3$) belong to the correction target, and other pixels may be excluded from the correction target. A directional mode such as diagonal up right can be derived by changing the direction and the prediction mode, so detailed description is omitted.

In some prediction modes (diagonal down right), the first reference pixel for prediction of the pixel a may be TL. Since the distance between the second reference pixels (T1, L1 in this example) corresponding to the prediction direction is close, correction may be performed through this. Meanwhile, in the case of the pixel p, since the distance from the second reference pixel corresponding to the prediction direction is also far, correction may not be performed. That is, a region adjacent to the first reference pixel and adjacent to the second reference pixel may be included in the correction target, and may be excluded from the correction target in other cases.

For example, in a directional mode such as diagonal down right, reference pixels corresponding to $C_0$, $C_1$, $R_0$, $R_1$ belong to the correction target, and other pixels may be excluded from the correction target.

In some prediction modes (horizontal mode), the first reference pixel for prediction of the pixel d may be L0. When comparing L0 with pixels a to c used as the first reference pixel, the distance from the first reference pixel may be far, but the distance from the second reference pixel (T3, TL in this example, but for comparison of the degree of change, TL is compared to L0 and T3 can be compared to the pixel d, so the distance from T3 is assumed) corresponding to the prediction direction may be close. That is, a region adjacent to the second reference pixel, regardless of whether it is adjacent to the first reference pixel, may be included in the correction target, and may be excluded from the correction target in other cases.

For example, in a directional mode such as a horizontal mode, reference pixels corresponding to $R_0$, $R_1$ may be included in the correction target, and in other cases, the reference pixel may be excluded from the correction target. Since a directional mode such as a vertical mode can be derived by changing the prediction mode and the direction, a detailed description is omitted.

In the non-directional mode, a pixel to be corrected may be determined based on the position of the reference pixel, the distance between the target pixel and the reference pixel, and the prediction method.

In some prediction modes (DC mode), a method of predicting pixels a to p with a value derived from a plurality of adjacent pixels instead of a single reference pixel may be used. In the case of correction, in which a single reference pixel is used, correction may be performed on adjacent pixels based on the distance between the target pixel and the second reference pixel. That is, the region adjacent to the second reference pixel may be included in the correction target, and other regions may be excluded from the correction target.

For example, in the case of a non-directional mode such as a DC mode, reference pixels corresponding to $R_0$ and $C_0$ may be included in the correction target, and in other cases, the reference pixel may be excluded from the correction target.

In some prediction modes (Planar mode), the first reference pixel may be classified into a plurality of categories. In some categories a (left and top blocks), it may be a region that includes data that can be used in the actual corresponding location. In addition, in some categories b (right and bottom blocks), there is no data available at the corresponding location, so it may be a region including data derived in various ways. In this case, correction may be performed on a pixel adjacent to a region including category 1. That is, a region adjacent to the first reference pixel and a region adjacent to a category classified as the category a may be included in the correction target, and other regions may be excluded from the correction target.

For example, in the case of a non-directional mode such as a planar mode, reference pixels ($Z_{0,0}$, $Z_{1,0}$, $Z_{0,1}$, $Z_{1,1}$) in which $R_0$, $R_1$ and $C_0$, $C_1$ overlap may be included in the correction target, and in other cases, it can be excluded from correction. As another example, reference pixels corresponding to $R_0$, $R_1$ and $C_0$, $C_1$ may be included in the correction target, and may be excluded from the correction target in other cases. In this case, the overlapping reference pixels ($Z_{0,0}$, $Z_{1,0}$, $Z_{0,1}$, $Z_{1,1}$) may be used for correction since the pixels corresponding to the left and top directions of each pixel correspond to the second reference pixel, and the non-overlapping reference pixels may be used for correction since the pixels corresponding to the left ($Z_{0,2}$) or top ($Z_{2,0}$) direction of each pixel correspond to the second reference pixel.

In the example of the directional/non-directional mode, there may be one or more boundary values (for example, if the x/y component is equal to or greater than/greater than (or equal to or less than/less than) p/q based on a certain coordinate <assuming that it is the top left coordinate here>, it is included in the correction target) based on x and y components to distinguish pixels to be corrected. In addition, various boundary values may be set to determine pixels to be corrected.

The plurality of examples are limited to some examples for selecting a target to be corrected, and examples of various modifications may be possible, such as a position in which a pixel to be corrected is located in an opposite position in a block or in a vertical/horizontal symmetric position. In addition, the above example may be applied to the same or similar application to the color copying mode described later.

In the case of the color copy mode, a pixel to be corrected may be determined based on the position of the reference pixel, the distance between the pixel and the reference pixel, and some settings (For example, color copy mode selection information, correlation information acquisition location, etc.) of the color copy mode.

In the following, it is assumed that correlation information is obtained by referring to the left and top blocks as shown in the a of FIG. 12. If the regions to be compared for obtaining correlation information are different as shown in b and c of FIG. 12, a related description can be derived from a of FIG. 12.

In the color copy mode, the pixel d may be corrected through one or more second reference pixels (T3 in this example, or T2, T3, R0) corresponding to the vertical direction. Meanwhile, the 1 pixel may correspond to the second reference pixel which is the same or similar to the pixel d in the vertical direction, but correction may not be performed because the distance from the second reference pixel is far. That is, a region adjacent to the second reference pixel in the vertical direction may be included in the correction target, and a region not adjacent to the second reference pixel may be excluded from the correction target.

For example, reference pixels corresponding to $R_0$, $R_1$ belong to the correction target, and pixels belonging to $R_2$, $R_3$ may be excluded from the correction target. In this example, the boundary value (w in $R_w$, or y in $Z_{x,y}$. in this case, a boundary value such as w or y is a value equal to or more than/more than 0~equal to or less than/less than the vertical length of a block) for classifying the correction target may be 2.

In the color copy mode, the m pixel may be corrected through one or more second reference pixels (L3 in this example. Or L2, L3, B0) corresponding to the horizontal direction. On the other hand, the o pixel may correspond to the second reference pixel which is the same or similar to the pixel m in the horizontal direction, but correction may not be performed because the distance from the second reference pixel is far. That is, a region adjacent to the second reference pixel in the horizontal direction may be included in the correction target, and a region not adjacent to the second reference pixel may be excluded from the correction target.

For example, reference pixels corresponding to $C_0$, $C_1$ belong to a correction target, and pixels belonging to $C_2$, $C_3$ may be excluded from a correction target. In this example, the boundary value (w in $C_w$, or x in $Z_{x,y}$. in this case, a boundary value such as w or x is a value equal to or more than/more than 0~equal to or less than/less than the horizontal length of a block) for classifying the correction target may be 2.

In the color copy mode, pixels f, h, n, and p may be corrected through respective second reference pixels corresponding to vertical and horizontal directions. In the case of the pixel f, since the distance from the second reference pixels (T1 and L1 in this example) in the vertical and horizontal directions is close, correction may be performed through the corresponding second reference pixels in the vertical and horizontal directions. In the case of the pixel h, the distance from the corresponding second reference pixel (T3 in this example) in the vertical direction is close, but since the distance from the corresponding second reference pixel (L1 in this example) in the horizontal direction is far, correction may be performed through corresponding second reference pixel in the vertical direction. In the case of the pixel n, the distance from the second reference pixel (L3 in this example) corresponding to the horizontal direction is close, but since the distance from the second reference pixel (T1 in this example) corresponding to the vertical direction is far, the correction may be performed through the second reference pixel corresponding to the horizontal direction. In the case of the pixel p, since the distance from the second reference pixel is far in the vertical and horizontal directions, correction may not be performed.

For example, reference pixels corresponding to $C_0$, $C_1$ and $R_0$, $R_1$ belong to the correction target, and other pixels may be excluded from the correction target. In this example, the boundary value (x in $Z_{x,y}$, y. in this case, the boundary value of x is a value equal to or more than/more than 0~equal to or less than/less than the horizontal length of a block, and the boundary value of y is a value equal to or more than/more than 0~equal to or less than/less than the vertical length of a block) for classifying the correction target may be 2 in the horizontal and vertical directions, respectively.

In this case, the region to be corrected may be classified into a part ($Z_{0,0}$, $Z_{0,1}$, $Z_{1,0}$, $Z_{1,1}$) that is applied in the horizontal and vertical directions, a part ($Z_{2,0}$, $Z_{2,1}$, $Z_{3,0}$, $Z_{3,1}$) applied only in the horizontal direction, and a part ($Z_{0,2}$, $Z_{0,3}$, $Z_{1,2}$, $Z_{1,3}$) applied only in the vertical direction. That is, it may mean that all of the regions belong to a correction target, but the second reference pixel used for correction can be classified. Alternatively, only a part commonly applied in the horizontal and vertical directions may be limited to a correction target, and various boundary values may be set.

Figure 14:
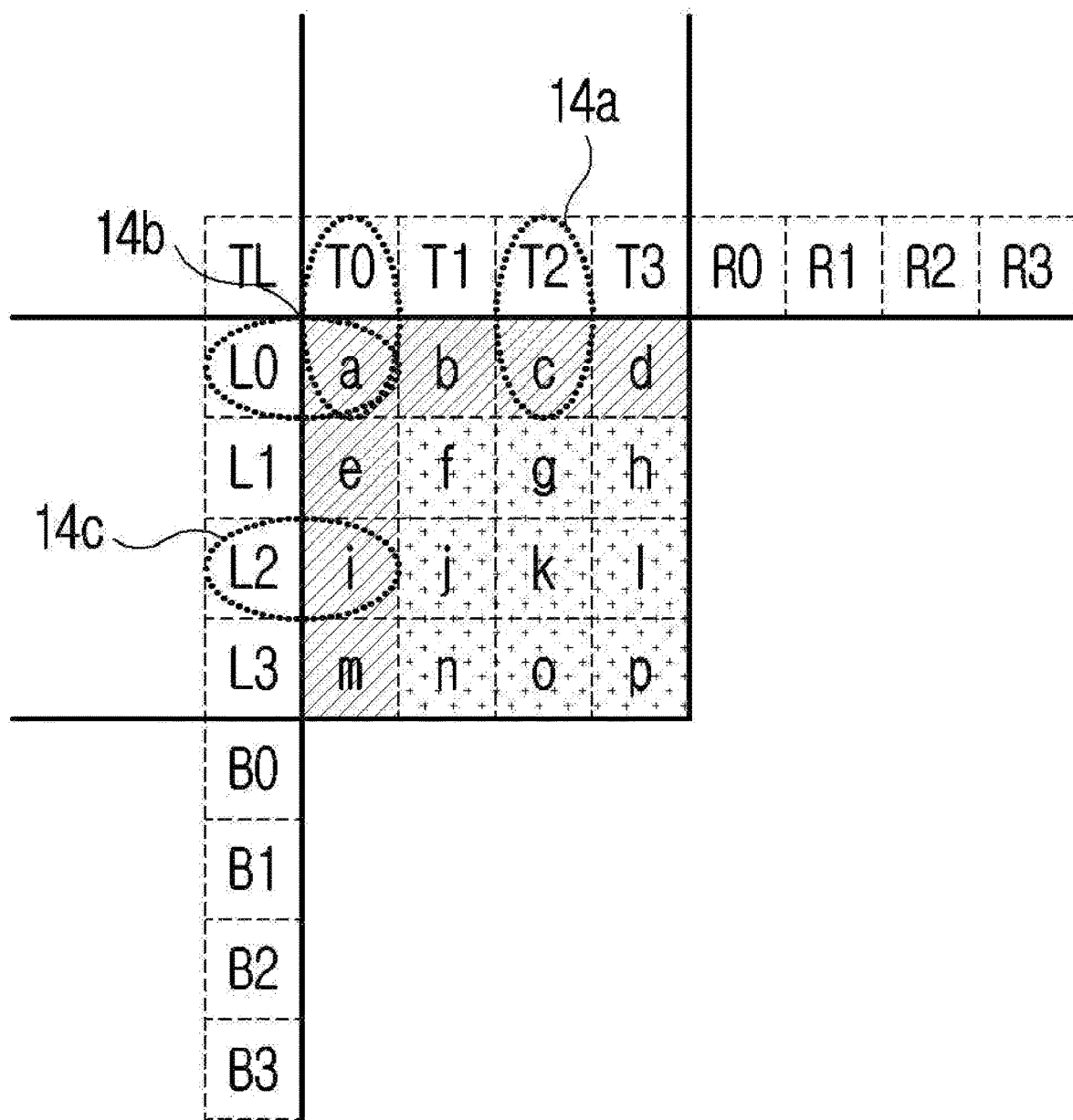
FIG. 14 is an exemplary diagram for explaining a case where correction is performed in a color copy mode according to an embodiment of the present invention.

FIG. 14 is an exemplary diagram for explaining a case where correction is performed in a color copy mode according to an embodiment of the present invention.

Referring to FIG. 14, an example of a case in which a boundary value for classifying a correction target is 1 in the horizontal and vertical directions is shown. In this case, when correction is applied only in the horizontal or vertical directions, it means a and c in FIG. 14, and when correction is commonly applied in the horizontal and vertical directions, it means b in FIG. 14. This indicates that the second reference pixel used for correction may be configured differently as described above.

In the color copy mode, the pixel f may be corrected through corresponding second reference pixels (T1, L1, TL, T3, L3) in one or more of vertical, horizontal, and diagonal directions. Meanwhile, in the case of the pixel p, since the distance from the corresponding second reference pixel (T3, L3, TL, R3, B3 in each example) is far, correction may not be performed.

For example, reference pixels corresponding to $Z_{0,0}$ to $Z_{3,0}$, $Z_{0,1}$ to $Z_{2,1}$, $Z_{0,2}$, $Z_{1,2}$, $Z_{0,3}$ belong to the correction target, and other pixels are excluded from the correction target. In this example, the boundary value ($Z_{x,y}$ in w. w may be a value that is compared by the sum of x and y. w is a value equal to or more than/more than 0 ~equal to or less than/less than sum of the horizontal and vertical lengths) for classifying the correction target may be 3. In this case, although the example in which the region to be corrected is divided by the sum of the horizontal and vertical lengths was given, various other boundary values may be set.

In the case of the color copying mode, a prediction value is obtained in a color space other than the adjacent region of the current block, unlike the existing prediction mode. In general, a region obtainable (or referenced) based on a block scan order based on a current pixel may be limited to left, top, top left, top right, and bottom left directions of a target pixel.

However, in the case of the color copy mode, since all the prediction pixels of the current block are obtained in corresponding blocks of different color spaces, it may also be possible to use them in the correction process. In this case, data for prediction may be acquired in the left, right, top, bottom, top left, top right, bottom left, and bottom right directions of the current pixel.

Figure 15:
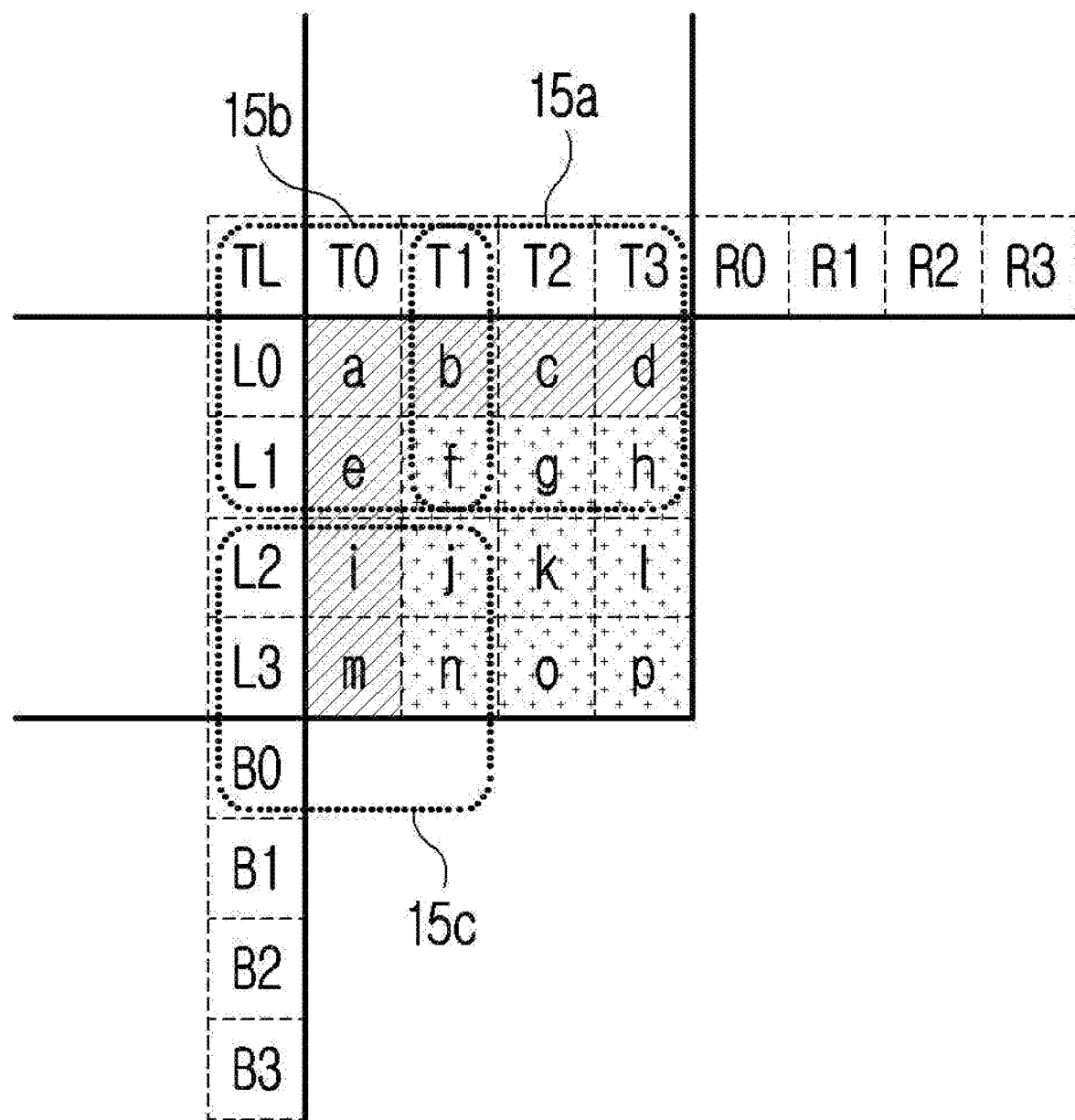
FIG. 15 is an exemplary diagram for explaining a case where correction is performed in a color copy mode according to an embodiment of the present invention.

FIG. 15 is an exemplary diagram for explaining a case where correction is performed in a color copy mode according to an embodiment of the present invention.

Referring to FIG. 15, it shows a case in which a pixel predicted from a corresponding block of a different color space is used as well as an adjacent pixel of the current block for correction of the current block. That is, the corresponding block means a case that is used for intra prediction as the second reference pixel as well as the first reference pixel. The a to c in FIG. 15 illustrate cases in which correction is performed on pixels adjacent to the top, top left, and left blocks of the current block, and will be described mainly with reference to the a in FIG. 15.

The a in FIG. 15 illustrates a case in which correction is performed using pixels adjacent in the directions of left, right, top, bottom, top left, top right, bottom left, bottom right, etc. of the pixel c as the second reference pixel. Among them, T1, T2, T3 may be pixels adjacent to the current block, and b, d, f, g, h may be pixels existing (or derived) in corresponding blocks of different color spaces. As shown in the figure, various second reference pixel configurations may be possible as well as setting pixels adjacent to all directions as a second reference pixel of a pixel to be corrected.

For example, a second reference pixel configuration used for various corrections such as a vertical direction (T2, g), a horizontal direction (b, d), a cross shape (T2, b, d, g), and an X shape (T1, T3, f, h) may be possible centered on a target pixel. In this case, the second reference pixel configuration may be determined in consideration of various encoding/decoding elements, such as the position in the block of the pixel to be corrected.

For correction, a weight applied to a pixel adjacent to the target pixel may be variously set, and a weight applied to the target pixel may be a and a weight applied to the adjacent pixel may be b (when total weight sum is 1, <1-a> divided by the number of adjacent pixels). In this case, the weight applied to adjacent pixels can be set to be the same or not. In addition, the weight applied to a may have a positive value, and the weight applied to b may have a positive or negative value.

In the color copy mode of this example, when pixels of the corresponding block as well as the adjacent region of the current block are used for correction, the same or similar configuration may be applied to the examples described below, and detailed description thereof will be omitted.

In the above example, the region for obtaining the correlation information in the color copy mode may correspond to the left and top blocks of the current block. Although the case in which the region of the second reference pixel used for correction is not limited has been described through the above example, an example limited to the left and top blocks of the current block may also be possible. An example of a case in which whether to correct is determined based on the location where the correlation information is obtained is already described through FIG. 12. In this example, it is assumed that correction is performed, but the description of the case in which the pixel to be corrected can be determined adaptively is continued.

Referring to b (or c) of FIG. 12, it shows an example of a color copy mode for obtaining correlation information by referring to the top, top right (or left, bottom left) blocks of the current block, and the top and top right (or left, bottom left) blocks of the corresponding block.

In this case, a pixel to be corrected may be determined based on an adjacent region used for obtaining correlation information.

For example, the b in FIG. 12, regions (For example, $R_0$, $R_1$, $C_3$, $C_2$, etc.) adjacent to the top and top right blocks of the current block may be included as pixels to be corrected, and other regions may not be included as pixels to be corrected. Meanwhile, the c in FIG. 12, regions (For example, $C_0$, $C_1$, $R_3$, $R_2$, etc.) adjacent to the left and bottom left blocks of the current block may be included as pixels to be corrected, and other regions may not be included as pixels to be corrected.

In b of FIG. 12, as a boundary value (when $R_0$, $R_1$ are selected) for selecting a correction target, w in $R_w$ may be set to be less than 2, or as a boundary value (when $C_3$, $C_2$ are selected) for selecting a correction target, w in $C_w$ may be set to 2 or more. The c in FIG. 12 may be derived from the previous example, and thus detailed description is omitted.

In addition, the boundary value setting mentioned through the above-described various embodiments as well as the above example may be applied to the same or similar in this example.

In the case of the above example, the case in which a pixel to be corrected is selected according to the position of the correlation information acquisition region, which is one of the detailed settings of the color copy mode, is described, but various other cases in which pixels to be corrected are selected according to detailed settings of other color copy modes may be possible.

In addition, the plurality of examples are limited to some examples for selecting a target to be corrected, and examples of various modifications may be possible, such as a position in which a pixel to be corrected is located in an opposite position in a block or in a vertical/horizontal symmetric position. In addition, the above example may be applied to the same or similar application to the above-described existing prediction mode.

Through the above-described plurality of examples, a case in which the encoding/decoding setting for selecting a pixel to be corrected is determined according to the size, shape, prediction mode, etc. of a block, and various other elements are considered to determine the encoding/decoding setting. In addition, the encoding/decoding setting may be defined according to a combination of two or more elements in addition to being defined according to a single encoding/decoding element as in the above example. In such a case, the boundary value setting for selecting the pixel to be corrected, which has been described through the above example, may also be determined in consideration of a plurality of encoding/decoding elements. That is, it means that a final boundary value setting for selecting a pixel to be corrected may be determined according to encoding/decoding settings defined according to one or more encoding/decoding elements.

In the following, a relationship setting between the prediction pixel value (or first prediction pixel value) generated through the first reference pixel and the prediction correction value (or second prediction pixel value or final prediction pixel value) generated through the first reference pixel or the second reference pixel will be described. In this case, the relationship setting may mean weight setting applied to each pixel.

The following is an example of an equation in which intra prediction is performed using one or more reference pixels.

$$\text{pred\_sample}^*(i,j) = \text{pred\_sample}(i,j) \times W_P + \text{ref\_sample\_}a(a_i,a_j) \times W_a + \text{ref\_sample\_}b(b_i,b_j) \times W_b + \text{ref\_sample\_}c(c_i,c_j) \times W_c \quad \text{[Equation 3]}$$

In the above equation, pred_sample(i, j) and pred_sample*(i, j) mean a prediction pixel value (or first prediction pixel value) and a prediction correction value (or final prediction pixel value) at (i, j), and ref_sampel_a to ref_sample_c refer to reference pixels used in the prediction pixel correction process. In this case, $(a_i,a_j)$, $(b_i,b_j)$, $(c_i,c_j)$ indicate positions of each reference pixel used in the correction process. In addition, $w_p$, $w_a$, $w_b$, $w_c$ mean weights applied to each pixel in the process of correcting the prediction pixels.

The number of pixels used (or referenced) in the prediction pixel correction process is k (k is an integer of 0 or more such as 1, 2, 3, etc.), which may be fixed or adaptive depending on encoding/decoding settings. Although the number of reference pixels used in the correction process may be determined according to various encoding/decoding elements, it is assumed that up to three pixels are used in this example. When less than three reference pixels are used, it is assumed that some reference pixels are filled with zeros or weights of some reference pixels are filled with zeros.

When performing correction on a prediction block, at least one reference pixel (except when the actual reference pixel value is 0) that is not 0 in the above equation is used for correction, and the weight of the reference pixel may not be 0, and when not performing correction, all the reference pixels may be filled with 0 in the above equation, or the weights may be set to 0 for all reference pixels. For example, the reference pixel position used for correction may be obtained according to the prediction mode, but when it is determined that the correction is not to be performed by other encoding/decoding elements (e.g., the size of the block), it means that the process of setting the weight applied to the reference pixel to 0 is possible. That is, it can be understood that the prediction pixel value (first prediction pixel value) is determined as the prediction correction value (second prediction pixel value or final prediction pixel value).

(when the correction is performed on the prediction block) for a pixel included in the range to be corrected, in the above equation, at least one reference pixel that is not 0 may be used for correction, and the weight of the reference pixel may not be 0. For a pixel not included in the range to be corrected, in the above equation, all the reference pixels may be filled with zeros, or the weights of all the reference pixels may be set to zeros.

Although this example performs correction on the prediction block and explains on the assumption that all pixels in the block are included in the correction target, it should be understood that a case in which some pixels are included in the correction target can be applied in combination with the contents described below.

A reference pixel used for correction may be variously configured according to a prediction mode. It is assumed that $(i,j)$, $(a_i,a_j)$, $(b_i,b_j)$, $(c_i,c_j)$ are measured based on the top left coordinates $(0,0)$ of a prediction block (M×N). The following shows various cases in which $(a_i,a_j)$, $(b_i,b_j)$, $(c_i,c_j)$ are set according to a prediction mode.

For example, when a prediction mode is the vertical mode, $(-1, -1)$, $(-1, j)$, $(i, -1)$, or $(-1, -1)$, $(-1, j)$, $(-1, N-1)$ may be set. Alternatively, when the prediction mode is the horizontal mode, $(-1, -1)$, $(i, -1)$, $(-1, j)$, or $(-1, -1)$, $(i, -1)$, $(M-1, -1)$ may be set.

Alternatively, when the prediction mode is the Diagonal up right mode, $(-1, -1)$, $(i+j+1, -1)$, $(-1, i+j+1)$, or $(i+j, -1)$, $(i+j+1,-1)$, $(i+j+2, -1)$ may be set. Alternatively, when the prediction mode is the Diagonal down left mode, $(-1, -1)$, $(-1, i+j+1)$, $(i+j+1, -1)$, or $(-1, i+j)$, $(-1, i+j+1)$, $(-1, i+j+2)$ may be set.

Alternatively, when the prediction mode is the Diagonal down right mode, $(-1, -1)$, $(i+j+1, -1)$, $(-1, i+j+1)$, or $(i-j-1, -1)$, $(i+j+1, -1)$, $(-1, i+j+1)$<if i is greater than or equal to j>, or $(-1, j-i-1)$, $(-1, i+j+1)$, $(i+j+1, -1)$<if i is less than j> may be set.

Alternatively, when the prediction mode is the DC mode, $(-1, -1)$, $(-1, j)$, $(i, -1)$, or $(-1, -1)$, $(M, -1)$, $(-1, N)$ may be set. Alternatively, when the prediction mode is the Planar mode, $(-1, -1)$, $(-1, j)$, $(i, -1)$, or $(-1, -1)$, $(M, -1)$, $(-1, N)$ may be set.

Alternatively, when the prediction mode is the color copy mode, $(-1, -1)$, $(i, -1)$, $(-1, j)$, or $(i-1, j)$, $(i, j)$, $(i+1, j)$, or $(i, j-1)$, $(i, j)$, $(i, j+1)$, or $(i-1, j-1)$, $(i, j)$, $(i+1, j+1)$, or $(i-1, j+1)$, $(i, j)$, $(i+1, j-1)$ may be set.

The above example assumes a reference pixel position determined according to some prediction modes, and in the case of a mode (for example, the directional mode. assuming the mode 50 in FIG. 4, the adjacent the modes 49, 51, etc.) adjacent to the prediction mode, a reference pixel (for example, <i+1, -1>, <i-1, -1>, <i+2, -1>, etc.) adjacent to the reference pixel position (for example, assume <i, -1>) determined according to the prediction mode may be used in the correction process.

In addition, various reference pixel configurations may be possible, including the above example. In this case, even if the reference pixel as in the above example is configured according to each prediction mode, it may not mean that a weight other than 0 is always applied to the corresponding reference pixel (or all reference pixels).

The weight applied to the reference pixel used in the correction process may be set based on the horizontal (M) and vertical (N) lengths (or exponential value when expressing the length as a power of p, p is an integer such as 2 or 4, it is explained based on the length in this example) of the prediction block (M×N), the position of the target pixel, and the position of the reference pixel. Alternatively, it may be set based on the horizontal and vertical lengths of the prediction block and the position of the target pixel, and an example described later will be developed based on this.

In this case, it is assumed that the position of the pixel is measured based on the top left coordinates (0, 0) of the prediction block (M×N). That is, the position of the pixel can be measured by subtracting the x and y components of the top left pixel in the block from the corresponding pixel.

The reference pixel used in the correction process may belong to a block adjacent in a horizontal direction (for example, Ref_T, Ref_TR, etc. in FIG. 9), a block adjacent in a vertical direction (for example, Ref_L, Ref_BL, etc. in FIG. 9), and a block adjacent in a horizontal and vertical direction (for example, Ref_TL in FIG. 9) of the current block.

As an example of setting weights, the weight applied to the reference pixel in the adjacent block in the horizontal direction may be set based on the vertical length (or sum or average of the horizontal and vertical lengths) of the current block and the y component of the target pixel, the weight applied to the reference pixel in the adjacent block in the vertical direction may be set based on the horizontal length (or sum or average of the horizontal and vertical lengths) of the current block and the x component of the target pixel, and the weight applied to the reference pixel in the block adjacent to the horizontal and vertical directions may be set based on the horizontal and vertical lengths of the current block (or the sum or average of the horizontal and vertical lengths) and the x and y components of the target pixel. In addition, the weight setting may be determined in consideration of the case opposite to the above example or other variations, and the following describes the case where the weight setting is applied based on the example.

For example, the prediction mode of the current block is a color copy mode, has a size of M×N blocks, and when a pixel located at (i,j) is corrected, a weight applied to the reference pixel can be set as follows. In this example, it is assumed that the weights of $w_a$ to $w_c$ are applied to reference pixels at positions $(-1, j)$, $(i, -1)$, $(-1, -1)$.

$$S=((\text{Log}_2 M+\text{Log}_2 N-2)>>2)$$

$$w_a=32>>((i<<1)>>S)/w_b=32>>((j<<1)>>S)$$

$$w_c=(w_a>>4)+(w_b>>4)/w_p=64-(w_a+w_b-w_c)$$

In the above equation, S is a weight adjustment element obtained based on the horizontal and vertical lengths of the current block, $w_a$ is a weight obtained based on S and the x component of the target pixel, $w_b$ is a weight obtained based on S and the y component of the target pixel, $w_c$ is a weight obtained based on S, $w_a$, and $w_b$. In the case of $w_c$, it may mean a weight obtained based on the horizontal and vertical lengths of the current block and the x and y components of the target pixel. Prediction correction values may be obtained by applying the weights obtained through the above equation to the correction process equation (however, a shift operation must be performed to the right by 6 in the equation).

In the case of S, it may have a fixed one value, or one of a plurality of candidates may be adaptively selected. In this case, in the adaptive case, a plurality of S candidates may be obtained through a method of applying a modification (for example, subtract or add 1, 2, etc. to S) of the equation for obtaining the S.

Although the adaptive case for S has been described through the above example, it may be possible that various other weight settings are fixedly or adaptively determined. In the fixed case, it may mean that one weight setting in an image is used for each block regardless of encoding/decoding settings, and in the adaptive case, it may mean that a weight setting is determined according to the encoding/decoding settings and used in a unit of a block. In this case, the encoding/decoding setting may be defined by one or more of elements such as an image type, color component, block size/shape/position, prediction mode, and the like.

In addition, for a weight setting, not only one setting fixed to one block may be supported, but also two or more settings are supported and adaptively selected in one block as an example of modification may be possible. As described above, correction may be performed on some regions of a block without performing correction on some regions of the block. As an extended example, some regions in a block are not corrected, and some regions (n. N is an integer greater than or equal to 1) in a block may be calibrated according to the weight setting of each region.

For example, in the case of a 64×64 block, the bottom right region ($Z_{2,2}$, $Z_{3,2}$, $Z_{2,3}$, $Z_{3,3}$ in FIG. 13 in this example) has a long distance from the reference pixel, so correction is not performed. In the top left region ($R_0$ and $C_0$ in FIG. 13), since the distance from the reference pixel is short, correction can be performed according to the weight setting A (for example, making the intensity of correction stronger. use S in the above equation). Since the reference pixel distance is medium in the middle region ($Z_{1,1}$, $Z_{2,1}$, $Z_{3,1}$, $Z_{1,2}$, $Z_{1,3}$ in FIG. 13) of the two regions, correction may be performed according to the weight setting B (for example, the correction intensity is set to the middle. add 1 to S in the above equation).

Alternatively, in the case of a 16×16 block, since the reference pixel distance is far in the bottom right region (the same as in the example above), correction may not be performed. In the top left region ($R_0$, $R_1$, $C_0$, $C_1$ in FIG. 13), since a distance from the reference pixel is short, correction may be performed. Alternatively, in the case of a 4×4 block, since all regions have a long distance from a reference pixel, correction may be performed.

The above example shows some cases in which a weight setting in a block is adaptive according to the size of the block, and examples of various modifications are possible without being limited to the above example. In addition, there may be one or more specific boundary value conditions separating each region in the above example. In addition, other weight settings (for example, the number of reference pixels, the position of the reference pixels, etc.) may be adaptively set in one block according to the position of the pixel to be corrected as well as the S mentioned in the above example.

The prediction mode determination unit performs a process for selecting an optimal mode among a plurality of prediction mode candidate groups. In general, it is possible to determine an optimal mode in terms of encoding cost by using a rate-distortion technique that considers distortion of a block {for example, distortion of a current block and a reconstructed block. SAD (Sum of Absolute Difference), SSD (Sum of Square Difference), etc.} and the amount of bits generated according to a corresponding mode. A prediction block generated based on the prediction mode determined through the above process may be transmitted to the subtraction unit and the addition unit.

In order to determine an optimal prediction mode, all prediction modes existing in prediction mode candidate groups may be searched, or the optimal prediction mode may be selected through another decision process for the purpose of reducing computational quantity/complexity. For example, in the first step, some modes having good performance in terms of image quality deterioration are selected for all of the candidates of an intra prediction mode, and in the second step, an optimal prediction mode may be selected by considering not only image quality deterioration but also the amount of bits generated for the mode selected in the first step. In addition to the above methods, various methods of reducing computational quantity/complexity may be applied.

In addition, the prediction mode determining unit may be a configuration generally included only in an encoder, but may also be a configuration included in a decoder according to encoding/decoding settings. For example, in the latter case, where template matching is included as a prediction method or a method of deriving an intra prediction mode in an adjacent region of a current block, a method of implicitly acquiring a prediction mode in a decoder is used.

The prediction mode encoding unit may encode the prediction mode selected through the prediction mode determination unit. In a prediction mode candidate group, index information corresponding to the prediction mode may be encoded, or information on the prediction mode may be encoded by predicting the prediction mode. The former may be a method applied to a luminance component, and the latter may be a method applied to a chrominance component, but is not limited thereto.

When a prediction mode is predicted and encoded, a prediction value (or prediction information) of the prediction mode may be referred to as Most Probable Mode (MPM). The MPM may be configured in one prediction mode or may be configured in a plurality of prediction modes, and the number of MPMs (k. k is an integer greater than or equal to 1, such as 2, 3, 6.) may be determined according to the number of prediction mode candidate groups. When the MPM is configured with a plurality of prediction modes, it may be referred to as an MPM candidate group.

MPM is a concept supported to efficiently encode a prediction mode. In fact, a candidate group may be configured as a prediction mode having a high probability of being generated as a prediction mode of a current block.

For example, a MPM candidate group may be configured with a preset prediction mode (or statistically frequent prediction modes. DC, Planar, Vertical, Horizontal, and some diagonal modes, etc.), a prediction mode of adjacent blocks (Left, top, top left, top right, bottom left blocks, etc.), and the like. In this case, the prediction mode of adjacent blocks may be obtained from L0 to L3 (left block), T0 to T3

(top block), TL (top left block), R0 to R3 (top right block), and B0 to B3 (bottom left block) in FIG. 9.

If an MPM candidate group can be configured from two or more sub-block positions (for example, L0, L2, etc.) in an adjacent block (for example, left block), a prediction mode of a corresponding block may be configured in a candidate group according to a predefined priority (for example, L0-L1-L2, etc.). Alternatively, if a MPM candidate group cannot be configured from two or more sub-block positions, a prediction mode of a sub-block corresponding to a predefined position (for example, L0, etc.) may be configured in a candidate group. Specifically, among the adjacent blocks, a prediction mode of the L3, T3, TL, R0, and B0 positions may be selected as a prediction mode of an adjacent block and included in a MPM candidate group. The above description is a case in which a prediction mode of an adjacent block is configured in a candidate group, but is not limited thereto. In the example described below, it is assumed that a prediction mode of a predefined position is configured in a candidate group.

In addition, when one or more prediction modes are configured as an MPM candidate group, a mode derived from one or more included prediction modes may also be additionally configured as an MPM candidate group. Specifically, when the k mode (directional mode) is included in the MPM candidate group, a mode derivable from the mode (a mode having an interval of +a, −b based on k. a and b are integers equal to or greater than 1 such as 1, 2, 3) may be further included in the MPM candidate group.

Priority for configuring a MPM candidate group may exist, and a MPM candidate group may be configured in the order of a prediction mode of a neighboring block—a preset prediction mode—a derived prediction mode, and the like. The process of constructing the MPM candidate group can be completed by filling the maximum number of MPM candidates according to the priority. In the case of matching with the previously included prediction mode in the above process, the prediction mode may not be configured in the candidate group, and may include a redundancy check process in which the order is passed to the next priority candidate.

The following assumes that a MPM candidate group is composed of six prediction modes.

For example, a candidate group may be configured in the order of L-T-TL-TR-BL-Planar-DC-vertical-horizontal-diagonal mode. It may be a case that a prediction mode of an adjacent block is configured preferentially in a candidate group, and a predetermined prediction mode is additionally configured.

Alternatively, a candidate group may be configured in the order of L-T-Planar-DC-<L+1>-<L −1>-<T+1>-<T −1>-vertical-horizontal-diagonal mode. It may be a case that some prediction modes of adjacent blocks and some predetermined prediction mode are configured preferentially, and a mode derived from the assumption that a prediction mode in a direction similar to a prediction mode of an adjacent block will occur and some of the preset prediction modes are configured additionally.

The above examples are some cases regarding the configuration of the MPM candidate group, it may not be limited thereto, and examples of various modifications may be possible.

A MPM candidate group may use binarization such as unary binarization and truncated rice binarization based on an index in the candidate group. That is, a mode bit can be expressed by allocating a short bit to a candidate having a small index and a long bit to a candidate having a large index.

Modes not included in a MPM candidate group may be classified as a non-MPM candidate group. In addition, the non-MPM candidate group may be classified into two or more candidate groups according to encoding/decoding settings.

The following is a premise that 67 modes including a directional mode and a non-directional mode exist in a prediction mode candidate group, and 6 MPM candidates are supported and 61 prediction modes are configured in a non-MPM candidate group.

When a non-MPM candidate group is configured as one, since a prediction mode that is not included in the MPM candidate group configuration process remains, an additional candidate group configuration process is not required. Therefore, based on the index in the non-MPM candidate group, binarization such as fixed length binarization and truncated unary binarization can be used.

Assuming that a non-MPM candidate group is composed of two or more candidate groups, in this example, the non-MPM candidate group is classified into non-MPM_A (hereinafter, A candidate group) and non-MPM_B (hereinafter, B candidate group). It is assumed that A candidate group (p. equal to or more than the number of MPM candidate groups) constitutes a candidate group with a prediction mode that is more likely to occur as a prediction mode of the current block than a candidate B group (q. equal to or more than the number of the A candidate group). In this case, the process of configuring the candidate A group may be added.

For example, some prediction modes (for example, mode 2, 4, 6, etc.) having equal intervals among directional modes, or a predetermined prediction mode (For example, a mode derived from a prediction mode included in a MPM candidate group, etc.), may be configured in the A candidate group. The remaining prediction modes through the MPM candidate group configuration and the A candidate group configuration may be composed of a B candidate group, and an additional candidate group configuration process is not required. Binarization such as fixed length binarization and truncated unary binarization may be used based on an index in the A and B candidate groups.

The above examples are some cases in which two or more non-MPM candidate groups are configured, it may not be limited thereto, and examples of various modifications may be possible.

The following shows a process for predicting and encoding a prediction mode.

Information (mpm_flag) on whether a prediction mode of a current block matches a MPM (or some modes in a MPM candidate group) may be checked.

When it matches the MPM, MPM index information (mpm_idx) may be additionally confirmed according to the configuration (1, or 2 or more) of the MPM. Thereafter, an encoding process of a current block is completed.

When it does not match MPM, if a non-MPM candidate group is configured as one, non-MPM index information (remaining_idx) can be checked. Thereafter, the encoding process of the current block is completed.

If non-MPM candidate groups are configured in plural (two in this example), information (non_mpm_flag) on whether a prediction mode of a current block matches some prediction modes in an A candidate group can be checked.

If it matches the A candidate group, the A candidate group index information (non_mpm_A_idx) may be checked, and if it does not match the A candidate group, the B candidate group index information (remaining_idx) may be checked.

When the configuration of the prediction mode candidate group is fixed, a prediction mode supported by a current block, a prediction mode supported by an adjacent block, and a preset prediction mode may use the same prediction number index.

Meanwhile, when a configuration of a prediction mode candidate group is adaptive, a prediction mode supported by a current block, a prediction mode supported by an adjacent block, and a preset prediction mode may use the same prediction number index or different prediction number indexes. Refer to FIG. 4 for the following description.

In the prediction mode encoding process, a process of unifying (or adjusting) a prediction mode candidate group for configuring the MPM candidate group may be performed. For example, a prediction mode of a current block may be one of −5 to 61 mode prediction mode candidate groups, and an adjacent block prediction mode may be one of 2 to 66 mode prediction mode candidate groups. In this case, some the prediction modes of the adjacent block (mode 66) may be a mode that is not supported for the prediction mode of the current block, so a process of unifying it in the prediction mode encoding process may be performed. That is, it may be a process that is not required when a configuration of a fixed intra prediction mode candidate group is supported, and may be a process required when a configuration of an adaptive intra prediction mode candidate group is supported, and detailed description thereof will be omitted.

Unlike the method using the MPM, encoding may be performed by assigning an index to a prediction mode belonging to a prediction mode candidate group.

For example, if an index is assigned to a prediction mode according to a predefined priority and a prediction mode of a current block is selected, a method of encoding the index corresponds to this. This means that a prediction mode candidate group is fixedly configured and a fixed index is allocated to the prediction mode.

Alternatively, when the prediction mode candidate group is configured adaptively, the fixed index allocation method may not be suitable. To this end, an index is allocated to a prediction mode according to an adaptive priority, and when a prediction mode of a current block is selected, a method of encoding the corresponding index can be applied. This makes it possible to efficiently encode the prediction mode by changing the index assigned to the prediction mode due to the adaptive configuration of the prediction mode candidate group. That is, the adaptive priority may be to allocate a candidate that is likely to be selected as a prediction mode of a current block to an index in which a short mode bit occurs.

In the following, it is assumed that 8 prediction modes including a preset prediction mode (directional mode and non-directional mode) in the prediction mode candidate group, a color copy mode, and a color mode are supported (chrominance component).

For example, it is assumed that four preset prediction modes are supported among Planar, DC, horizontal, vertical, and diagonal modes (Diagonal down left in this example), and one color mode (C) and three color copy modes (CP1, CP2, CP3) are supported. The basic order of indexes allocated to a prediction mode may be given as a preset prediction mode—a color copy mode—a color mode, and the like.

In this case, the directional mode, the non-directional mode, and the color copy mode, which are preset prediction modes, can be easily classified into prediction modes in which prediction methods are distinguished. However, in the case of the color mode, it may be a directional mode or a non-directional mode, and there may be a possibility of overlapping with a preset prediction mode. For example, when the color mode is a vertical mode, a case may occur in which the vertical mode, which is one of the preset prediction modes, overlaps.

In the case of adaptively adjusting the number of prediction mode candidate groups according to encoding/decoding settings, the number of candidate groups may be adjusted (8->7) when the overlapping case occurs. Alternatively, if the number of prediction mode candidate groups is kept fixed, when the overlapping case occurs, an index may be allocated by adding and considering other candidates, which will be described later on the assumption of this setting. In addition, an adaptive prediction mode candidate group may be a supported configuration even when a variable mode such as a color mode is included. Therefore, when adaptive index allocation is performed, it can be regarded as an example of the configuration of the adaptive prediction mode candidate group.

The following describes a case where adaptive index allocation is performed according to a color mode. It is assumed that a basic index is allocated in the order of Planar(0)-Vertical(1)-Horizontal(2)-DC(3)-CP1(4)-CP2(5)-CP3(6)-C(7). In addition, it is assumed that index allocation is performed in the above order when the color mode does not match a preset prediction mode.

For example, when a color mode matches one of preset prediction modes (Planar, Vertical, Horizontal, DC mode), the prediction mode matching the index 7 of the color mode is filled. The index of the matching prediction mode (one of 0 to 3) is filled with a preset prediction mode (Diagonal down left). Specifically, when a color mode is the horizontal mode, index allocation such as Planar(0)-Vertical(1)-Diagonal down left(2)-DC(3)-CP1(4)-CP2(5)-CP3(6)-Horizontal(7) may be performed.

Alternatively, when a color mode matches one of preset prediction modes, the prediction mode matching the index 0 is filled. Then, the preset prediction mode (Diagonal down left) is filled in the index 7 of the color mode. In this case, if the filled prediction mode is not an existing index 0 (that is, not a planar mode), the existing index configuration may be adjusted. Specifically, when a color mode is DC mode, index allocation such as DC(0)-Planar(1)-Vertical(2)-Horizontal(3)-CP1(4)-CP2(5)-CP3(6)-Diagonal down left(7) may be performed.

The above examples are some cases of adaptive index allocation, and are not limited thereto, and examples of various modifications may be possible. In addition, based on an index in a candidate group, fixed length binarization, unary binarization, truncated unary binarization, and truncated Rice binarization may be used.

In the following, another example of performing encoding by assigning an index to a prediction mode belonging to a prediction mode candidate group will be described.

For example, the method of classifying into a plurality of prediction mode candidate groups by dividing by a prediction mode, a prediction method, etc., and encoding by assigning an index to a prediction mode belonging to the candidate group for encoding corresponds thereto. In this case, candidate group selection information encoding may precede index encoding. As an example, a directional mode, a non-directional mode, and a color mode, which are prediction modes for performing prediction in the same color space, may belong to one candidate group (hereinafter, S candidate group), and a color copy mode, which is a prediction mode for performing prediction in another color space, may belong to one candidate group (hereinafter, D candidate group).

The following assumes that nine prediction modes including a preset prediction mode, a color copy mode, and a color mode are supported in a prediction mode candidate group (chrominance component).

For example, it is assumed that four preset prediction modes are supported among Planar, DC, horizontal, vertical, and diagonal modes, and one color mode (C) and four color copy modes (CP1, CP2, CP3, CP4) are supported. The S candidate group may have five candidates composed of a preset prediction mode and a color mode, and the D candidate group may have four candidates composed of a color copy mode.

The S candidate group is an example of an adaptively configured prediction mode candidate group, and an example of adaptive index allocation has been described above, so a detailed description thereof will be omitted. Since the D candidate group is an example of a fixedly configured prediction mode candidate group, a fixed index allocation method can be used. For example, index allocation such as CP1(0)-CP2(1)-CP3(2)-CP4(3) may be performed.

Based on the index in the candidate group, binarization such as fixed length binarization, unary binarization, truncated unary binarization, and truncated Rice binarization can be used. In addition, examples of various modifications may be possible without being limited to the above examples.

Prediction related information generated through the prediction mode encoding unit may be transmitted to the encoding unit and included in a bitstream.

In the image decoding method according to an embodiment of the present invention, intra prediction may be configured as follows. The intra prediction of the prediction unit may include a prediction mode decoding step, a reference pixel construction step, and a prediction block generation step. In addition, the image decoding apparatus may be configured to include a prediction mode decoding unit, a reference pixel configuration unit, and a prediction block generation unit that implement a prediction mode decoding step, a reference pixel configuration step, and a prediction block generation step. Some of the above-described processes may be omitted or other processes may be added, and it may be changed in an order other than the order described above.

Since the reference pixel construction unit and the prediction block generation unit of the image decoding apparatus perform the same role as the corresponding configurations of the image encoding apparatus, detailed descriptions are omitted. The prediction mode decoding unit may be performed using the method used by the prediction mode encoding unit in reverse.

The methods according to the present invention may be implemented in the form of program instructions that can be executed through various computer means and recorded in a computer readable medium. Computer readable medium may include program instructions, data files, data structures, or the like alone or in combination. The program instructions recorded on the computer-readable medium may be specially designed and configured for the present invention or may be known and usable by those skilled in computer software.

Examples of computer readable medium may include hardware devices specifically configured to store and execute program instructions, such as ROM, RAM, flash memory, and the like. Examples of program instructions may include machine language codes such as those produced by a compiler, as well as high-level language codes that can be executed by a computer using an interpreter and the like. The above-described hardware device may be configured to operate with at least one software module to perform the operation of the present invention, and vice versa.

In addition, the above-described method or apparatus may be implemented by combining all or part of its configuration or function, or may be implemented separately.

Although described above with reference to preferred embodiments of the present invention, those skilled in the art will appreciate that various modifications and changes can be made to the present invention without departing from the spirit and scope of the invention as set forth in the claims below.

The present invention can be used in an image encoding/decoding method and apparatus.

What is claimed is:

1. A method of decoding an image with a decoding apparatus, comprising:
generating a prediction pixel of a current block of a first color space, the prediction pixel of the current block being generated by using a plurality of reference pixels belonging to a corresponding block of a second color space;
deriving correlation information between the current block of the first color space and the corresponding block of the second color space, using a first neighboring region adjacent to the current block of the first color space and a second neighboring region adjacent to the corresponding block of the second color space;
correcting the prediction pixel of the current block based on the correlation information; and
reconstructing the current block of the first color space based on the corrected prediction pixel,
wherein generating the prediction pixel of the current block of the first color space comprises performing a filtering on the reference pixels belonging to the corresponding block of the second color space,
wherein the reference pixels include at least one of a filtering target pixel or a neighboring pixel of the filtering target pixel,
wherein the neighboring pixel of the filtering target pixel includes at least one of a top pixel, a left pixel, a right pixel, a top-left pixel, a top-right pixel, a bottom pixel, a bottom-left pixel, or a bottom-right pixel adjacent to the filtering target pixel, and
wherein a number of the reference pixels to be used to generate the prediction pixel of the current block of the first color space is variably determined based on a flag signaled from an encoding apparatus.

2. The method of claim 1, wherein a position of each of the first neighboring region and the second neighboring region is determined based on an intra prediction mode of the current block of the first color space.

3. The method of claim 2, wherein the first neighboring region includes at least one of a top region, a left region, a top-left region, a bottom-left region or a top-right region of the current block of the first color space.

4. The method of claim 1, wherein deriving the correlation information comprises:
determining a plurality of pixels for correcting the prediction pixel of the current block, among pixels belonging to the second neighboring region adjacent to the corresponding block of the second color space; and generating one pixel by applying a weighting filter to the determined plurality of pixels.

5. A method of encoding an image with an encoding apparatus, comprising:
- generating a prediction pixel of a current block of a first color space, the prediction pixel of the current block being generated by using a plurality of reference pixels belonging to a corresponding block of a second color space;
- deriving correlation information between the current block of the first color space and the corresponding block of the second color space, using a first neighboring region adjacent to the current block of the first color space and a second neighboring region adjacent to the corresponding block of the second color space;
- correcting the prediction pixel of the current block based on the correlation information; and
- encoding the current block of the first color space based on the corrected prediction pixel,
- wherein generating the prediction pixel of the current block of the first color space comprises performing a filtering on the reference pixels belonging to the corresponding block of the second color space,
- wherein the reference pixels include at least one of a filtering target pixel or a neighboring pixel of the filtering target pixel,
- wherein the neighboring pixel of the filtering target pixel includes at least one of a top pixel, a left pixel, a right pixel, a top-left pixel, a top-right pixel, a bottom pixel, a bottom-left pixel or a bottom-right pixel adjacent to the filtering target pixel, and
- wherein a flag for determining a number of the reference pixels to be used to generate the prediction pixel of the current block of the first color space is encoded.

6. A non-transitory computer-readable storage medium having instructions stored thereon that, when executed, cause one or more processors to:
- generating a prediction pixel of a current block of a first color space, the prediction pixel of the current block being generated by using a plurality of reference pixels belonging to a corresponding block of a second color space;
- deriving correlation information between the current block of the first color space and the corresponding block of the second color space, using a first neighboring region adjacent to the current block of the first color space and a second neighboring region adjacent to the corresponding block of the second color space;
- correcting the prediction pixel of the current block based on the correlation information; and
- reconstructing the current block of the first color space based on the corrected prediction pixel,
- wherein generating the prediction pixel of the current block of the first color space comprises performing a filtering on the reference pixels belonging to the corresponding block of the second color space,
- wherein the reference pixels include at least one of a filtering target pixel or a neighboring pixel of the filtering target pixel,
- wherein the neighboring pixel of the filtering target pixel includes at least one of a top pixel, a left pixel, a right pixel, a top-left pixel, a top-right pixel, a bottom pixel, a bottom-left pixel or a bottom-right pixel adjacent to the filtering target pixel, and
- wherein a number of the reference pixels to be used to generate the prediction pixel of the current block of the first color space is variably determined based on a flag signaled from an encoding apparatus.

\* \* \* \* \*